US008068163B2

(12) United States Patent
Johnson et al.

(10) Patent No.: US 8,068,163 B2
(45) Date of Patent: *Nov. 29, 2011

(54) OPTICAL IMAGING SYSTEMS AND METHODS UTILIZING NONLINEAR AND/OR SPATIALLY VARYING IMAGE PROCESSING

(75) Inventors: Gregory E. Johnson, Boulder, CO (US); Edward R. Dowski, Jr., Lafayette, CO (US); Kenneth S. Kubala, Boulder, CO (US); Ramakumar Narayanswamy, Boulder, CO (US); Hans Brandon Wach, Longmont, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 265 days.

This patent is subject to a terminal disclaimer.

(21) Appl. No.: 12/294,664

(22) PCT Filed: Apr. 3, 2007

(86) PCT No.: PCT/US2007/065887
§ 371 (c)(1),
(2), (4) Date: Sep. 26, 2008

(87) PCT Pub. No.: WO2007/118097
PCT Pub. Date: Oct. 18, 2007

(65) Prior Publication Data
US 2010/0165136 A1 Jul. 1, 2010

Related U.S. Application Data

(60) Provisional application No. 60/788,801, filed on Apr. 3, 2006.

(51) Int. Cl.
*H04N 5/225* (2006.01)
(52) U.S. Cl. ..................... 348/340; 348/222.1
(58) Field of Classification Search .................. None
See application file for complete search history.

(56) References Cited

U.S. PATENT DOCUMENTS
5,748,371 A 5/1998 Cathey et al.
(Continued)

FOREIGN PATENT DOCUMENTS
WO 0168326 A 9/2001
(Continued)

OTHER PUBLICATIONS

Gracht, Van Der J., et al. "Iris Recognition With Enhanced Dept-of-Field Image Acquisition," Proceedings of teh SPIE, SPIE, Bellingham, VA, United States, vol. 5438, No. 1, Jul. 2004, pp. 120-129.

(Continued)

*Primary Examiner* — Lin Ye
*Assistant Examiner* — Dennis Hogue
(74) *Attorney, Agent, or Firm* — Lathrop & Gage LLP

(57) ABSTRACT

Systems and methods include optics having one or more phase modifying elements that modify wavefront phase to introduce image attributes into an optical image. A detector converts the optical image to electronic data while maintaining the image attributes. A signal processor subdivides the electronic data into one or more data sets, classifies the data sets, and independently processes the data sets to form processed electronic data. The processing may optionally be nonlinear. Other imaging systems and methods include optics having one or more phase modifying elements that modify wavefront phase to form an optical image. A detector generates electronic data having one or more image attributes that are dependent on characteristics of the phase modifying elements and/or the detector. A signal processor subdivides the electronic data into one or more data sets, classifies the data sets and independently processes the data sets to form processed electronic data.

51 Claims, 41 Drawing Sheets

U.S. PATENT DOCUMENTS

| | | | |
|---|---|---|---|
| 6,073,851 A * | 6/2000 | Olmstead et al. | 235/462.45 |
| 6,525,302 B2 | 2/2003 | Dowski, Jr. et al. | |
| 6,842,297 B2 | 1/2005 | Dowski, Jr. | |
| 6,873,733 B2 | 3/2005 | Dowski, Jr. | |
| 6,911,638 B2 | 6/2005 | Dowski, Jr. et al. | |
| 6,940,649 B2 | 9/2005 | Dowski, Jr. | |
| 7,115,849 B2 | 10/2006 | Dowski, Jr. et al. | |
| 7,180,673 B2 | 2/2007 | Dowski, Jr. | |
| 2003/0057353 A1* | 3/2003 | Dowski et al. | 250/201.9 |
| 2003/0108250 A1* | 6/2003 | Luo et al. | 382/263 |
| 2003/0169944 A1* | 9/2003 | Dowski et al. | 382/279 |
| 2003/0215155 A1* | 11/2003 | Serrano et al. | 382/254 |
| 2004/0004125 A1* | 1/2004 | Havens et al. | 235/462.22 |
| 2004/0228005 A1* | 11/2004 | Dowski, Jr. | 359/671 |
| 2005/0197809 A1 | 9/2005 | Dowski, Jr. et al. | |
| 2007/0058056 A1* | 3/2007 | Kaplinsky et al. | 348/272 |
| 2009/0167922 A1* | 7/2009 | Perlman et al. | 348/340 |

FOREIGN PATENT DOCUMENTS

WO    WO 03/073153    9/2003

OTHER PUBLICATIONS

International Search Report and Written Opinion issued in related PCT Patent Application Serial No.: PCT/US2007/065887, dated Aug. 7, 2007, 15 pages.

International Preliminary Patentability Report issued in related PCT Patent Application Serial No.: PCT/US2007/065887, dated Jul. 29, 2008, 10 pages.

Response to Written Opinion filed in related PCT Patent Application Serial No.: PCT/US2007/065887, dated Feb. 4, 2008, 15 pages.

European Application No. 07760048.4, Communication Pursuant to Article 94(3) EPC, Apr. 17, 2009, 4 pages.

European Application No. 07760048.4, Response to Communication Pursuant to Article 94(3) EPC, filed Oct. 21, 2009, 8 pages.

European Application No. 07760048.4, Communication Pursuant to Article 94(3) EPC, Jun. 23, 2010, 4 pages.

European Application No. 07760048.4, Response to Communication Pursuant to Article 94(3) EPC, filed Oct. 18, 2010, 27 pages.

Notification of Intension to Grant issued in related European Patent Application 07 760 048.4 dated Nov. 26, 2010, 5 pages.

Notice of Allowance issued in related U.S. Appl. No. 11/696,121, Dec. 13, 2010, 7 pages.

Chinese Patent Application No. 200780020519.4, Office Action dated Dec. 31, 2011, with Summary English Translation, 31 pages.

Wu Gui-Ying, Wavefront Coding—A New Method of Image Processing, OME Information, vol. 16, No. 8, 1999, pp. 26-27.

Fu Yong-Qing, et al., An algorithm for edge detection of gray-scale image based on mathematical morphology, Journal of Harbin Engineering University, vol. 26, No. 5, Oct. 2005, pp. 685-687.

* cited by examiner

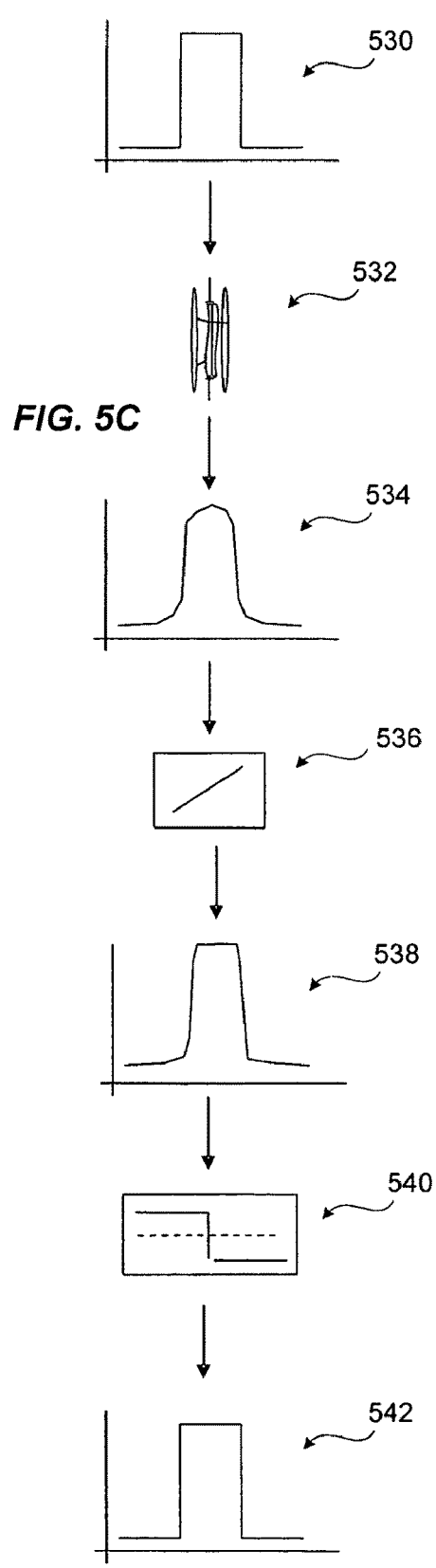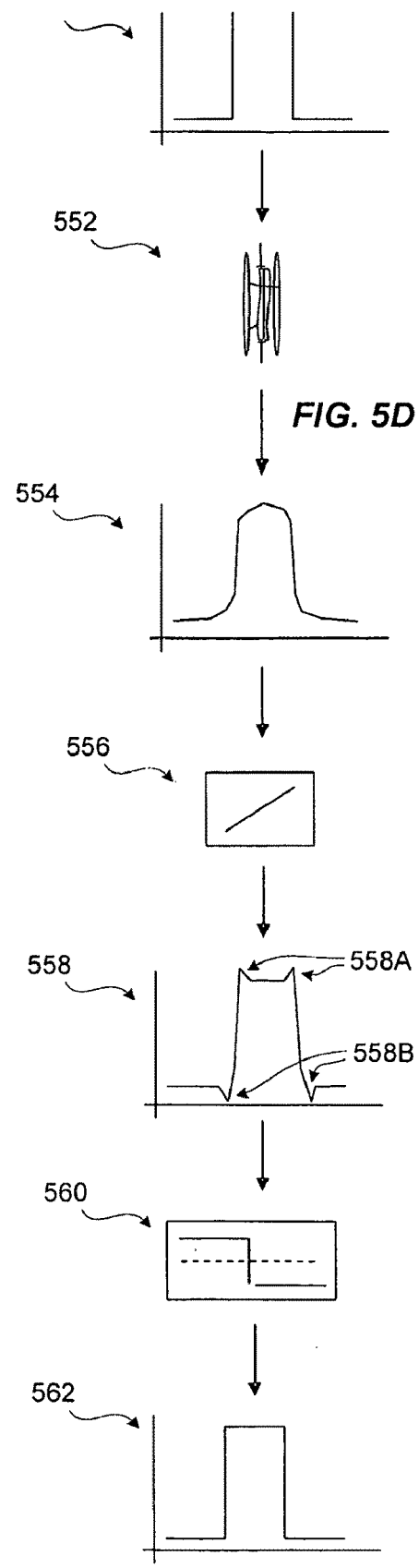

FIG. 10A
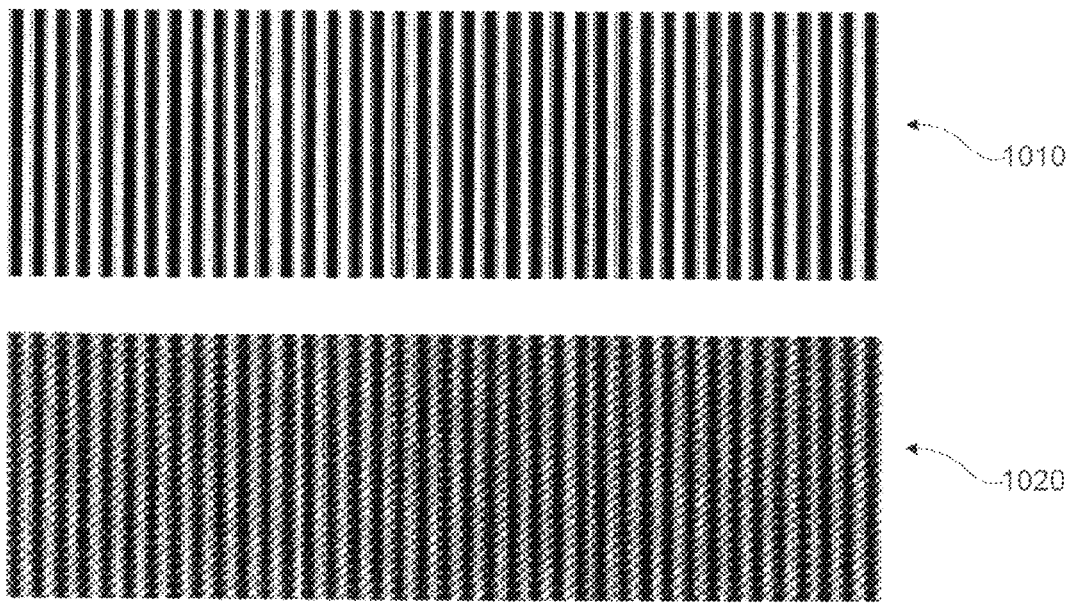
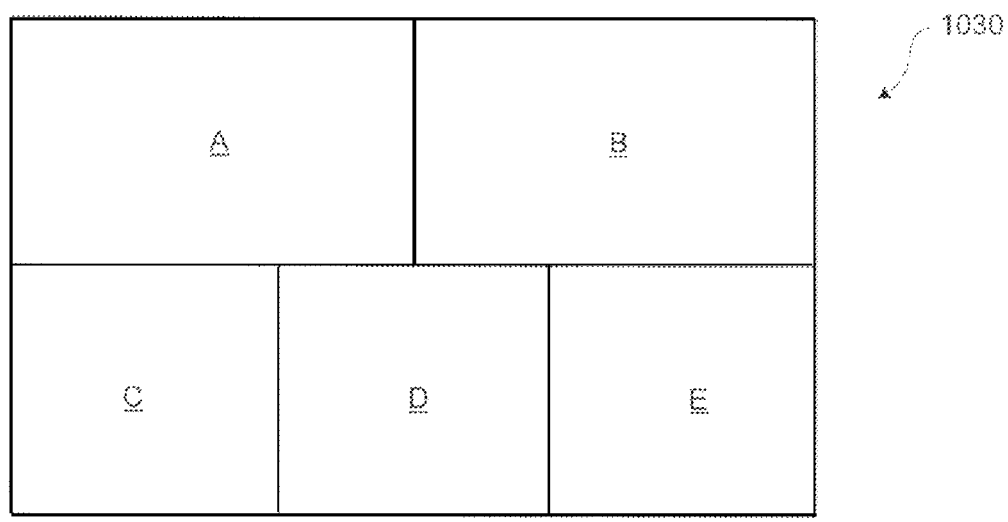
FIG. 10B

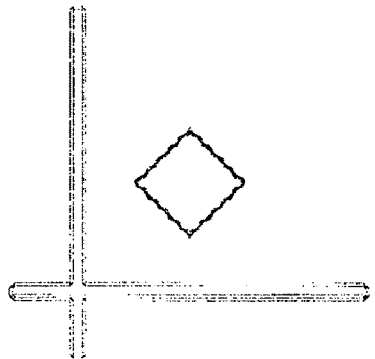 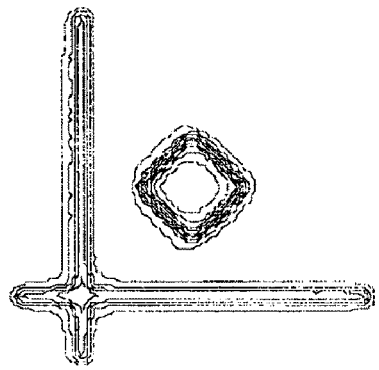
FIG. 30A                FIG. 30B
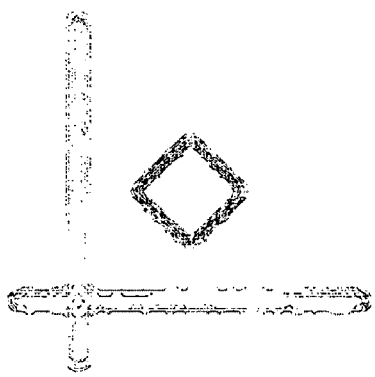 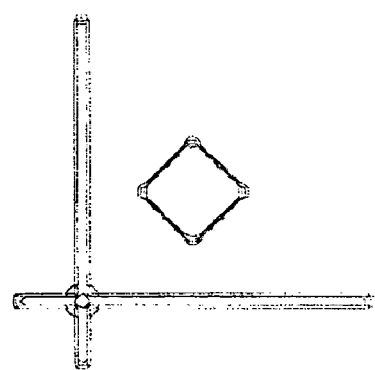
FIG. 30C                FIG. 30D

OPTICAL IMAGING SYSTEMS AND METHODS UTILIZING NONLINEAR AND/OR SPATIALLY VARYING IMAGE PROCESSING

CROSS-REFERENCE TO RELATED APPLICATIONS

This application claims priority to U.S. Provisional Patent Application No. 60/788,801, filed 3 Apr. 2006 and incorporated herein by reference.

BACKGROUND

Certain optical imaging systems image electromagnetic energy emitted by or reflected from an object through optics, capture a digital image of the object, and process the digital image to enhance image quality. Processing may require significant computational resources such as memory space and computing time to enhance image quality.

For human viewers, quality of an image is a subjective qualification of the properties of an image. For machine vision applications, quality of an image is related to a degree to which an image objectively facilitates performance of a task. Processing of electronic image data may improve image quality based either on subjective or objective factors. For example, human viewers may consider subjective factors such as sharpness, brightness, contrast, colorfulness, noisiness, discriminability, identifiability and naturalness. Sharpness describes the presence of fine detail; for example, a human viewer may expect to see individual blades of grass. Brightness describes overall lightness or darkness of an image; for example, a sunny outdoor scene is considered bright whereas a shadowed indoor scene is considered dark. Contrast describes a difference in lightness between lighter and darker regions of an image. Colorfulness describes intensity of hue of colors; for example, a gray color has no colorfulness, while a vivid red has high colorfulness. Noisiness describes a degree to which noise is present. Noise may be introduced, for instance, by an image detector (e.g., as fixed pattern noise, temporal noise, or as effects of defective pixels of the detector) or may be introduced by image manipulating algorithms (e.g., uniformity defects). Discriminability describes an ability to distinguish objects in an image from each other. Identifiability describes a degree to which an image or portion thereof conforms with a human viewer's association of the image or a similar image. Naturalness describes a degree to which an image or portions thereof match a human viewer's idealized memory of that image or portion; for example, green grass, blue skies and tan skin are considered more natural the closer that they are perceived to the idealized memory.

For machine vision applications, quality of an image is related to a degree to which an image is appropriate to a task to be performed. The quality of an image associated with a machine vision application may be related to a certain signal-to-noise ratio (SNR) and a probability of successfully completing a certain task. For example, in a package sorting system, images of packages may be utilized to identify the edges of each package to determine package sizes. If the sorting system is able to consistently identify packages, then a probability of success is high and therefore a SNR for edges in the utilized images is sufficient for performing the task. For iris recognition, specific spatial frequencies of features within an iris must be identified to support discrimination between irises. If an SNR for these spatial frequencies is insufficient, then an iris recognition algorithm may not function as desired.

SUMMARY

In an embodiment, an imaging system includes optics having one or more phase modifying elements that modify wavefront phase to introduce image attributes into an optical image. A detector converts the optical image to electronic data while maintaining the image attributes. A signal processor subdivides the electronic data into one or more data sets, classifies the data sets based at least on the image attributes, and independently processes the data sets to form processed electronic data.

In one embodiment, an imaging system includes optics having one or more phase modifying elements that modify wavefront phase to form an optical image. A detector converts the optical image to electronic data having one or more image attributes that are dependent on characteristics of the phase modifying elements and/or the detector. A signal processor subdivides the electronic data into one or more data sets, classifies the data sets based at least on the image attributes, and independently processes the data sets to form processed electronic data.

In one embodiment, an imaging system includes optics having one or more phase modifying elements that modify wavefront phase to predeterministically affect an optical image. A detector converts the optical image to electronic data. A digital signal processor subdivides the electronic data into one or more data sets and classifies the data sets, based at least in part on a priori knowledge about how the phase modifying elements modify the wavefront phase. The digital signal processor independently processes each of the data sets to form processed electronic data.

In one embodiment, an imaging system includes optics, including one or more phase modifying elements, that alter wavefront phase and produce an optical image with at least one known image attribute. A detector converts the optical image to electronic data that, while preserving the image attribute, is divisible into data sets. A digital signal processor determines at least one characteristic for each of the data sets and processes the data sets to modify the image attribute in a degree and manner that is independently adjustable for the data sets, to generate processed electronic data.

In one embodiment, an imaging system includes optics having one or more phase modifying elements that modify wavefront phase to introduce one or more image attributes into an optical image. A detector converts the optical image to electronic data while maintaining the image attributes. A digital signal processor determines one or more characteristics of the electronic data, and provides nonlinear processing of the electronic data to modify the image attribute and to form processed electronic data.

In one embodiment, an imaging system includes optics having one or more phase modifying elements that modify wavefront phase to introduce one or more image attributes into an optical image. A detector converts the optical image to electronic data while maintaining the image attributes. A digital signal processor subdivides the electronic data into one or more data sets, classifies the data sets, based at least on the image attributes, and independently and nonlinearly processes the data sets to form processed electronic data.

In one embodiment, a method for generating processed electronic data includes modifying phase of a wavefront from an object to introduce one or more image attributes into an optical image formed by an imaging system. The method includes converting the optical image to electronic data while maintaining the image attributes, subdividing the electronic data into one or more data sets, classifying the data sets based at least on the one or more image attributes, and independently processing the data sets to form processed electronic data.

A software product includes instructions stored on computer-readable media. The instructions, when executed by a computer, perform steps for processing electronic data generated by (a) modifying phase of a wavefront from an object to introduce one or more image attributes into an optical image formed by an imaging system and (b) converting the optical image to electronic data while maintaining the image attributes. The instructions include instructions for subdividing the electronic data into one or more data sets, classifying the data sets based at least on the image attributes, and independently processing the data sets to form the processed electronic data.

BRIEF DESCRIPTION OF DRAWINGS

FIG. 5A through 5E illustrate examples of nonlinear and/or spatially varying image processing.

FIG. 10A illustrates two objects.

FIG. 10B shows an image "key."

FIG. 30A through FIG. 30D illustrate operation of a pre-filter to remove blur while a nonlinear process removes remaining blur to form a further processed image.

-FIG. 36C is processed and converted back into RGB format.

-FIG. 36C is processed and converted back into RGB format, with the processing varied according to the lack of intensity information.

DETAILED DESCRIPTION OF DRAWINGS

Figure 1:
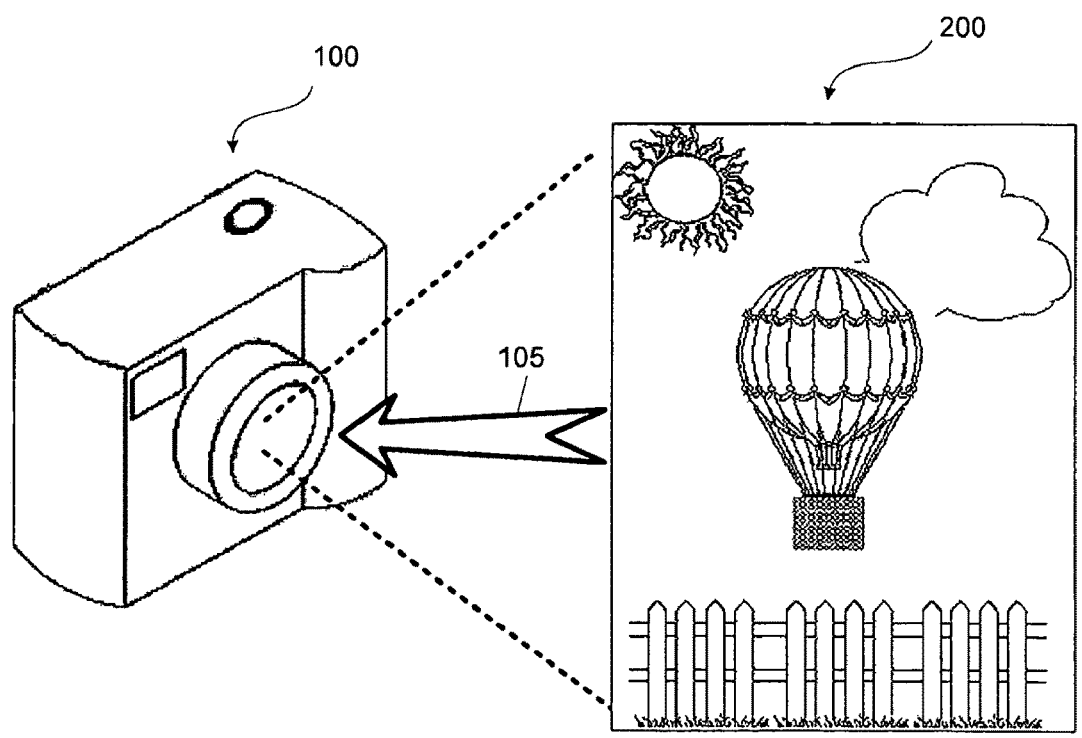
FIG. 1 shows an imaging system imaging electromagnetic energy emitted by, or reflected from, objects in an exemplary scene.

FIG. 1 shows an imaging system 100 imaging electromagnetic energy 105 emitted by, or reflected from, objects in an exemplary scene 200. Imaging system 100 includes optics and a detector that captures a digital image of scene 200 as electronic data; it may process the electronic data to enhance image quality in processed electronic data. Although imaging system 100 is represented in FIG. 1 as a digital camera, it may be understood that imaging system 100 may be included as part of a cell phone or other device. It is appreciated that system 100 may include components that cooperate with each other over a distance to perform the tasks of image capture and image processing, as explained below.

System 100 may be configured to improve quality of an image in processed electronic data by processing the electronic data in a spatially varying process. System 100 may also be configured to improve quality of an image by processing the electronic data in a nonlinear process, which may offer certain advantages over linear processing. System 100 may also be configured to improve quality of an image by processing the electronic data in a nonlinear and spatially varying process.

Figure 2:
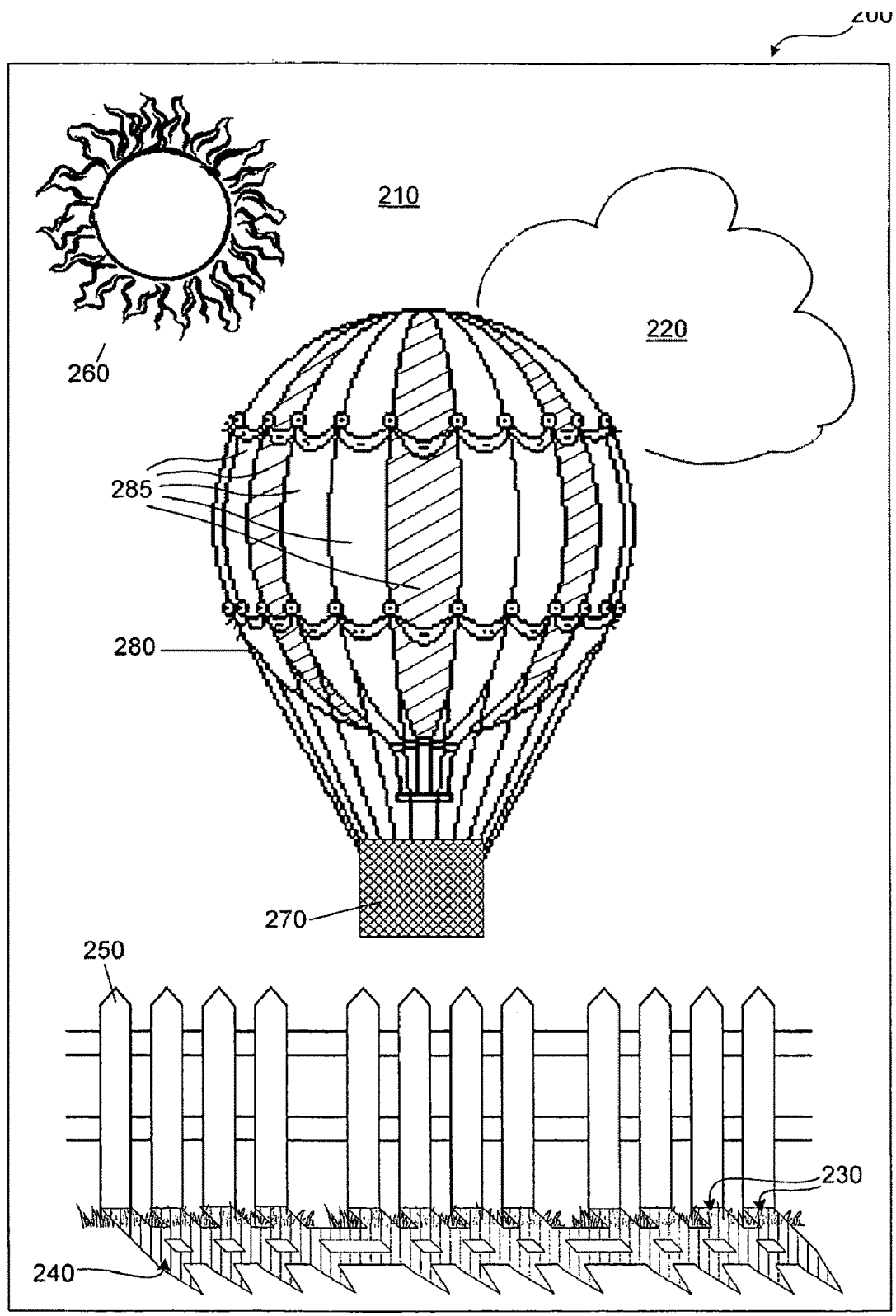
FIG. 2 shows an enlarged image of the scene of FIG. 1, to illustrate further details therein.

FIG. 2 shows an enlarged image of exemplary scene 200 to illustrate further details therein. Scene 200 is associated with raw electronic data having multiple image regions; each of these image regions has certain image characteristics and/or subspaces that may cause the image to benefit from nonlinear, spatially varying and/or optimized processing as described hereinbelow. Such image characteristics and/or subspaces may be divided into broad categories including signal, noise and spatial categories. The signal category may include image characteristics or subspace attributes such as color saturation, dynamic range, brightness and contrast. The noise category or subspace may include image characteristics such as fixed-pattern noise ("FPN"), random noise and defect pixels. The spatial category or subspace may include image characteristics such as sharpness of transitions and edges, aliasing, artifacts (e.g., ghosting), depth of field ("DOF") or range, texture and spatial detail (i.e., spatial frequency content). Other categorizations or subspace definitions are possible within the scope of this disclosure, and other or fewer image characteristics listed above may be within each category.

A number of the aforementioned image characteristics now are discussed in association with scene 200. For example, a sky area 210 of scene 200 has very little spatial detail; that is, such areas have mostly low spatial frequency content, little high spatial frequency content and low contrast. Clouds 220 may have only a small amount of spatial detail. Certain areas or objects in the scene have very high spatial detail but low contrast; that is, such areas have information at low through high spatial frequencies, but intensity differences with respect to a local background are low. For example, in scene 200, grass 230 that is in a shadow 240 cast by a fence 250 has high spatial detail but low contrast. Other areas or objects of scene 200 have very high spatial detail and very high contrast; that is, such areas have information throughout many spatial frequencies, and intensity differences with respect to local background are high. A sun 260 and a fence 250 in scene 200 are examples of high spatial frequency, high contrast areas. Still other areas or objects of scene 200 may saturate the detector; that is, intensity or color of such objects may exceed the detector's ability to differentiate among the intensities or colors present in the object. The center of sun 260 is one such object that may saturate the detector. Certain areas or objects, such as the checkerboard pattern of the weave of a basket 270 of a hot air balloon 280, have moderate amounts of spatial detail and low contrast; that is, such areas have information at low through moderate spatial frequencies, with low intensity differences with respect to local background. Scene 200 may be dark (e.g., image regions with low intensity information) if it is captured by system 100 at night. Still other regions of scene 200 may include regions that have similar levels of spatial detail as compared to each other, but may vary in color, such as color bands 285 of hot air balloon 280.

The aforementioned areas of a digital image of a scene (e.g., scene 200) may be processed by nonlinear and/or spatially varying methods discussed herein. Such processing may be performed instead of or in addition to global processing of images utilizing linear processing, which processes an entire image in a single fashion. For example, in the context of the present disclosure, global linear processing may be understood to mean the application of one or more linear mathematical functions applied unchangingly to an entire image. A linear mathematical operation may be defined as an operation that satisfies the additivity property (i.e., $f(x+y)=f(x)+f(y)$) and the homogeneity property (i.e., $f(\alpha x)=\alpha f(x)$ for all $\alpha$). For example, multiplication of all pixels by a constant value, and/or convolution of pixels with a filter kernel, are linear operations. Nonlinear operations are operations that do not satisfy at least one of the additive and homogeneity properties.

Due to large variations in the characteristics of many images, global linear processing may not produce an acceptable result in all areas of the image. For example, a linear global operation may operate upon image areas containing moderate spatial frequency information but may "overprocess" areas containing low or high spatial frequency information. "Overprocessing" occurs when a linear process applied to an entire image adds or removes spatial frequency information to the detriment of an image, for example according to a viewer's perception. Overprocessing may occur, for example, when a spatial frequency response of a linear process (e.g., a filter kernel) is not matched to an image characteristic of an area being processed. A spatially varying process is a process that is not applied to the entire set of pixels uniformly. Both linear and non-linear processes may be applied as a spatially varying process or spatially varying set of processes. The application of nonlinear and/or spatially varying image processing may lead to simplification of image processing since "smart" localized, possibly nonlinear, functions may be used in place of global linear functions to produce more desirable image quality for human perception, or objectively improved task specific results for task-based applications.

Figure 3:
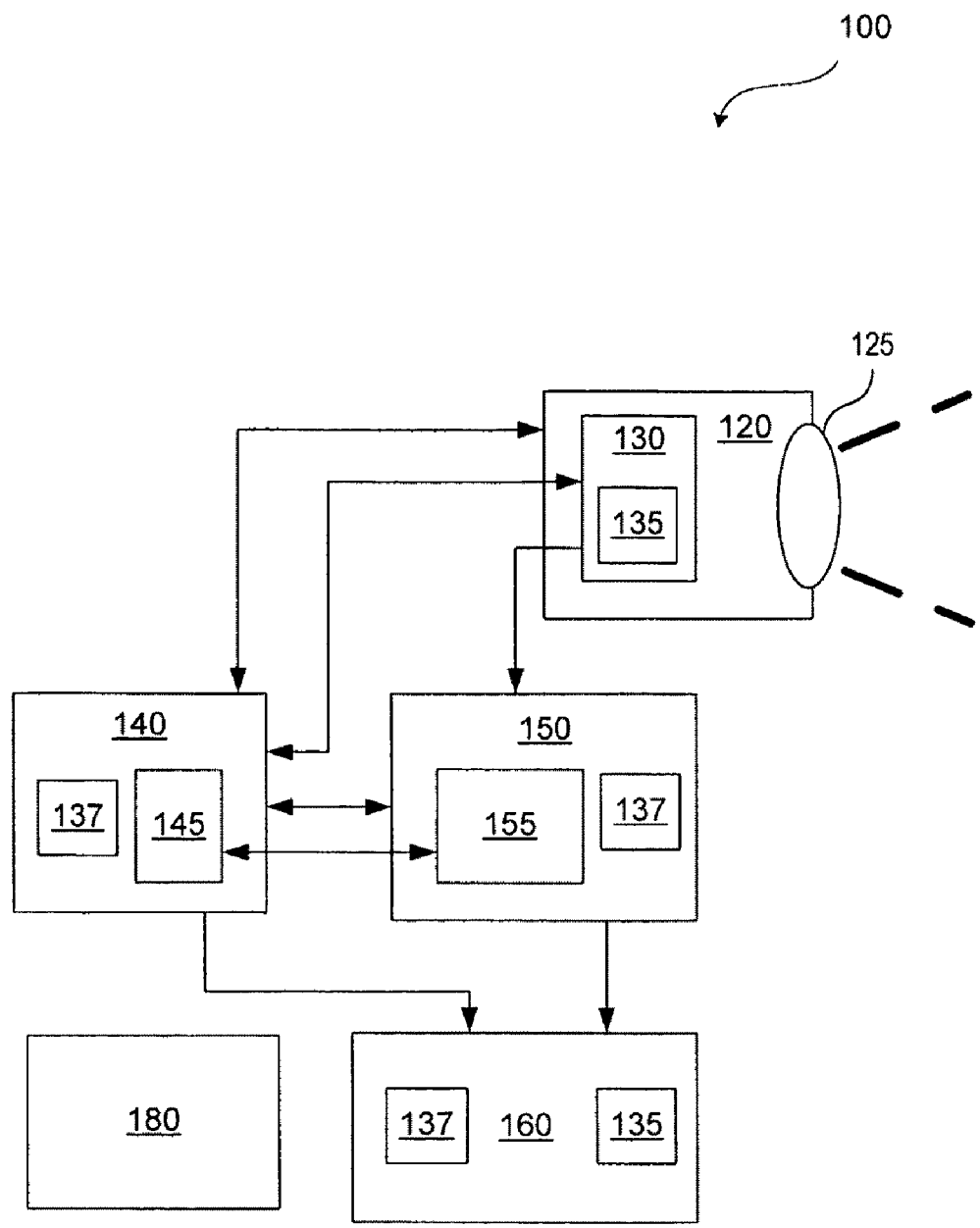
FIG. 3 shows exemplary components and connectivity of the imaging system of FIG. 1.

FIG. 3 shows exemplary components and connections of imaging system 100. Imaging system 100 includes an image capturing subsystem 120 having optics 125 and a detector 130 (e.g., a CCD or CMOS detector array) that generates electronic data 135 in response to an optical image formed thereon. Optics 125 may include one or more optical elements such as lenses and/or phase modifying elements, sometimes denoted as "wavefront coding ("WFC") elements" herein. Information regarding phase modifying elements and processing related thereto may be found in U.S. Pat. Nos. 5,748,371, 6,525,302, 6,842,297, 6,873,733, 6,911,638, 6,940,649, 7,115,849 and 7,180,673, and U.S. Published Patent Application No. 2005/0197809A1, each of which is incorporated by reference herein. The phase modifying elements modify wavefront phase to introduce image attributes such as a signal space, a null space, an interference subspace, spatial frequency content, resolution, color information, contrast modification and optical blur. Put another way, the phase modifying elements may modify wavefront phase to predeterministically affect an optical image formed by optics 125. A processor 140 executes under control of instructions stored as software 145. Imaging system 100 includes memory 150 that may include software storage 155; software stored in software storage 155 may be available to processor 140 as software 145 upon startup of system 100.

Software 145 generally includes information about image capturing subsystem 120, such as for example lens or phase function prescriptions, constants, tables or filters that may be utilized to tailor image acquisition or processing performed by system 100 to the physical features or capabilities of image capturing subsystem 120. It may also include algorithms, such as those described herein, that enhance image quality. Processor 140 interfaces with image capturing subsystem 120 to control the capture of electronic data 135; upon capture, electronic data 135 may transfer to processor 140 or to memory 150. Processor 140 and memory 150 thereafter cooperate to process electronic data 135 in various ways as described further herein, forming processed electronic data 137.

Processor 140 and memory 150 may take a variety of physical forms. The arrangement shown in FIG. 3 is illustrative, and does not represent a required physical configuration of the components; nor does it require that all such components be in a common physical location, be contained in a common housing or that the connections shown be physical connections such as wires or optical fiber. For example, processor 140 and memory 150 may be portions of a single application-specific integrated circuit ("ASIC") or they may be separate computer chips or multiple chips; they may be physically located in a device that includes image capturing subsystem 120 or in a separate device, with physical or wireless links forming certain of the connections shown in FIG. 3. Similarly, it is appreciated that actions performed by components of system 100 may or may not be separated in time, as discussed further below. For example, images may be acquired at one time, with processing occurring substantially later. Alternatively, processing may occur substantially in real time, for example so that a user can promptly review results of a processed image, enabling the user to modify image acquisition and/or processing parameters depending on the processed image.

Raw or processed electronic data may be transferred to an optional display device 160 for immediate display to a user of system 100. Additionally or alternatively, raw electronic data 135 or processed electronic data 137 may be retained in memory 150. Imaging system 100 may also include a power source 180 that connects as necessary to any of the other components of imaging system 100 (such connections are not shown in FIG. 3, for clarity of illustration).

An imaging system 100 typically includes at least some of the components shown in FIG. 3, but need not include all of them; for example an imaging system 100 might not include display device 160. Alternatively, an imaging system 100 might include multiples of the components shown in FIG. 3, such as multiple image capturing subsystems 120 that are optimized for specialized tasks, as described further herein. Furthermore, imaging system 100 may include features other than those shown herein such as, for example, external power connections and wired or wireless communication capabilities among components or to other systems.

Figure 4:
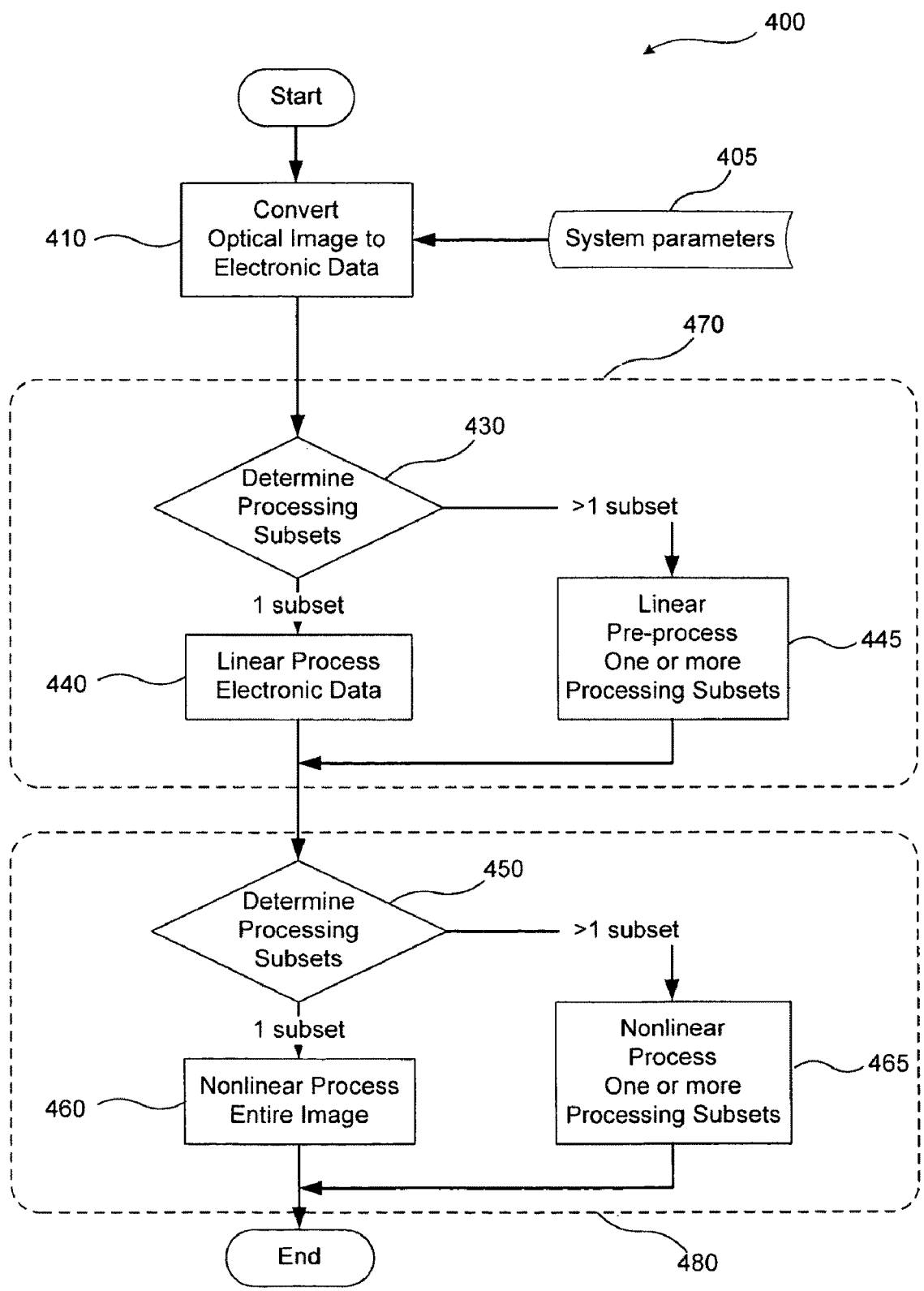
FIG. 4 is a flowchart of a process that may be performed by the imaging system of FIG. 1, in an embodiment.

FIG. 4 is a flowchart that shows a process 400 that may be performed by system 100 of FIG. 3. Step 410 converts an optical image to electronic data utilizing system parameters 405. Step 410 may be performed, for example, by optics 125 forming the optical image on detector 130, which in turn generates electronic data 135 in response to the optical image. System parameters 405 may include exposure times, aperture setting, zoom settings and other quantities associated with digital image capture. Step 430 determines data sets of the electronic data for linear processing, as described further below. Step 430 may be performed, for example, by processor 140 under the control of software 145; step 430 may utilize electronic data 135 or processed electronic data 137 (that is, step 430 and other processing steps herein may process electronic data as originally captured by a detector, or data that has already been processed in some way). Steps 440 or 445 perform linear processing or pre-processing of the electronic data or one or more data sets thereof, respectively, as determined by step 430. Steps 440 or 445 may be performed, for example, by processor 140 under the control of software 145, utilizing electronic data 135 or data sets thereof, respectively, as described further below. Step 450 determines data sets of the electronic data for nonlinear processing, as described further below. Step 450 may be performed, for example, by processor 140 under the control of software 145 and utilizing electronic data 135 or processed electronic data 137. Steps 460 or 465 perform nonlinear processing of electronic data 135, processed electronic data 137 or one or more data sets thereof, respectively, as determined by step 450. Steps 460 or 465 may be performed, for example, by processor 140 under the control of software 145, utilizing electronic data 135 or data sets thereof, respectively, as described further below. Steps 430, 440 and 445 may be considered as a linear processing section 470, and steps 450, 460 and 465 may be considered as a nonlinear processing section 480; processing sections 470 and 480 may be performed in any order and/or number of times in process 400. Furthermore, successive execution of processing sections 470 and 480 need not determine the same data sets as a first execution of sections 470 and 480; for example, a scene may first be divided into data sets based on color information and linearly processed accordingly, then divided into different data sets based on intensity information and linearly processed accordingly, then divided into different data sets based on contrast information and nonlinearly processed accordingly. When no further processing is needed, process 400 ends.

Figures 5A, 5B:
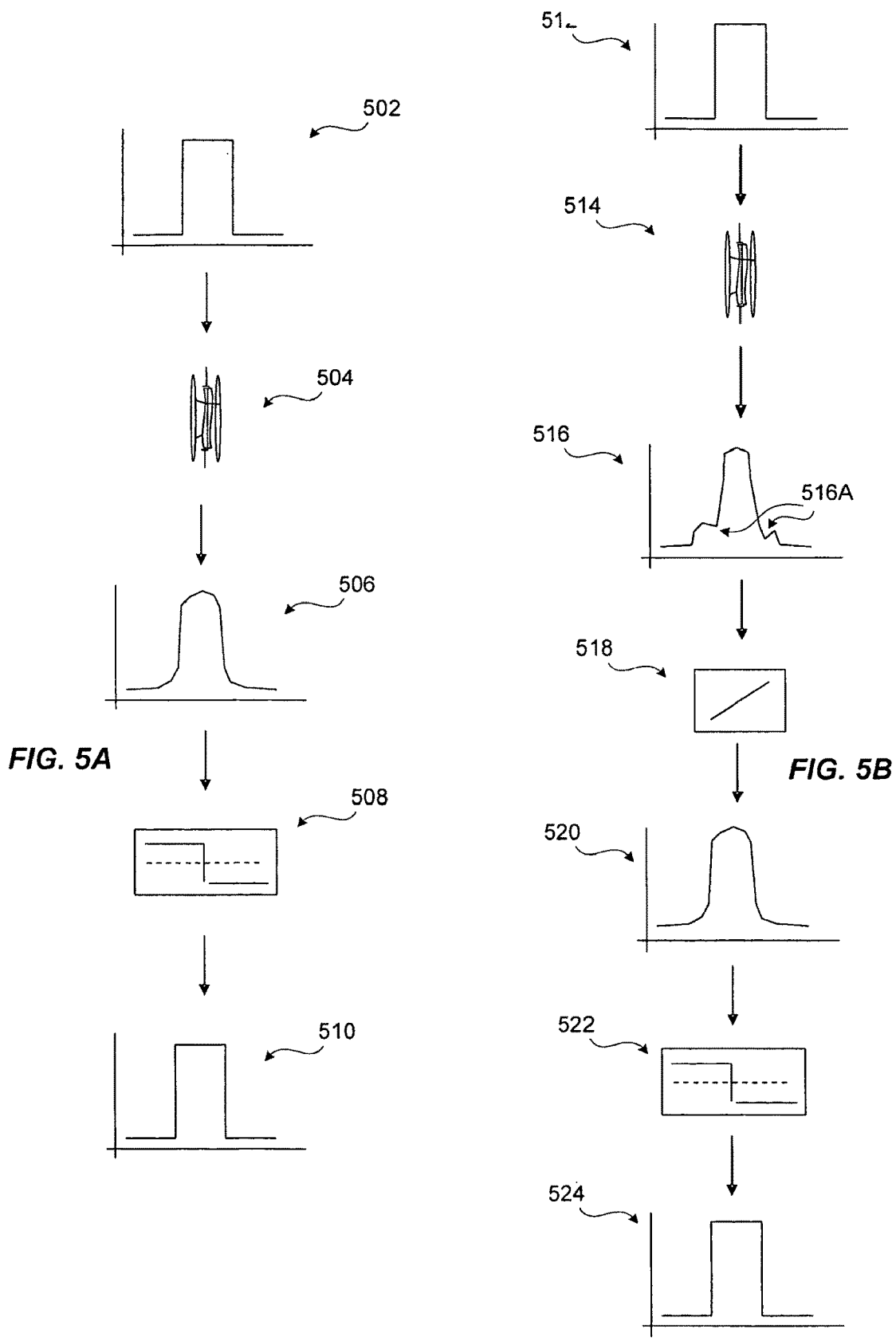

FIG. 5A through 5E illustrate examples of nonlinear and/or spatially varying image processing in accord with process 400, FIG. 4, through a set of icons that depict aspects of each example such as (a) input electromagnetic energy from an object, (b) optics, (c) electronic data and (d) processing representations. FIG. 5F illustrates specific changes in linescans that may be provided by different classes of phase-modifying optics (see FIG. 11 for an explanation of linescans). In particular, FIG. 5A illustrates nonlinear processing with wavefront coding ("WFC") optics. Optics (e.g., optics 125, FIG. 3) for a system utilizing processing as shown in FIG. 5A are for example designed such that electronic data formed from an optical image (e.g., electronic data 135, FIG. 3) is suited to a particular type of nonlinear and/or spatially varying processing. In one example, the optics and processing are jointly optimized in a process that forms a figure of merit based on both the optics design and the signal processing design. In FIG. 5A, icon 502 represents a spatial intensity linescan of electromagnetic energy emanating from an object as a square wave; that is, an object that forms a single perfect step function such as a black object against a white background or vice versa. Icon 504 represents specially designed WFC optics. Icon 506 represents a linescan from electronic data formed from an optical image of the object represented by icon 502. Due to limitations of optics and a detector, the linescan from the electronic data does not have the vertical sides or sharp corners as shown in icon 502; rather, the sides are not vertical and the corners are rounded. However, the linescan from the electronic data is "smooth" and does not include additional "structure" as may sometimes be found in electronic data generated by WFC optics, such as for example oscillations or inflection points at transitions. In this context, "smooth" is understood to mean a linescan that varies substantially monotonically in response to an edge in an object being imaged, rather than a linescan that has added "structure," such as oscillations, at abrupt transitions (see also FIG. 5F). Icon 508 represents nonlinear processing of the electronic data. Icon 510 represents a linescan from electronic data formed by the nonlinear processing, and shows restoration of the vertical sides and sharp corners as seen in icon 502.

FIG. 5B illustrates nonlinear processing, linear pre-processing and WFC optics. In FIG. 5B, linear pre-processing generates partially processed electronic data that is suited to a nonlinear processing step. In FIG. 5B, icon 512 represents a spatial intensity linescan of electromagnetic energy emanating from an object as a square wave. Icon 514 represents WFC optics. Icon 516 represents a linescan from electronic data formed from an optical image of the object represented by icon 512. The electronic data represented by icon 516 has additional structure as compared to icon 506, such as inflection points 516A, which may be due to effects of the WFC optics. Icon 518 represents a linear processing step (e.g., a linear convolution of the electronic data represented by icon 516, with a filter kernel). Processing represented by icon 518 may sometimes be referred to as "pre-processing" or a "prefilter" herein. Icon 520 represents a linescan from electronic data formed by the linear processing represented by icon 518; the electronic data represented by icon 520 does not have the additional structure noted in icon 516. Icon 522 represents nonlinear processing of the electronic data represented in icon 520. Icon 524 represents a linescan from electronic data formed by the nonlinear processing, and shows restoration of the vertical sides and sharp corners as seen in icon 512.

FIG. 5C illustrates nonlinear processing, linear pre-processing and specialized WFC optics. In FIG. 5C, optics (e.g., optics 125, FIG. 3) are designed to code a wavefront of electromagnetic energy forming the image in a customizable way such that linear pre-processing of captured data (e.g., electronic data 135, FIG. 3) generates partially processed electronic data that is suited to a nonlinear processing step. Utilizing customizable wavefront coding and linear pre-processing may reduce processing resources (e.g., digital signal processor complexity and/or time and/or power required for processing) required by system 100 to produce electronic data. In FIG. 5C, icon 530 represents a spatial intensity linescan of electromagnetic energy emanating from an object as a square wave. Icon 532 represents WFC optics that code a wavefront of electromagnetic energy in a customizable way. Icon 534 represents a linescan from electronic data formed from an optical image of the object represented by icon 530. The electronic data represented by icon 534 is smooth and contains minimal additional structure. Icon 536 represents a linear processing step (e.g., a linear convolution of the electronic data represented by icon 534, with a filter kernel). The linear processing represented by icon 536 may for example be a moderately aggressive filter that tends to sharpen edges but is not so aggressive so as to add overshoot or undershoot to the edges; processing represented by icon 536 may also sometimes be referred to as "pre-processing" or "prefiltering" herein. Icon 538 represents a linescan from electronic data formed by the linear processing represented by icon 536 that is improved over the electronic data noted in icon 534, but does not have the vertical sides and sharp corners associated with the object represented by icon 530. Icon 540 represents nonlinear processing of the data represented in icon 538. Icon 542 represents a linescan from electronic data formed by the nonlinear processing, and shows restoration of the vertical sides and sharp corners as seen in icon 530.

FIG. 5D illustrates another example of nonlinear processing, linear pre-processing and specialized WFC optics. Like FIG. 5C, in FIG. 5D optics (e.g., optics 125, FIG. 3) code a wavefront of electromagnetic energy forming the image in a customizable way such that linear pre-processing of captured data (e.g., electronic data 135, FIG. 3) generates partially processed electronic data that is suited to a nonlinear processing step. Customizable wavefront coding and linear pre-processing again reduces processing resources required by system 100 to produce electronic data. In FIG. 5D, icon 550 represents a spatial intensity linescan of electromagnetic energy emanating from an object as a square wave. Icon 552 represents WFC optics that code a wavefront of electromagnetic energy in a customizable way. Icon 554 represents a linescan from electronic data formed from an optical image of the object represented by icon 550. The electronic data represented by icon 554 is smooth and contains minimal additional structure. Icon 556 represents a linear processing step utilizing an aggressive filter that sharpens edges and adds overshoot and undershoot—that is, pixel values above and below local maxima and minima, respectively—to the edges. Processing represented by icon 556 may also sometimes be referred to as "pre-processing" or "prefiltering" herein. Icon 558 represents a linescan from electronic data formed by the linear processing represented by icon 556; it has steep sides and overshoot 558A and undershoot 558B at edges. Icon 560 represents nonlinear processing of the data represented in icon 558, to eliminate overshoot and undershoot as further described below. Icon 562 represents a linescan from electronic data formed by the nonlinear processing, and shows restoration of the vertical sides and sharp corners as seen in icon 530, without the overshoot and undershoot of icon 558.

Figure 5E:
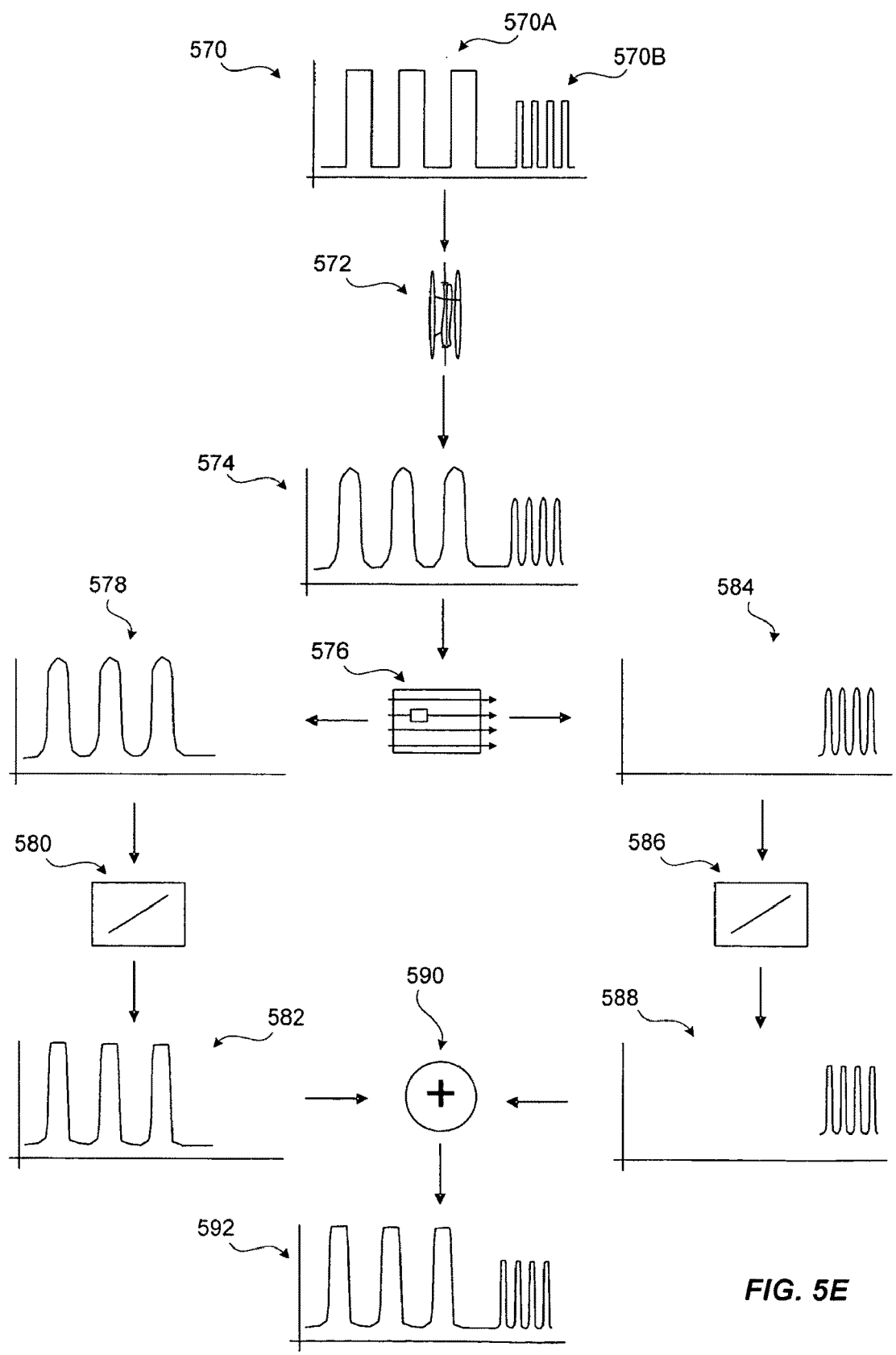
Figure 5F:
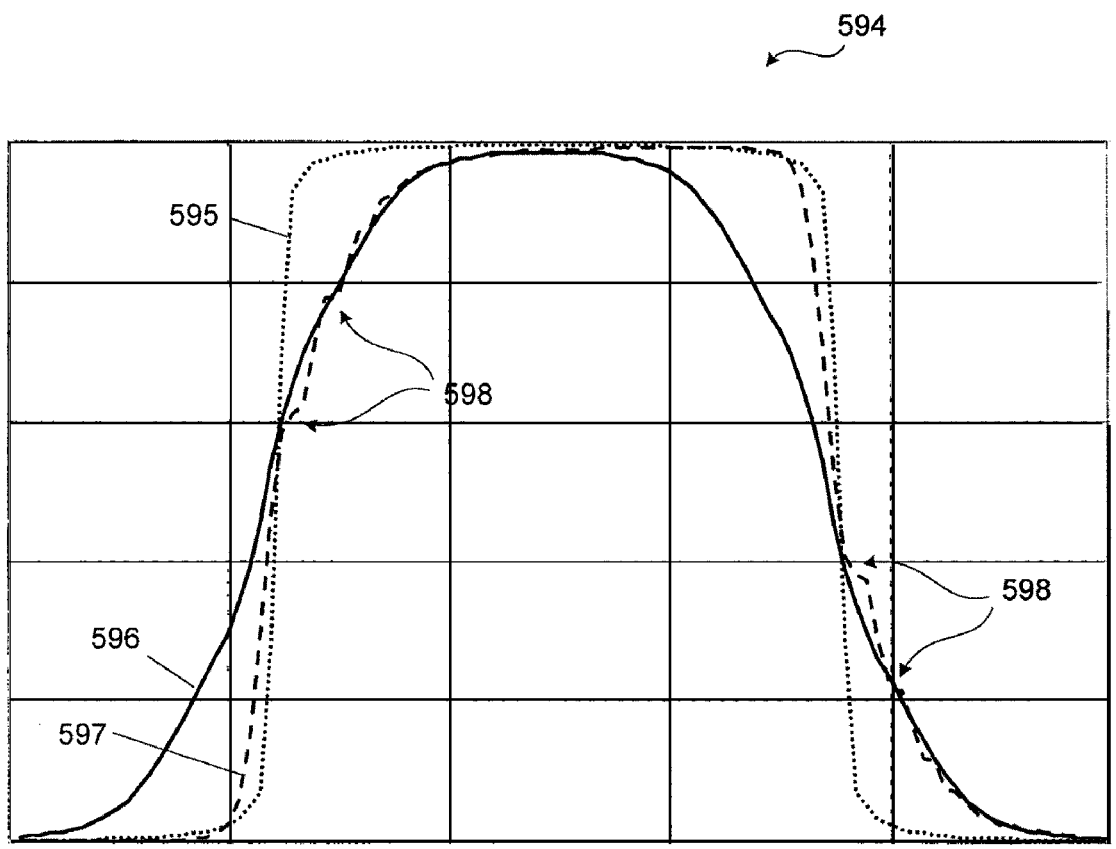
FIG. 5F shows a plot of linescans from a hypothetical imaging system.

FIG. 5E illustrates spatially varying processing and WFC optics. In FIG. 5E, spatially varying processing generates processed electronic data that emphasizes differing dominant spatial frequency content as it occurs in differing regions of a captured image. In FIG. 5E, icon 570 represents a spatial intensity linescan of electromagnetic energy emanating from an object as a square wave; one spatial region 570a of the object has dominant content at a lower spatial frequency while another spatial region 570b has dominant content at a higher spatial frequency. Icon 572 represents WFC optics. Icon 574 represents a linescan from electronic data formed from an optical image of the object represented by icon 570. The electronic data represented by icon 574 has rounded corners which may be due to effects of the WFC optics. Icon 576 represents a process that identifies spatial frequency content of an image and splits the image into data sets that are dependent on the content, as described further below. Icons 578 and 584 represent linescans from data sets of the electronic data, corresponding to the regions with lower and higher spatial frequency content respectively. Icons 580 and 586 represent linear processing steps (e.g., linear convolutions of the electronic data represented by icons 578 and 584, with respective filter kernels). Icons 582 and 588 represent linescans from electronic data formed by the linear processing associated with icons 580 and 586. The electronic data for each of the data sets has been sharpened with a filter tailored to its specific spatial frequency content. Icon 590 represents merging the data represented by icons 582 and 588. Icon 592 represents a linescan from electronic data formed by the merging operation; although the data does not have vertical edges and perfectly sharp corners, additional (nonlinear) processing may take place either before or after the merging step represented by icon 590 to further improve the quality of the image.

FIG. 5F shows a plot 594 of linescans from a hypothetical imaging system. As in FIG. 5A-FIG. 5D, an object (not shown) that produces the linescans shown in plot 594 is characterized by a step function amplitude variation; that is, it has vertical sides. Linescan 595 represents data from an imaging system utilizing no wavefront coding; linescan 596 represents data from an imaging system utilizing cosine function-based wavefront coding; and linescan 597 represents data from an imaging system utilizing cubic function-based wavefront coding. Linescan 595 shows "smoothing" of the object shape due to optics of the system without wavefront coding. Linescan 596 shows even more "smoothing" due to the cosine wavefront coding function. Linescan 597 shows more structure, indicated as kinks and steps at locations 598, than either linescan 595 or linescan 596, due to the cubic wavefront coding function (only obvious instances of structure at locations 598 are labeled in FIG. 5F, for clarity of illustration). Added structure may make processing more complicated, and/or may lead to unintended results (e.g., structure may be "misunderstood" by a processor as part of an image, as opposed to an artifact introduced by optics). Therefore, processing of electronic data may benefit from modifications that remove or modify structure generated by imaging with optics that utilize wavefront coding.

Spatially Varying Processing I—Region Identification

Processing of a scene (e.g., scene 200) may segment raw or processed electronic data associated with the scene in accordance with a defined set of pixels, with a boundary of an object that exists in the digital image of the scene, or with characteristics present in regions of a digital image of the scene. That is, spatially varying, or content-optimized, processing bases decisions about processing to be employed on information present in electronic data of an optical image being processed. The following discussion relates to ways in which the information in the electronic data is utilized to decide what processing will be employed.

Figure 6:
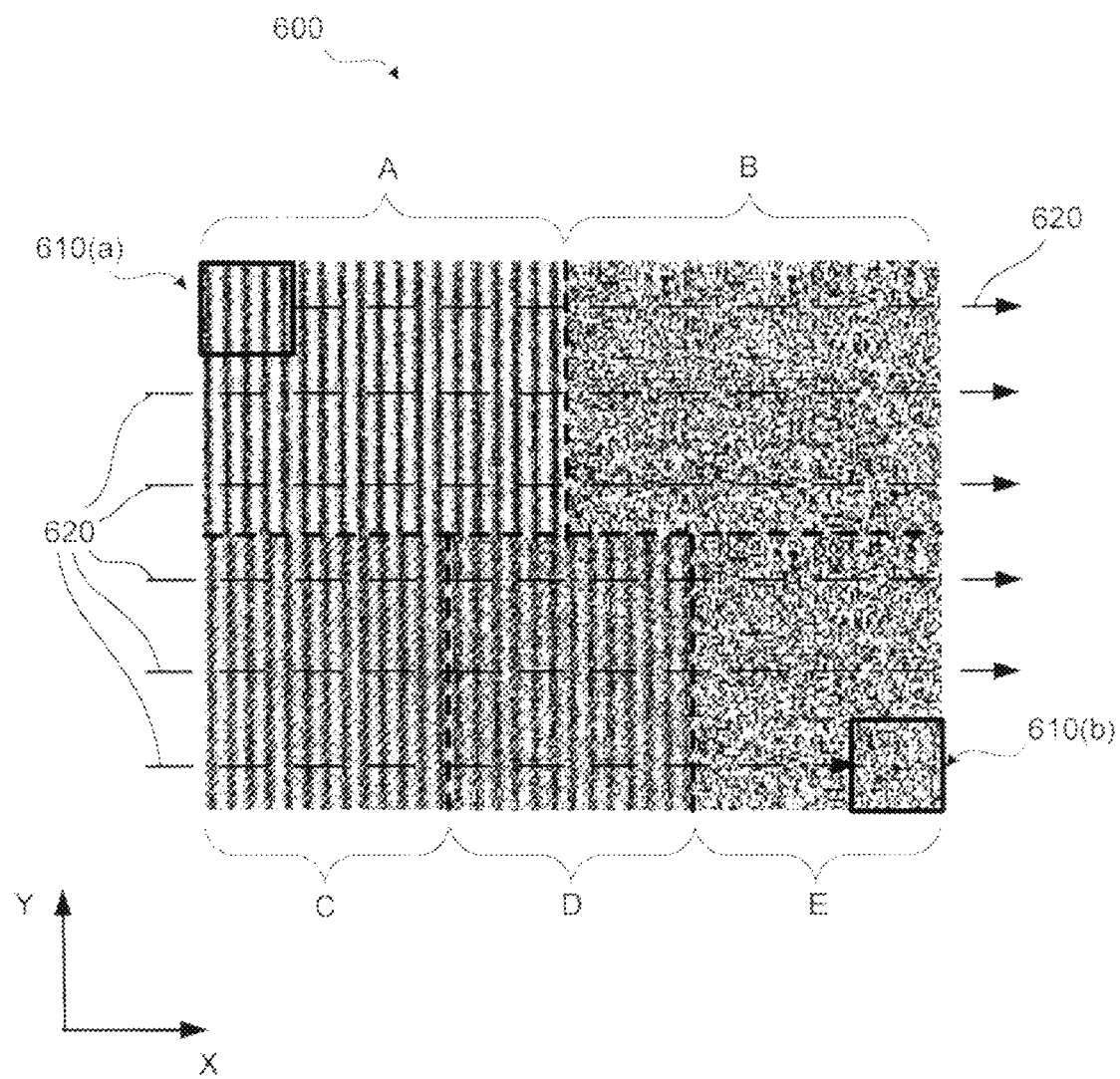
FIG. 6 shows an image of an object that includes regions that may be identified as having differing characteristics.

FIG. 6 shows an image 600 of an object that includes regions labeled A, B, C, D and E, respectively, each of which has a different characteristic. Image 600 exists in the form of electronic data in a system 100 (for example, after detector 130, FIG. 3, converts electromagnetic energy from the object into the electronic data 135). An identification subset 610, shown as subset 610(a) and 610(b) as explained below, can be utilized to evaluate image 600 and determine regions therein that have differing characteristics that might benefit from one particular form or degree of processing. Identification subset 610 is a selected set of image pixels that "moves" over image 600 in the direction of arrows 620. That is, identification subset 610 may first select the pixels contained in subset 610(a) and process these pixels to evaluate image content such as, but not limited to, power content by spatial frequency, presence of edges, presence of colors and so forth. Information related to the characteristics found in subset 610(a) may be associated with the location of subset 610(a) within image 600, and optionally stored for further use. Another location is then chosen as a new identification subset 610. As shown by arrows 620, each such location may be processed to evaluate characteristics such as power content by spatial frequency, presence of edges, presence of colors and so forth. Relative locations at which identification subsets 600 are chosen may be selected according to a level of resolution desired for identification of characteristics in image 600; for example, identification subsets 610 may overlap in each of the X and Y axes as shown in FIG. 6, or subsets 610 may abut each other, or subsets 610 may be spaced apart from each other (e.g., such that the area of image 600 is only sampled rather than fully analyzed).

Once a final identification subset 610, shown for example as subset 610(b) in image 600, is processed, characteristics of the subsets 610 thus sampled are utilized to identify regions of image 600 that have similar characteristics. Regions that have similar characteristics are then segmented, that is defined as data sets for specific processing based on the similar characteristics. For example, as discussed further below, if the processing of identification subsets 610 detects spatial frequencies that are prominent within certain regions of an object, further processing may generate a filter that removes blurring from only those spatial frequencies. When image 600 is processed as described above, identification subsets that sample region A may detect power at a horizontal spatial frequency related to the vertical lines visible in section A. Identification subsets that sample region B may also detect power at the same spatial frequency, but depending on parameters of the identifying algorithm may not select the spatial frequency for processing because power at the dominant spatial frequency is comparable to noise present in region B. Identification subsets that sample region C may detect power at two horizontal and one vertical spatial frequencies. Identification subsets that sample region D may detect power associated with at least the same horizontal spatial frequency as identified in region A, but may not detect the second horizontal spatial frequency and the vertical spatial frequency due to the high noise content of region D. Identification subsets that sample region E may detect power at the same horizontal spatial frequency as identified in regions A and C, but may not detect the secondary horizontal and vertical spatial frequencies and may even fail to detect the main horizontal spatial frequency due to the high noise content of region E.

This process of rastering a square identification subset through an image (along an X-Y grid to segment and identify data sets with common characteristics) may be accomplished in different ways. For example, the identification subset need not be square but may be of another shape, and may move through the image along any path that provides sampling of the image, rather than the raster scan described. The identification subset need not be a contiguous selection of electronic data; it may be a single element of the electronic data or one or more subsets thereof; it may be sparse, and may also be a mapping or indexing of independent, individual elements of the electronic data. Furthermore, sampling may be optimized to find features of potential interest quickly, so as to spend further processing resources adding detail to the features of interest. For example, a sparse sample of an image may first be processed as initial identification subsets, and further identification subsets may be processed only in areas where the characteristics of the initial identification subsets suggest image content of interest (e.g., processing resources may thereby be concentrated on a lower part of a landscape image that has features, as opposed to an upper part of the same image where initial identification subsets reveal only a featureless blue).

Electronic data may be generated by a detector as an entire image (which may be called "a full frame" herein) or may be generated in blocks that are less than the entire image. It may be buffered and temporarily stored. Processing of the electronic data may occur sequentially or in parallel with the reading, buffering and/or storing of the electronic data. Thus, not all electronic data has to be read prior to processing; neither does all electronic data have to be "identified" into data sets prior to processing. It may be advantageous for Fourier and wavelet processing techniques to read electronic data as a full frame, and then to process the entire image at one time. For processing techniques that may use subsets of the data, it may be advantageous to read in blocks that are less than full frames, and subsequently process the data sets in parallel or in series.

Figure 7A:
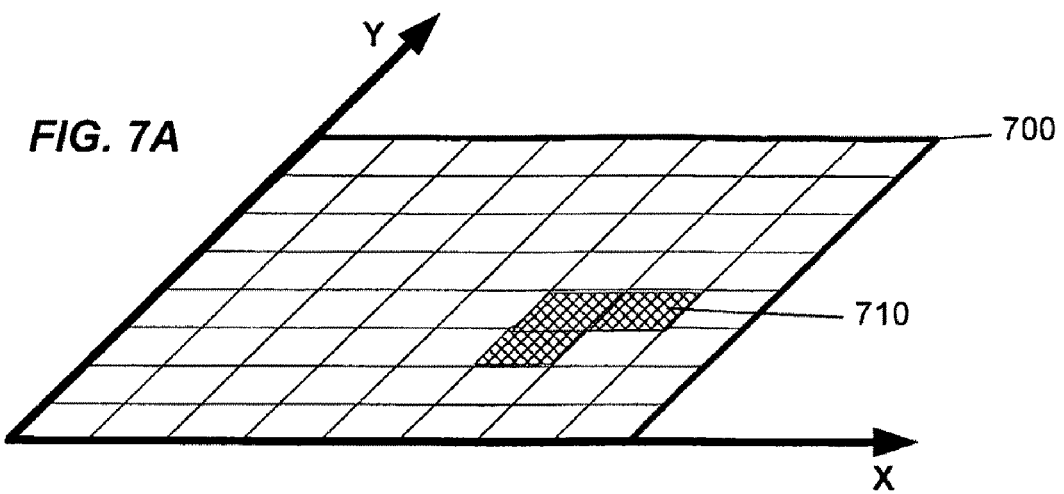
FIGS. 7A, 7B and 7C illustrate three approaches to segmentation of an image based upon defined sets of pixels.
Figure 7B:
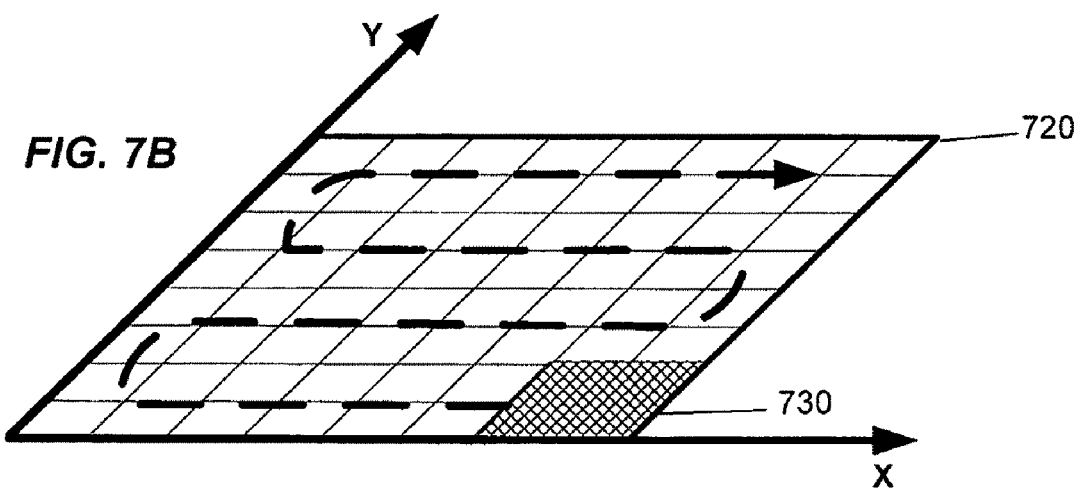
Figure 7C:
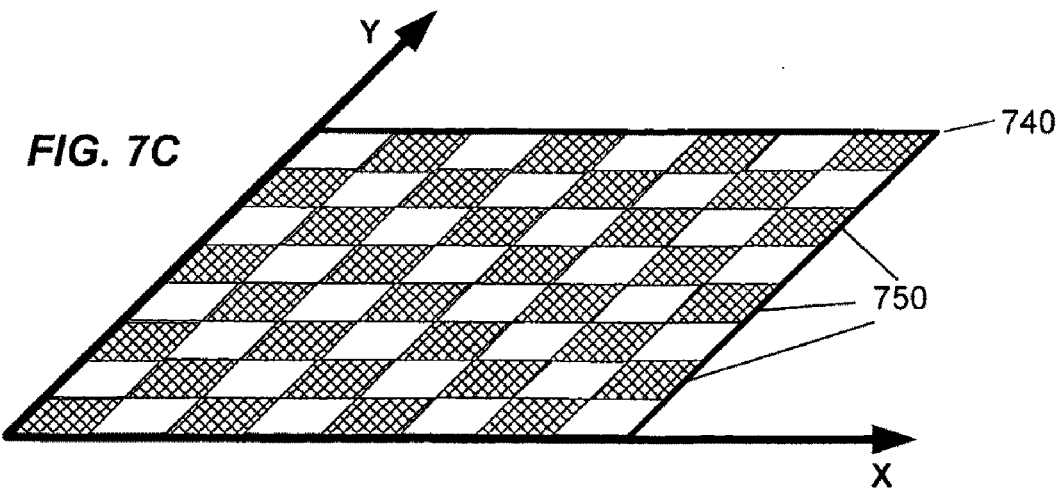

FIGS. 7A, 7B and 7C further illustrate three approaches to segmentation of an image based upon defined sets of pixels. In FIG. 7A, a plane 700 shows an irregular block 710 of three pixels that is at a fixed location in plane 700. Block 710, for example, may be a result of segmentation of a saturated region (see for example FIG. 8A and FIG. 8B). Alternatively, a user may define a fixed set of pixels like block 710 as a region of interest for processing. For example, electronic data in corners of a rectangular or square shaped image may be processed differently than electronic data in a central region due to variation in desired performance or image quality in the corners compared to the center of the image. Electronic data in regions of a rectangular or an arbitrarily shaped image may be processed differently than electronic data in other regions of the image due to predeterministic variations in the optical image content, where the variation in image content is dictated or controlled by a predeterministic phase modification, illumination conditions, or uniform or nonuniform sampling structure or attributes of the sampling that vary across the image.

FIG. 7B shows a plane 720 with a 2×2 pixel block 730 that may be scanned in a raster-like fashion across the entire set of pixels included in plane 720 (e.g., pixel block 730 may be considered as an example of identification subset 610, FIG. 6). Scanning of pixel blocks may be utilized to identify segments that may benefit from specific processing; that is, the processing varies spatially according to image content, as further discussed below. In FIG. 7C, a plane 740 shows evenly spaced selected pixels 750, represented by hatched areas (for clarity, not all selected pixels are labeled). Non-contiguous pixels 750 may be selected by sampling, for example utilizing 50% sampling as shown, or may be selected utilizing Fourier or wavelet decomposition. Such samplings may for example provide information at certain spatial frequencies for an entire image or for portions thereof. Segments may alternatively be formed from square N×N blocks of pixels or from irregular, sparse, contiguous or discontinuous blocks of pixels, or individual samples of the electronic data. For example, finding a minimum or maximum value in electronic data of an image is an example of using 1×1 sized blocks or individual samples as an identification subset.

Although shown as specific numbers of pixels, pixels or pixel blocks 710, 730 and 750 may include a different number of pixels, from one to the entire size of an image or an image set (e.g., up to a size of each image frame, multiplied by a number of frames in an image set). Segments do not have to be square or rectangular convex polygons (e.g., pixel block 730) but may be concave polygons (e.g., pixel block 710) or sparse samplings. Furthermore, a segment containing more than a single pixel may be further modified by weighting or further subsampling of the pixels within that segment, such as described below in connection with FIG. 9A-FIG. 9C.

Segmentation may be based upon boundaries of objects that exist in a digital image of a scene. For example, the Sobel, Prewitt, Roberts, Laplacian of Gaussian, zero cross, and Canny methods may be utilized to identify edges of objects. Template matching, textures, contours, boundary snakes, and data flow models may also be used for segmentation.

Figure 8A:
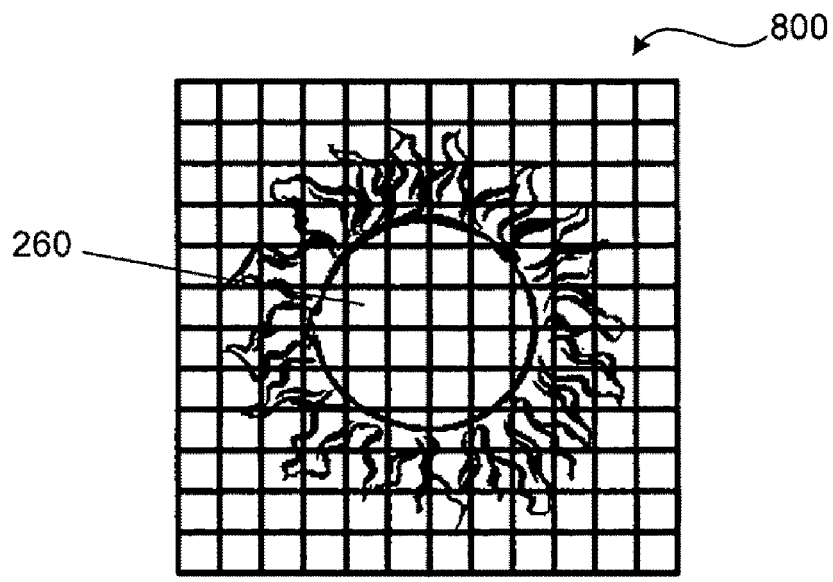
FIG. 8A shows an object from the scene of FIG. 2 superimposed onto a set of pixels.
Figure 8B:
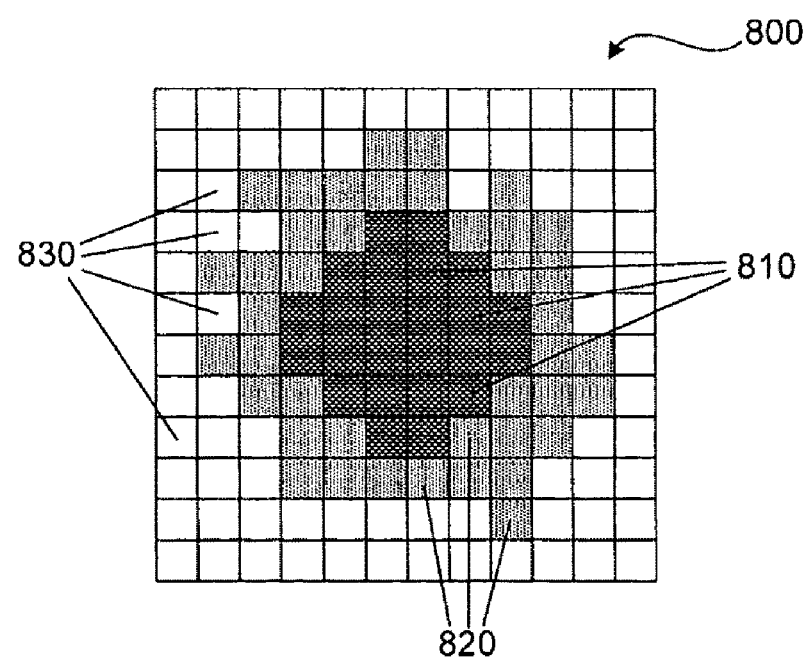
FIG. 8B shows the pixels of FIG. 8A segregated into data sets according to thresholding of the object shown in FIG. 8A.

Segmentation may also be performed on the basis of characteristics such as intensity or color. FIG. 8A shows an object (sun 260 from scene 200, FIG. 2) superimposed onto a set of pixels 800. In this example, a thresholding operation is applied to values of each of pixels 800 to form data sets. A three level thresholding operation is for example used to form the data sets by dividing pixels 800 into data sets having three different intensity levels. FIG. 8B shows pixels 800 segregated into data sets according to thresholding of sun 260 as shown in FIG. 8A. A first data set, shown by densely hatched pixels 810, may include all pixels with values over 200 counts. A second data set, shown by lightly hatched pixels 820, may include all pixels with values between 100 and 200 counts. A third data set, shown by white pixels 830, may include all pixels with values less than 100 counts. Alternatively, by further applying one of the edge detection algorithms listed above, or another edge detection algorithm, boundaries of sun 260 may be determined.

Segmentation and/or weighting may also be performed in accordance with characteristics of a detector, optics, a wavefront coding element, and/or an image. With regard to the image, segmentation may be based upon boundaries of an imaged object, or the image's color, texture or noise characteristics. With regard to the detector, segmentation may be based upon a periodicity of FPN of the detector, or in relation to aliasing artifacts. With regard to a wavefront coding element and optics, segmentation may be based upon stray light issues, ghosting, and/or a practical extent of a point spread function ("PSF") of the imaging system. For example, when optics provide known stray light or ghosting patterns, knowledge of such patterns may be utilized as a basis for segmentation or weighting.

Figure 9A:
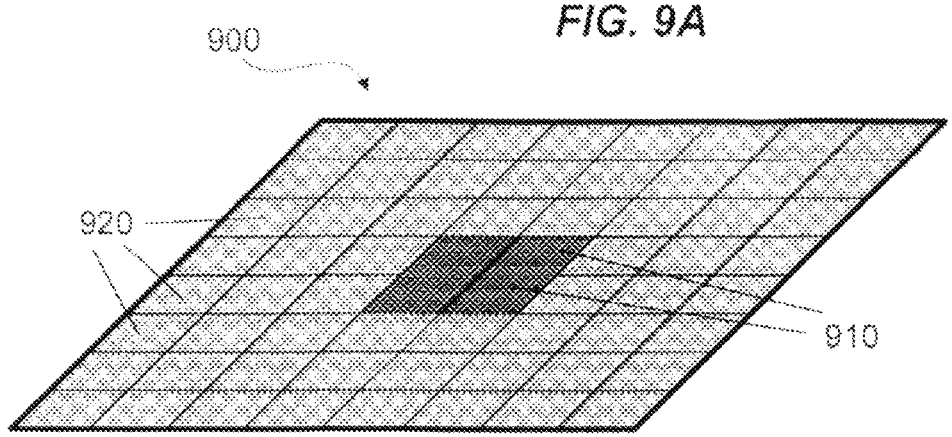
FIGS. 9A, 9B and 9C illustrate pixel blocks that are weighted or segmented.
Figure 9B:
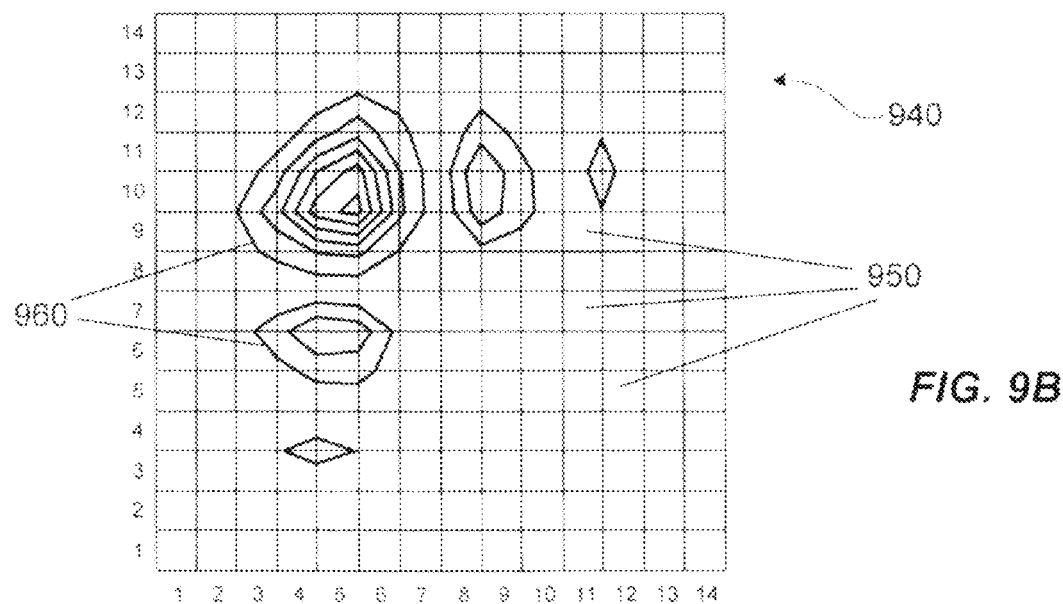
Figure 9C:
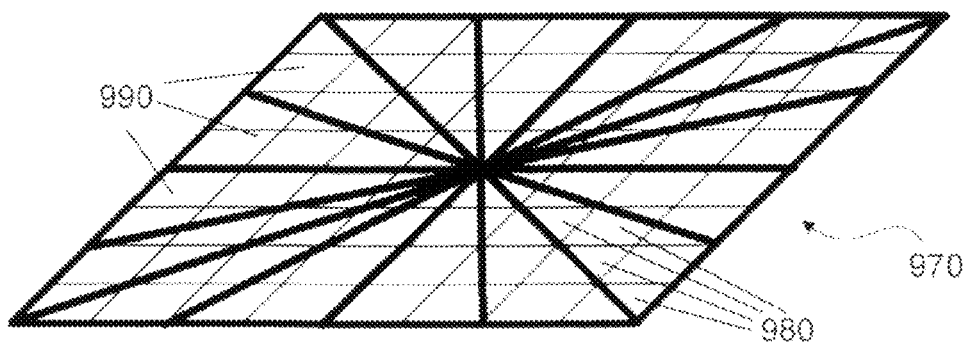

FIGS. 9A, 9B and 9C illustrate pixel blocks that are weighted or segmented. In FIG. 9A, pixel block 900 includes an 8×8 array of pixels. A center 2×2 block of pixels 910 (represented as densely hatched pixels) is weighted with a value of 1.0, with all other pixels 920 (represented as lightly hatched pixels) weighted with a value of 0.5. Pixel block 900 may correspond, for example, to block 730, FIG. 7B; this weighting is synonymous with selecting a window shape for segmenting a region. Other window shapes that may be utilized include rectangular, Gaussian, Hamming, triangular, etc. Windows may not be restricted to closed contours. A weighting of pixels such as shown in FIG. 9A may be useful for weighting pixels based upon proximity to a central pixel of a pixel block. Alternatively, pixel weights may vary in a Gaussian-like form with a normalized value of 1.0 at a central pixel or vertex and decreasing to zero at a boundary of the pixel block. Such weighting may reduce "blocking" artifacts wherein identification subsets define sharp boundaries that are processed accordingly. In FIG. 9B, pixel block 940 is a 14×14 block of pixels 950 that includes 95% or more of an integrated intensity of a PSF of an optical system, as represented by contour lines 960. Since a PSF may not equal exactly zero at a particular place, contour lines 960 indicate arbitrary levels of magnitude in the PSF, and segmentation or weighting of pixels 950 may be based on such levels. In FIG. 9C, pixel block 970 shows segmentation of pixels 980 (square areas bounded by lighter lines) into a plurality of polar or radial segments 990 (wedges bounded by heavier lines). Polar segmentation may be useful when working with images that contain radially organized features, such as images of irises. Segmentation may also be based upon the "directionality" of an image or set of images. Directionality may include "directions of motion" in time, space, contrast, color, etc. For example, in a series of related images, segmentation may be based upon motion of an object, in space and/or time, as recorded in the series of images. Segmentation of an image based upon a direction of motion of color may include segmenting an image based upon the spatially vary hue in an image (e.g., an image of the sky may vary from a reddish color near the horizon to a bluish color near the zenith, and the image may be segmented with respect to this variation).

Spatially Varying Processing—Processing Determination

An example of determining processing from regions of an input image, such as may be used in spatially varying processing, is now discussed. FIG. 10A shows two objects 1010 and 1020 that each include dark vertical lines; object 1020 also includes light gray diagonal lines. FIG. 10B shows an image "key" 1030 having five image sections A through E, with image regions A and B falling within an upper part of key 1030 and image sections C, D, E falling within a lower part of key 1030.

Figure 11:
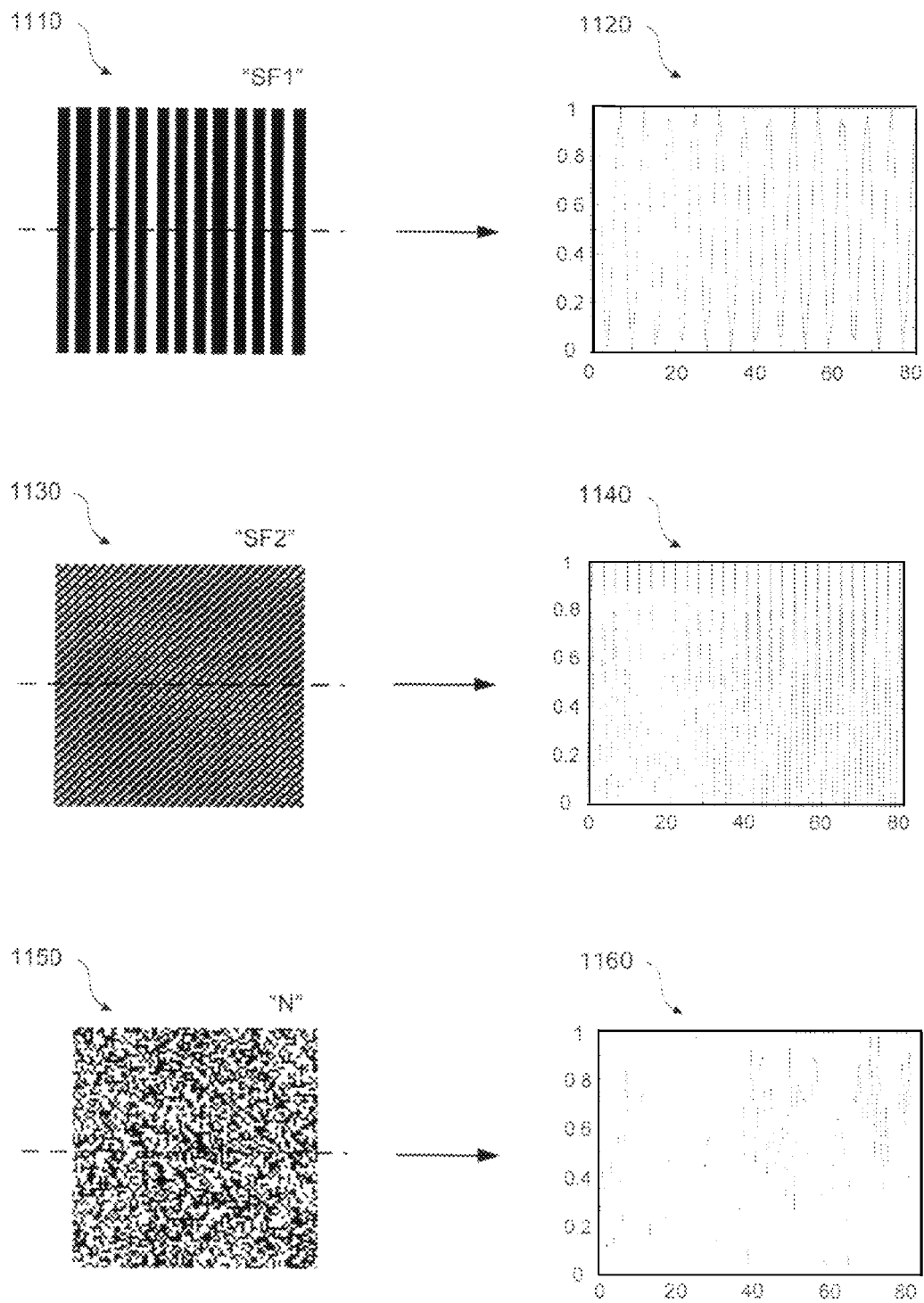
FIG. 11 illustrates how line plots may be utilized to represent optical intensity and/or electronic data magnitude as a function of spatial location.

An optical system including WFC optics and a plurality of detectors images objects 1010 and 1020. The WFC optics introduce effects that extend the depth of field but may be processed out of electronic data to varying degrees to render a processed image; in particular, a degree to which the effects are altered may be based on characteristics present in the image(s) obtained therewith. In this example, the system includes a plurality of detectors that affect the captured images (although it is appreciated that effects similar to those described below could be produced by varying, for example, lighting of objects 1010 and 1020). A detector that images object 1010 introduces relatively low noise in image section A Electronic data of objects may be expressed mathematically as an appropriate sum of spatial frequency information and noise, for example spatial frequencies SF1, SF2 and noise N as shown in FIG. 11. Detected electronic data may also be expressed as a convolution of object data with a point spread function ("PSF") of WFC optics, and summed with the N data weighted according to whether a section is imaged with a detector that adds low noise, moderate noise or extreme noise. Alternatively, an amplitude of the signals may be decreased (e.g., due to decreased illumination) while detector noise remains constant. Processed electronic data may be expressed as a convolution of the detected electronic data with a filter that reverses effects such as the PSF of the WFC optics, and/or sharpens spatial frequencies that characterize the detected electronic data, as described further below. Therefore, given the above description of electronic data present in sections A through E of image 600, formulas describing the object, detected electronic data, and processed electronic data are summarized in Table 1 below.

TABLE 1

Mathematical expressions for signal frequency information and noise of an example

| Image region | Object electronic data | Detected electronic data | Processed electronic data |
|---|---|---|---|
| A | 1 * SF1 + 0 * SF2 | ((1 * SF1 + 0 * SF2)**PSF) + 0.5 * N | (((1 * SF1 + 0 * SF2)**PSF) + 0.5 * N) **Filter(a) |
| B | 1 * SF1 + 0 * SF2 | ((1 * SF1 + 0 * SF2)**PSF) + 10 * N | (((1 * SF1 + 0 * SF2)**PSF) + 10 * N) **Filter(b) |
| C | 1 * SF1 + 1 * SF2 | ((1 * SF1 + 1 * SF2)**PSF) + 0.5 * N | (((1 * SF1 + 1 * SF2)**PSF) + 0.5 * N) **Filter(c) |
| D | 1 * SF1 + 1 * SF2 | ((1 * SF1 + 1 * SF2)**PSF) + 1 * N | (((1 * SF1 + 1 * SF2)**PSF) + 1 * N) **Filter(d) |
| E | 1 * SF1 + 1 * SF2 | ((1 * SF1 + 1 * SF2)**PSF) + 10 * N | (((1 * SF1 + 1 * SF2)**PSF) + 10 * N) **Filter(e) | where * denotes multiplication and **denotes convolution.

shown in key 1030. Another detector introduces extreme noise in image section B. A detector that images object 1020 introduces low noise in image section C, moderate noise in image section D, and extreme noise in image section E. Resulting detected electronic data, without processing, of objects 1010 and 1020 is illustrated as image 600, FIG. 6.

Line plots demonstrating optical intensity and/or electronic data intensity are useful in understanding the processing of image 600. FIG. 11 illustrates how line plots (also sometimes called "linescans" herein) may be utilized to represent optical intensity and/or electronic data magnitude as a function of spatial location. Heavy bars at a first spatial frequency "SF1," as shown in image 1110, produce wide peaks and valleys in a corresponding line plot 1120 of optical intensity along the dashed line in image 1110. Narrower bars at a second spatial frequency "SF2," as shown in image 1130, produce correspondingly narrow peaks and valleys in a corresponding line plot 1120. Random noise "N," as shown in image 1150, produces an erratic line plot 1140. It is appreciated that when a line plot is utilized in connection with an optical image, the vertical axis corresponds with intensity of electromagnetic energy that is present at a specific spatial location. Similarly, when a line plot is utilized in connection with electronic data, the vertical axis corresponds with a digital value of intensity or color information present within the electronic data, such as for example generated by a detector.

Nonlinear and/or spatially varying processing may render a processed image resembling an original image up to a point where noise overwhelms the signal, such that processing does not separate the signal from the noise. In the above example, signal processing detects spatial frequencies that are prominent within the object, for example by utilizing identification subsets as described in connection with FIG. 6. Next, the processing generates a filter that processes the data for only the spatial frequencies identified in each data set. Processing of each data set proceeds through the data sets, one at a time. After one data set is processed, the next subset in turn may be processed. Alternatively, processing may occur in a raster fashion or in another suitable sequence, as also described in connection with FIG. 6.

Figure 12:
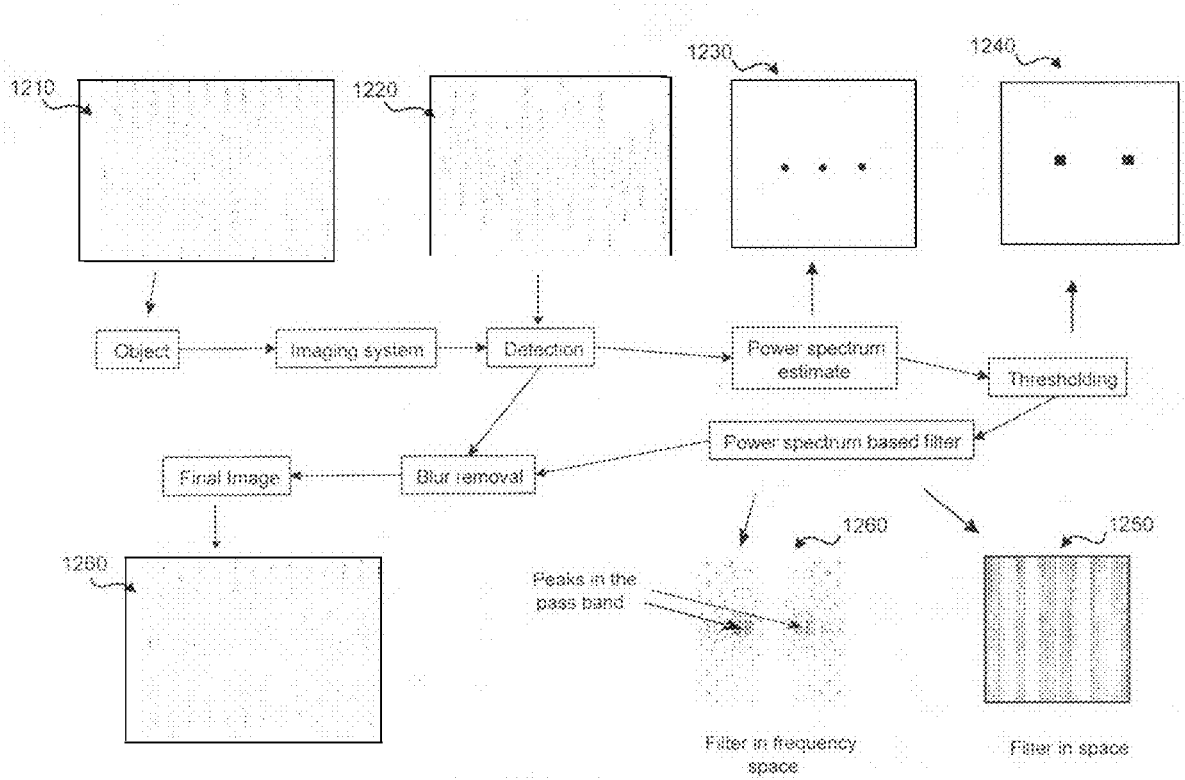
FIG. 12 illustrates processing electronic data that falls within one of the regions shown in FIG. 6.

FIG. 12A illustrates a process that is appropriate for processing electronic data that falls within region A of FIG. 6. Object 1010, FIG. 10A, which forms data represented in box 1210, is imaged from region A. A detector imaging region A adds noise, producing the electronic data represented in box 1220. For each identification subset processed within region A, a power spectrum estimate is formed by performing a Fourier transform of the detected electronic data. Box 1230 illustrates peaks found in the Fourier transformed data from region A, with horizontal spatial frequencies increasing along a horizontal axis and vertical spatial frequencies increasing along a vertical axis (horizontal and vertical referring to corresponding directions in FIG. 12 when held so that text thereof reads normally). Three dots forming a horizontal line are visible in this box. The central dot corresponds to a DC component, that is, power at zero horizontal and vertical spatial frequency; this component is always present and may be ignored in further processing. The dots to the left and right of the central dot correspond to positive and negative spatial frequency values pursuant to the spacing of vertical lines in the object; that is, the left and right dots correspond to spatial frequencies±SF1. Next, dominant spatial frequencies are determined by analyzing the power spectrum estimate and establishing a threshold such that only the dominant spatial frequencies exceed the threshold. As seen in box 1240, power spectrum information below the threshold is discarded so that only peaks at the dominant spatial frequencies remain. Next, the process builds an appropriate filter 1260 that sharpens the dominant spatial frequencies (filter 1260 is shown in frequency space, though it may be visualized in spatial terms, as in box 1250). Therefore, filter 1260 processes the electronic data for the dominant spatial frequencies. Filter 1260 has identifiable features that correspond to the dominant spatial frequencies in the power spectrum estimate. Finally, filter 1260 is applied to the detected image, resulting in a processed image represented by a linescan in box 1270. Filter 1260 may be applied directly in the frequency domain or, alternatively, box 1250 may be applied in the spatial domain. It may be appreciated that after processing the data in box 1260 closely resembles the data in box 1210.

Figure 13:
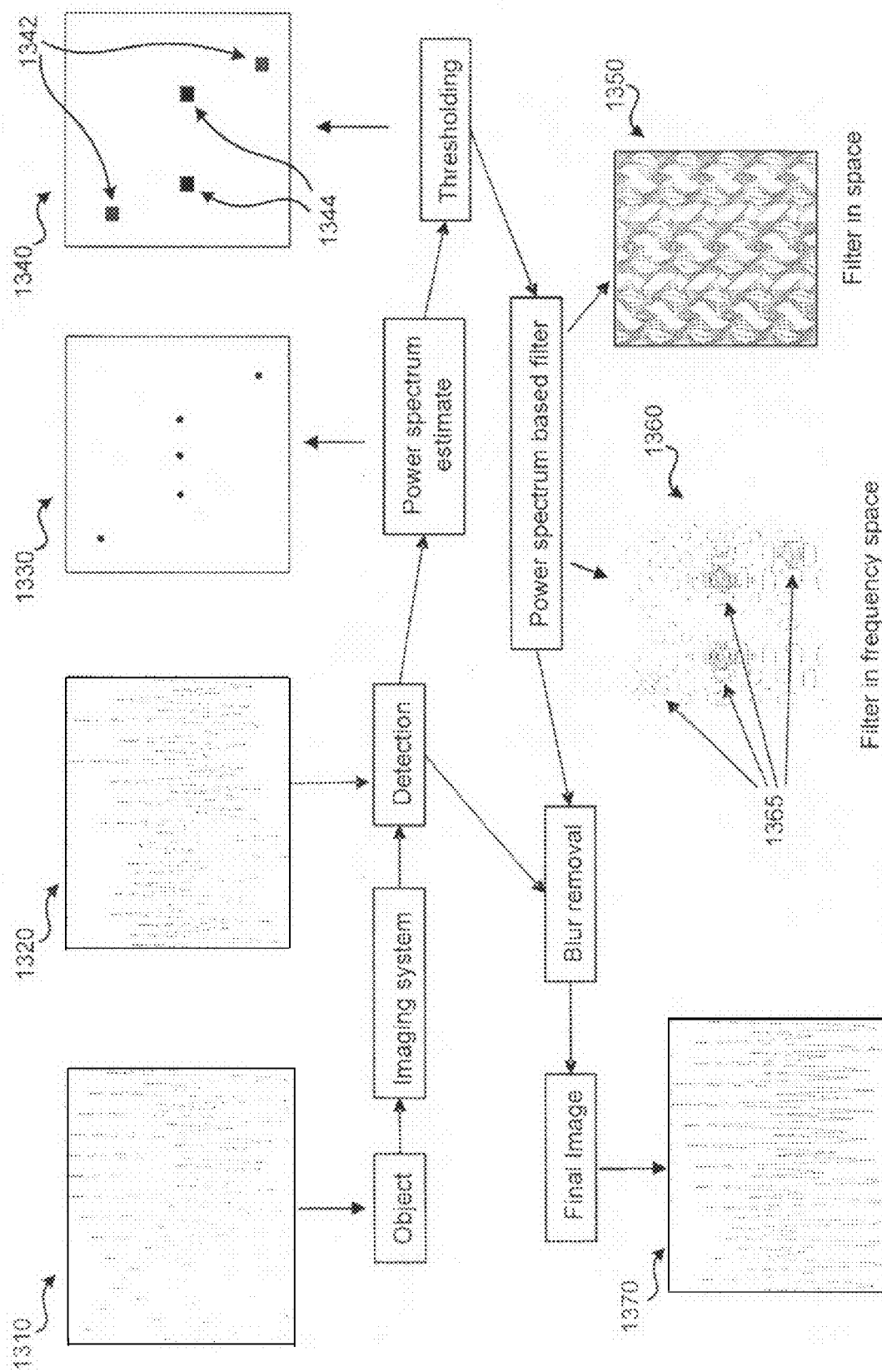
FIG. 13 illustrates processing electronic data that falls within another of the regions shown in FIG. 6.

FIG. 13 illustrates a process that is appropriate for processing electronic data that falls within region C of FIG. 6. Steps used in the processing for region C are the same as for region A described above, but the different spatial frequency information of the object being imaged creates a different result. Object 1020, FIG. 10A, which forms data represented in box 1310, is imaged from region C. A detector imaging region C introduces the same amount of noise as the detector imaging region A, and forms data as represented in box 1320. However, the presence of diagonal lines in object 1020 results in region C having significant power in both vertical and horizontal spatial frequencies. Therefore, compared to the result obtained for image region A, the same process for region C forms additional peaks in a power spectrum estimate shown in box 1330. These peaks may be preserved when a threshold is established, as shown in box 1340. Specifically, peaks 1344 correspond to spatial frequencies that have values of ±SF1 in the horizontal direction and zero in the vertical direction, and peaks 1342 correspond to spatial frequencies that have values of ±SF2 in each of the horizontal and vertical directions. Consequently, a filter 1360 formed from such information exhibits features 1365 at the corresponding spatial frequencies. Filter 1360 is also shown in spatial terms in box 1350. A linescan representation 1370 of processed electronic data formed for region C shows that the processed electronic data corresponds closely to the original object data; that is, much of the noise added in the detection step has been successfully removed.

Figure 14:
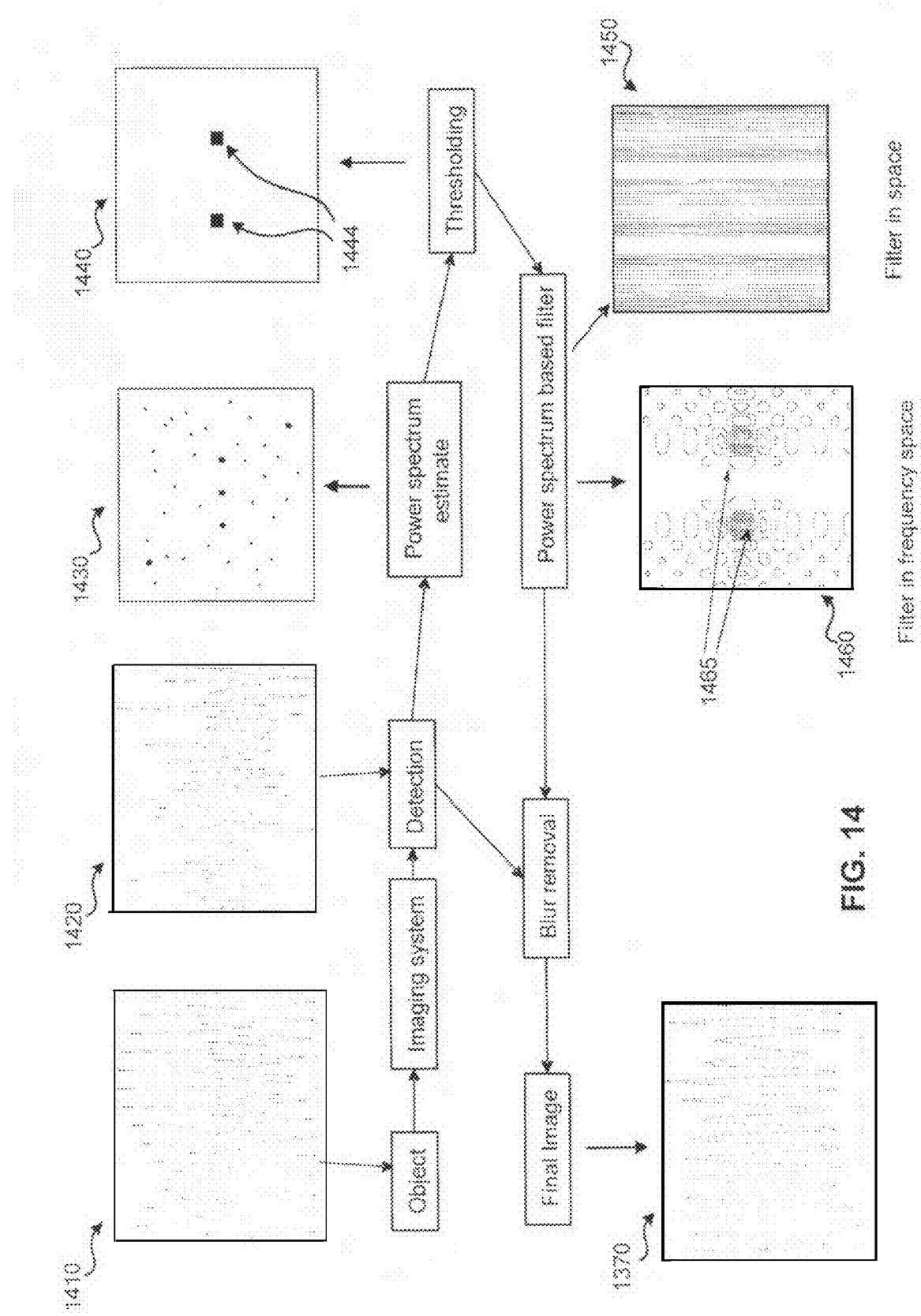
FIG. 14 illustrates processing electronic data that falls within another of the regions shown in FIG. 6.

FIG. 14 illustrates a process that is appropriate for processing electronic data that falls within region D of FIG. 6. Steps used in the processing for region D are similar as for regions A and C described above, but the higher noise introduced by the detector, as compared with the signal corresponding to the object being imaged, creates a different result. Object 1020 of FIG. 10A, which forms data represented in box 1410, is imaged from region D. A detector imaging region D has the same spatial frequency content as region C, but has higher noise content than the detector imaging regions A and C, and forms data as represented in box 1420. In fact, region D contains so much noise that, although peaks corresponding to the diagonal lines form in the power spectrum estimate, these peaks are comparable to noise in this image region. Box 1430 shows random noise peaks in the power spectrum estimate. The higher noise necessitates raising a threshold to a higher value, leaving peaks 1444 at spatial frequencies±SF1, but not leaving peaks corresponding to the diagonal lines. Therefore, a filter 1460 formed for region D resembles filter 1260 formed for region A, because it is based only on the spatial frequencies corresponding to the vertical lines—the only spatial frequencies dominant enough to stand out over the noise. Filter 1460 is also shown in spatial terms in box 1450. A linescan representation 1470 of processed electronic data for region D shows the vertical lines; amplitude of the vertical lines is diminished as compared to the processed electronic data shown in FIG. 12 for image region A, and the diagonal lines are not discernable.

Figure 15:
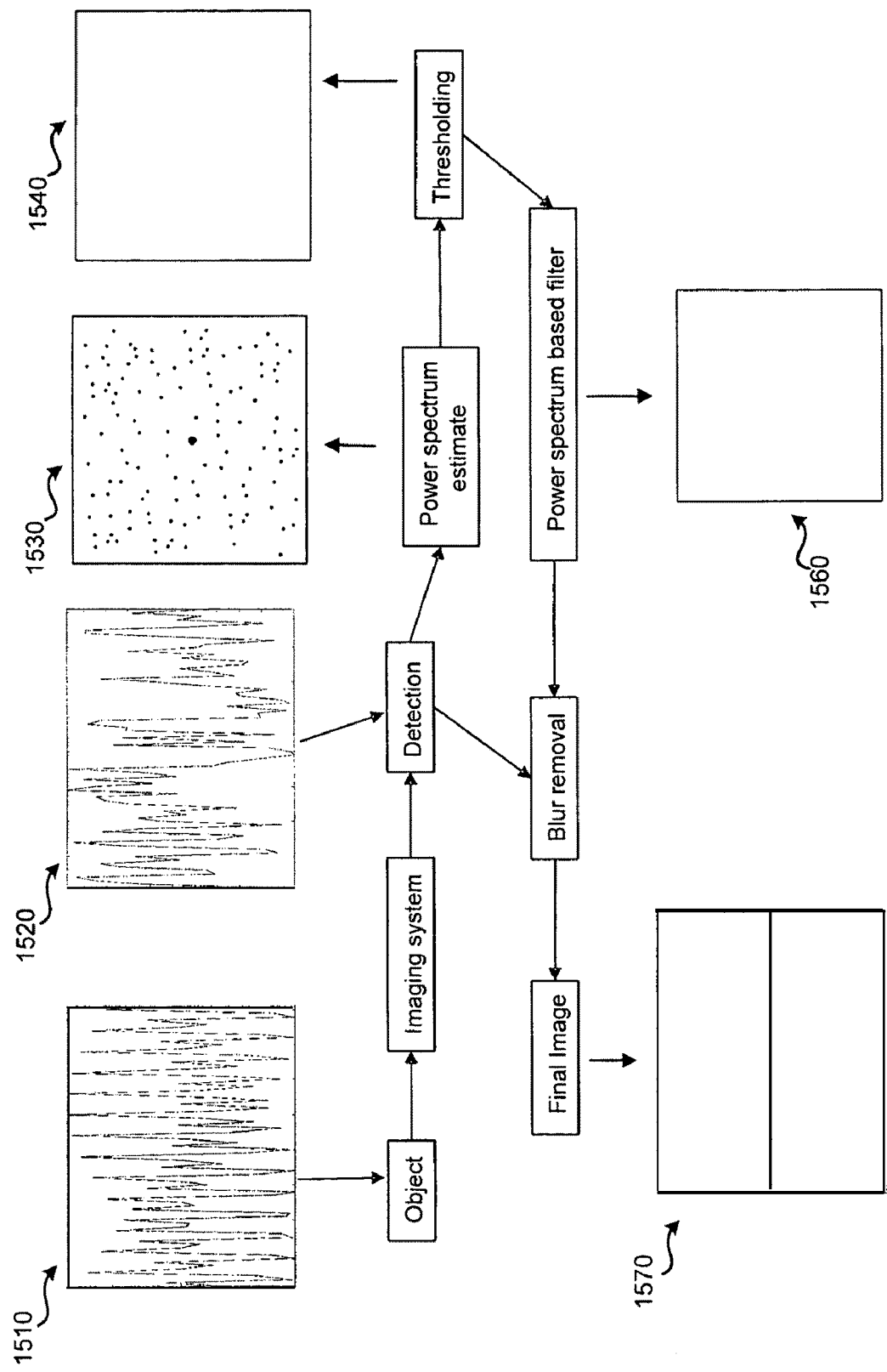
FIG. 15 illustrates processing electronic data that falls within two other regions shown in FIG. 6.

FIG. 15 illustrates a process that is appropriate for processing electronic data that falls within regions B and E of FIG. 6. Object 1020 of FIG. 10A, which forms data represented in box 1510, is imaged from regions B and E. A detector imaging regions B and E introduces even more noise than the detector imaging region D, and forms data as represented in box 1520. In regions B and E, the detector-induced noise overwhelms the ability of the processing to identify any spatial frequencies. A power spectrum estimate 1530 includes only a DC point and many peaks caused by the noise; thresholding does not locate any peak, as shown in box 1540, and a corresponding filter 1560 has a constant value. In such cases, output data may be replaced by a constant value, as shown in box 1570, or the original, detected but unfiltered electronic data (as in box 1520) may be substituted.

Nonlinear and/or spatially varying processing may also optimize a processed image that has image regions of high and low contrast. That is, certain image regions of an object may present large intensity variations (e.g., high contrast) with sharp demarcations of intensity, while other image regions present low intensity variations (low contrast) but also have sharp demarcations of intensity. The intensity variations and sharp demarcations may pertain to overall lightness and darkness, or to individual color channels. Human perception of images includes sensitivity to a wide range of visual clues. Resolution and contrast are two important visual clues; high resolution involves sharp or abrupt transitions of intensity or color (but which may not be large changes), while high contrast involves large changes in intensity or color. Such changes may occur within an object or between an object and a background. Not only human perception, but also applications such as machine vision and task based processing, may benefit from processing to provide high resolution and/or high contrast images.

WFC optics may blur edges or reduce contrast as they extend depth of field. Captured data obtained through WFC optics may be processed with a filter that exhibits high gain at high spatial frequencies to make transitions among intensity levels (or colors) sharper or steeper (e.g., increasing contrast); however, such filtering may also amplify image noise. Amplifying noise to the point where variations in intensity (or color) are approximately the same magnitude as transitions in a scene being imaged "masks" the transitions; that is, the increased noise makes the actual transitions indistinguishable from the noise. The human visual system may also respond to noise-free areas with the perception of false coloring and identify the image quality as poor, so reducing the noise to zero does not always produce images with good quality. Therefore, when WFC optics are used, it may be desirable to process certain image regions differently from each other, so as to maintain not only the sharp demarcations of intensity or color, but also the intensity or color variations of each region and desired noise characteristics, as illustrated in the following example of determining processing based on image content.

FIG. 16-24 illustrate how adapting a filter to contrast of an image region may improve a resulting image. As will be described in more detail, FIG. 16 through FIG. 19 show an example of a high contrast image region imaged to a detector and processed with an "aggressive" filter that increases noise gain. This processing is shown to sharpen edge transitions of the high contrast image without "masking" the transitions with amplified noise. In FIG. 20 through FIG. 24, a low contrast image region is imaged at a detector. The resulting electronic data is first processed with the same filter as in the example of FIG. 16-FIG. 19 to show how amplified noise masks transitions. Then, the electronic data is processed with a less "aggressive" filter that sharpens the edge transitions somewhat, but does not amplify noise is as much as by the "aggressive" filter, so that amplified noise does not mask the transitions.

Figure 16:
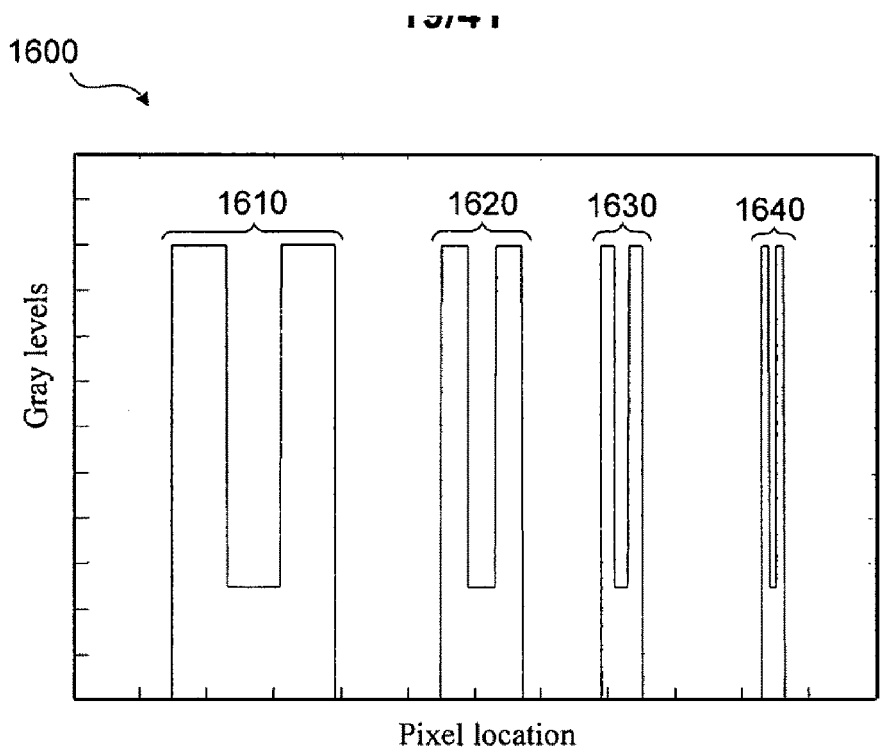
FIG. 16 shows a linescan of a high contrast image region of a scene.

FIG. 16 shows a linescan 1600 of object information of a high contrast image region of a scene such as, for example, fence 250 of scene 200, FIG. 2. Object information 1610, 1620, 1630 and 1640 of four corresponding objects is shown in linescan 1600; each of objects represented by object information 1610-1640 is successively smaller and more detailed (i.e., higher resolution imaging is required to show the spatial detail that is present). A gray scale used, corresponding to values along the vertical axis of linescan 1600, ranges from zero to 240 levels. Intensity of object information 1610-1640 varies from zero to 50 to 200 gray levels, with abrupt transitions as a function of pixel location (i.e., the objects represented by object information 1610-1640 have sharp demarcations of intensity from one point to another). Although the terms "gray scale" and "gray levels" are used in this example, variations in intensity in one or more color channels may be similarly processed and are within the scope of the present disclosure.

Figure 17:
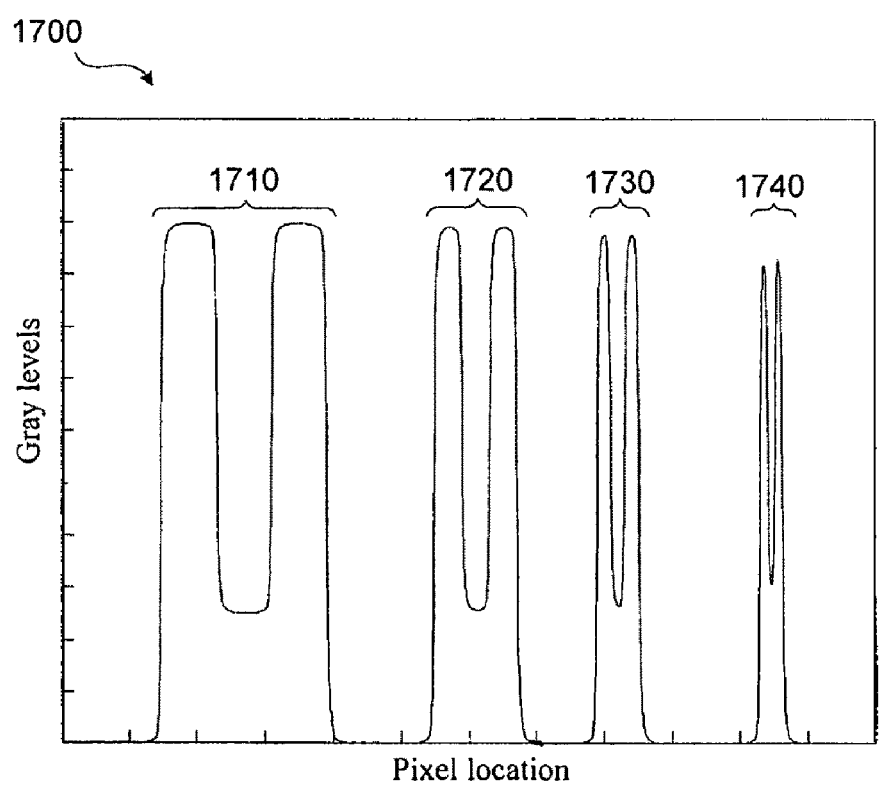
FIG. 17 shows a linescan of the objects represented in FIG. 16.

Optics, including WFC optics, generate a modified optical image with extended depth of field. FIG. 17 shows a linescan 1700 of the objects represented in linescan 1600 as optical information 1710, 1720, 1730 and 1740. The WFC optics utilized to produce optical information 1710, 1720, 1730 and 1740 implement a pupil plane phase function phase (r,θ) such that $$\text{phase}(r, \theta) = g \sum_{i=1}^{n} a_i z^i \cos(w\theta) \qquad \text{Eq. 1}$$

where $n = 7$, $0 \leq r \leq 1$, $a_1 = 5.4167$, $a_2 = 0.3203$, $a_3 = 3.0470$, $a_4 = 4.0983$, $a_5 = 3.4105$, $a_6 = 2.0060$, $a_7 = -1.8414$, $w = 3$, $0 \leq \theta \leq 2\pi$ radians, and $$z = \begin{bmatrix} \dfrac{z-r}{1-r} & \text{when } r \geq 0.5, \\ 0 & \text{when } r < 0.5. \end{bmatrix}$$

Optics that follow the form of Eq. 1 fall into a category that is sometimes referred to herein as "cosine optics," which generally denotes an optical element that imparts a phase variation that varies cosinusoidally with respect to an angle θ and aspherically in radius r.

Wavefront coding may degrade sharp demarcations of intensity between adjacent points, as may be seen in the rounded transitions and sloping edges of optical information 1710, 1720, 1730 and 1740.

An optical image captured by an electronic image detector that generates electronic data may introduce noise. For example, a detector may introduce noise that has two components: signal dependent noise, and signal independent, additive noise. Signal dependent noise is a function of signal intensity at a given pixel location. Signal independent noise is additive in nature and does not depend on intensity at a pixel location. Shot noise is an example of signal dependent noise. Electronic read noise is an example of signal independent noise.

Figure 18:
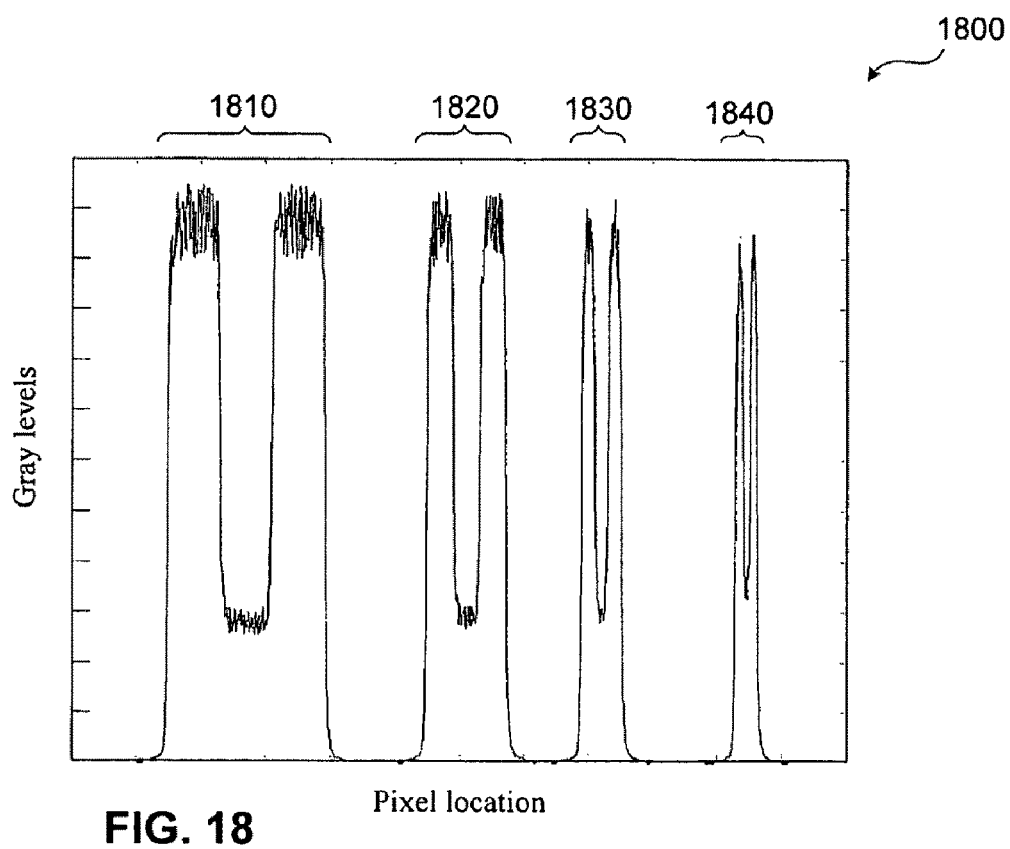
FIG. 18 illustrates electronic data of the linescan of the objects represented in FIG. 16.

FIG. 18 shows a linescan 1800 of the objects represented in linescan 1600 as electronic data 1810, 1820, 1830 and 1840. Note that electronic data 1810, 1820, 1830 and 1840 includes rounded transitions and sloped edges as seen in optical information 1710, 1720, 1730 and 1740, and that areas of high intensity include noise that is roughly proportional to the intensity.

Electronic data 1810, 1820, 1830 and 1840 may be processed with a filter that enhances high spatial frequencies with respect to lower spatial frequencies, thus generating sharp transitions. An example of such a filter is a parametric Wiener filter as described in the frequency domain for spatial frequency variables u and v by the following equations:

$$W(u, v) = \frac{H^*(u, v)}{|H(u, v)|^2 + \gamma \dfrac{S_N(u, v)}{S_O(u, v)}} \qquad \text{Eq. 2}$$

where W(u,v) is the parametric Wiener filter, H(u,v) is an optical transfer function, H*(u,v) is the conjugate of the optical transfer function, $S_N(u,v)$ is a noise spectrum, $S_O(u,v)$ is an object spectrum and y is a weighting parameter. Noise spectrum $S_N(u,v)$ is given by $S_N(u,v)=(1/Nw)$ where Nw is a constant. Object spectrum $S_O(u,v)$ is typically given by $$S_o(u, v) = \frac{1}{[1 + (2\pi\mu\rho)^2]^{3/2}}, \text{ where } \rho = \sqrt{(u^2 + v^2)},$$

and μ is a scalar constant.

An inverse Fourier transform of W(u,v) gives a spatial domain version of the Wiener filter. One example of processing (also sometimes called "reconstruction" herein) of images is performed by convolving the image (e.g., as represented by linescan 1800 of electronic data 1810, 1820, 1830 and 1840 shown above) with a spatial domain version of the Wiener filter. Such reconstruction generates sharp edges, but also increases noise power.

Figure 19:
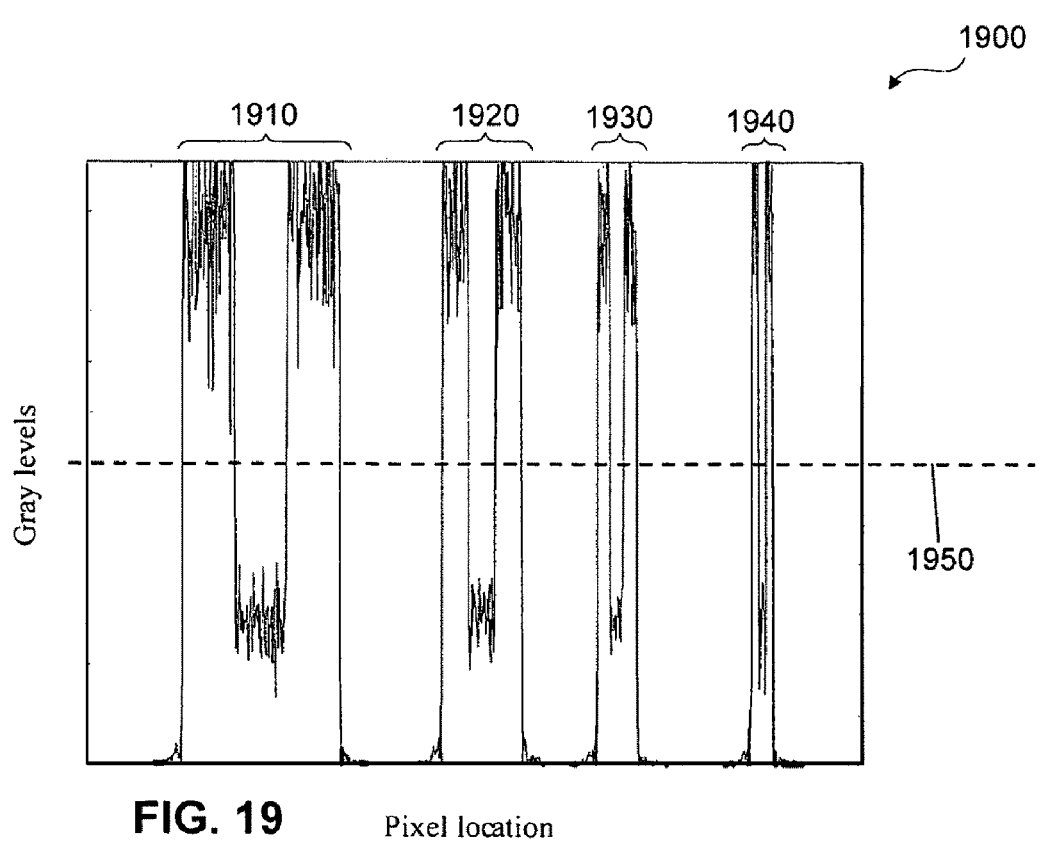
FIG. 19 illustrates processed electronic data of the linescan of the objects represented in FIG. 16.

FIG. 19 shows a linescan 1900 of the objects represented in linescan 1600 as processed electronic data 1910, 1920, 1930 and 1940, that is, electronic data 1810, 1820, 1830 and 1840 after processing with W(u,v) defined above. As seen in the reconstructed electronic data, signal and noise power are increased by about a factor of 3. However, for human perception of resolution, and certain other applications (such as machine vision, or task based processing) where sharp demarcations (e.g., steep slopes) between adjacent areas that differ in intensity are desirable, increased noise may be tolerable. For instance, linescan 1900 is processed with the parametric Wiener filter discussed above, with Nw=250, μ=0.25, and γ=1. Linescan 1900 is seen to have steeper slopes between areas of differing intensity than linescan 1700, and noise at high and low intensity levels is amplified, but does not mask transitions among the areas of differing intensity. For example, noisy data at the high and low intensity levels remains much higher and lower, respectively, than the 120th gray level labeled as threshold 1950. Thus, W(u,v) with the constants noted above may improve human perception of the bright-dark-bright transitions in the high contrast image region.

In addition to the processing steps discussed above, for certain high contrast imaging applications such as, for example, imaging of business cards, barcodes or other essentially binary object information, filtering steps may be followed by a thresholding step, thereby resulting in a binary valued image.

Figure 20:
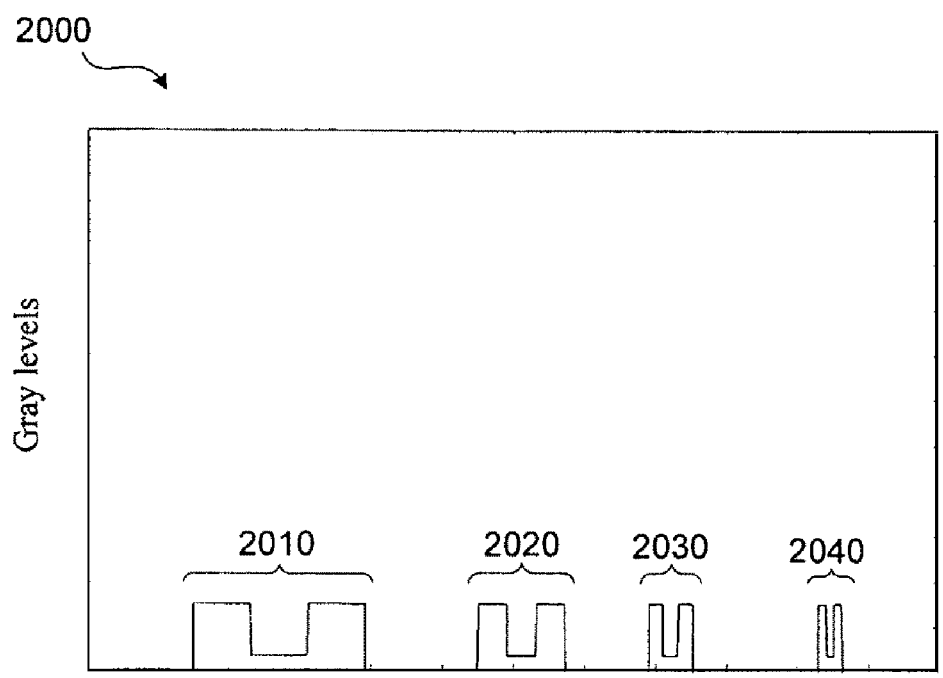
FIG. 20 shows a linescan of a low contrast image region of a scene.
Figure 21:
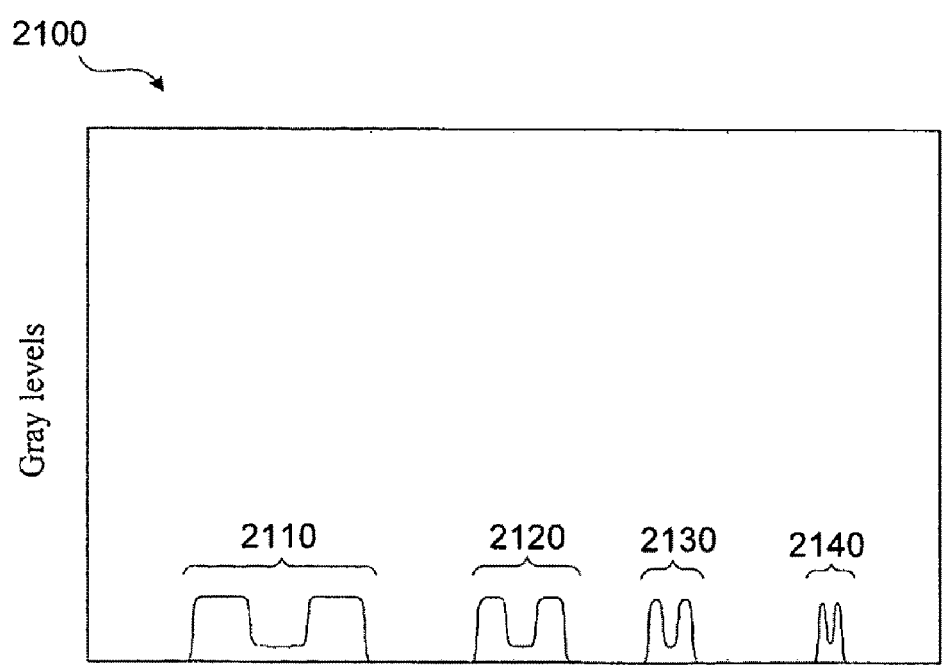
FIG. 21 shows a linescan of the objects represented in FIG. 20.
Figure 22:
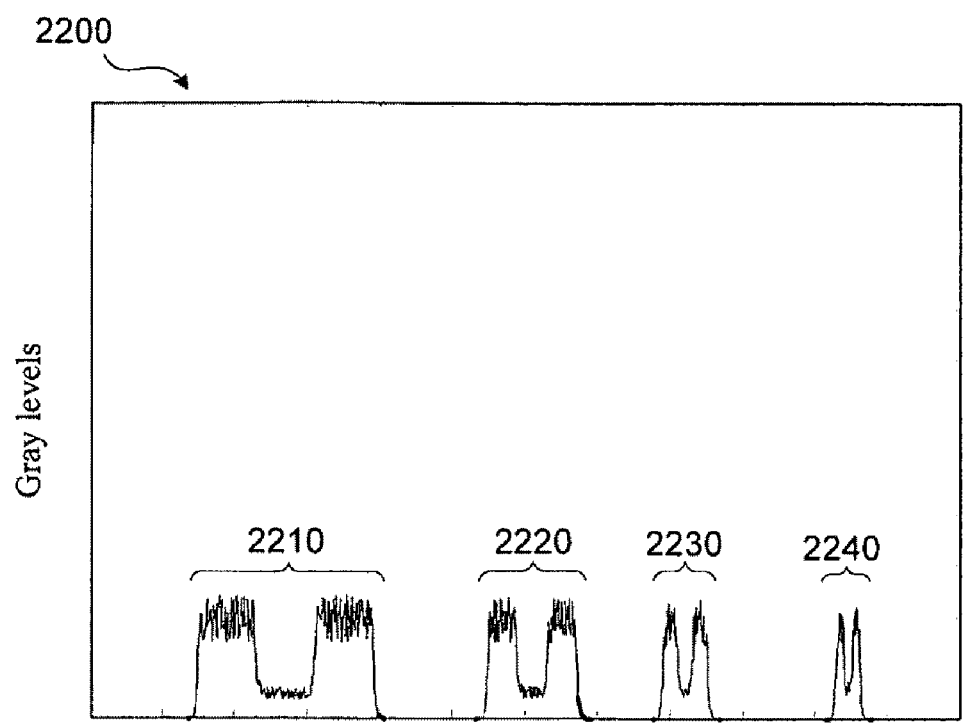
FIG. 22 illustrates electronic data of the linescan of the objects represented in FIG. 20.

Certain image regions of an object being imaged may have reduced intensity variations but, like the image region discussed in connection with FIG. 16-FIG. 19, may also have sharp demarcations of intensity. FIG. 20 shows a linescan 2000 of a low contrast image region of a scene—which may be, for example, a second portion of the same scene illustrated in FIG. 16-FIG. 19. FIG. 20-FIG. 24 use the same gray scale of 240 gray levels as in FIG. 16-FIG. 19. Electronic data 2010, 2020, 2030 and 2040 of four corresponding objects are shown in linescan 2000; each object represented by electronic data 2010-2040 is successively smaller and more detailed. However, maximum differences of intensity in electronic data 2010, 2020, 2030 and 2040 are only between zero and 30 gray levels, as opposed to the differences of zero to 200 gray levels in electronic data 1610, 1620, 1630 and 1640, FIG. 16. The same WFC optics as discussed in connection with FIG. 17 modifies the image region illustrated above to generate an optical image with extended depth of field, which is captured by a detector that adds noise, as illustrated in FIG. 21 and FIG. 22.

FIG. 21 shows a linescan 1700 of the objects represented in linescan 2000 as optical information 2110, 2120, 2130 and 2140 that have rounded transitions and sloping edges, similar to what was seen in optical information 1710, 1720, 1730 and 1740, FIG. 17. FIG. 22 shows a linescan 2200 of the objects represented in linescan 2000 as electronic data 2210, 2220, 2230 and 2240. Note that electronic data 2210, 2220, 2230 and 2240 includes rounded transitions and sloped edges as seen in optical information 2110, 2120, 2130 and 2140, and that areas of higher intensity include noise that is roughly proportional to the intensity, although the intensity is lower than the peak intensities seen in FIG. 16-FIG. 19.

Figure 23:
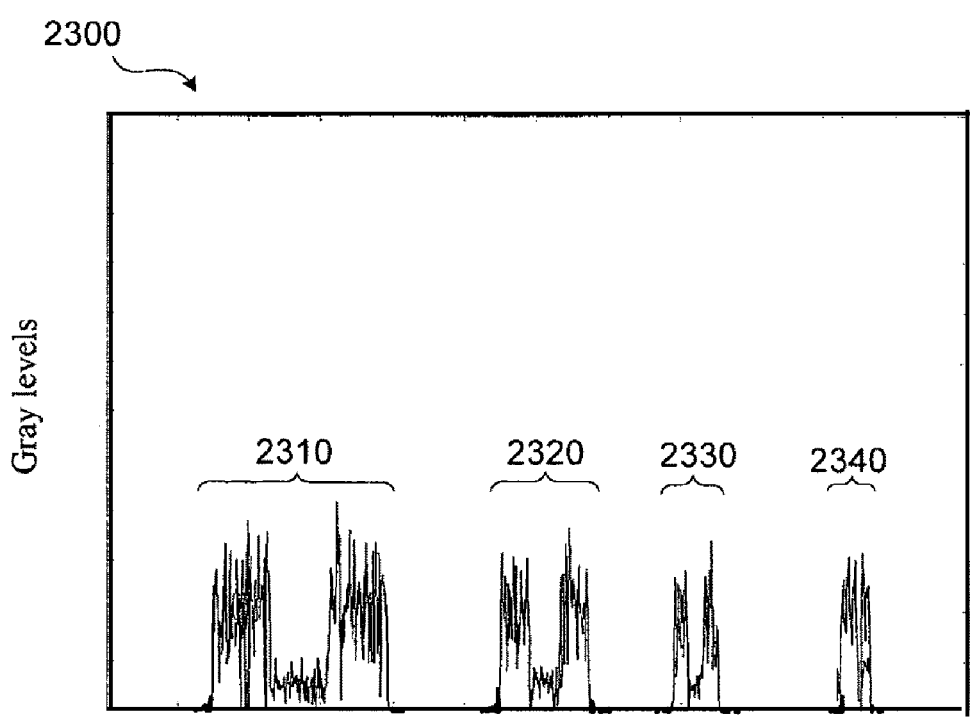
FIG. 23 illustrates processed electronic data of the linescan of the objects represented in FIG. 20.

FIG. 23 shows a linescan 2300 of the objects represented in linescan 2000 as processed electronic data 2310, 2320, 2330 and 2340, that is, electronic data 2210, 2220, 2230 and 2240 after convolution with an "aggressive" parametric Wiener filter as described in Eq. 1 and Eq. 2 above, again with Nw=250, μ=0.25, and γ=1. In FIG. 23, it is evident that noise has been amplified to the point that the noise "masks" transitions; that is, no gray level threshold can be chosen for which only the "bright" or "dark" regions of the original objects represented in linescan 2000 are brighter or darker than the threshold.

Figure 24:
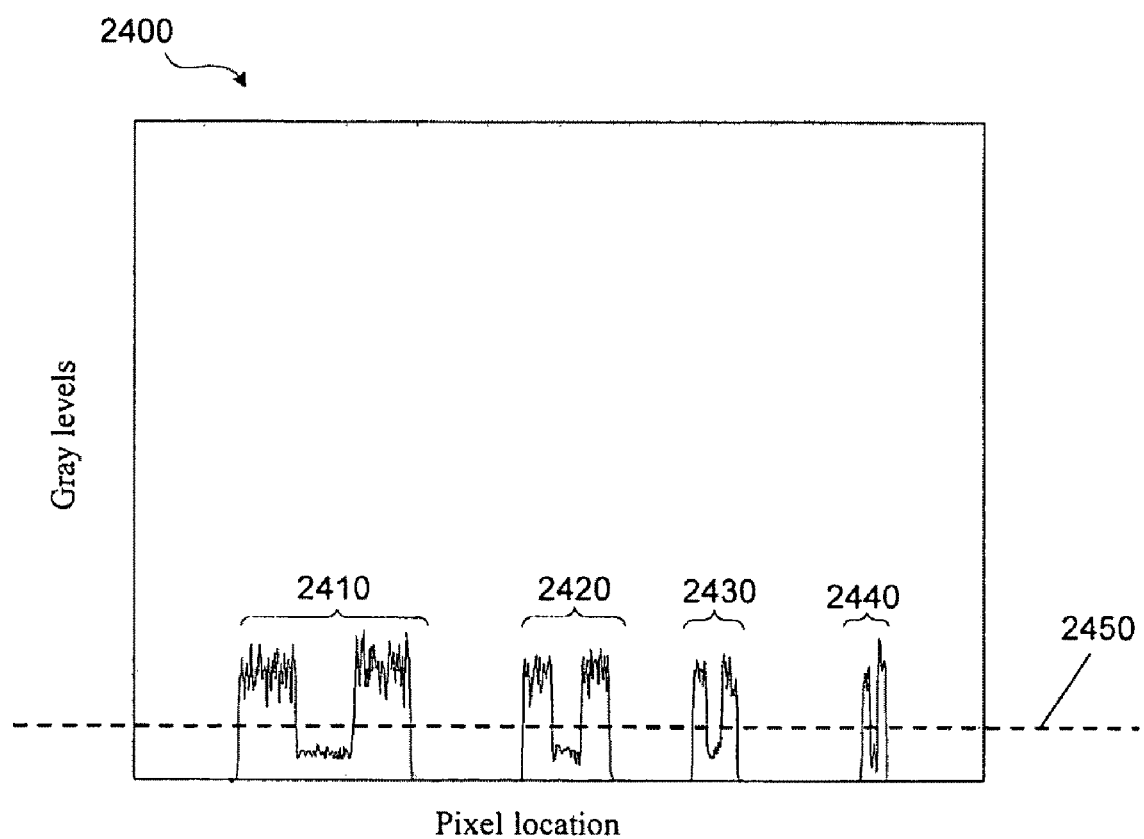
FIG. 24 illustrates electronic data of the linescan of the objects represented in FIG. 20, processed differently as compared to FIG. 23.

Utilizing a "less aggressive" filter may mitigate the "masking" that may result from noise amplification. FIG. 24 shows a linescan 2400 of the objects represented in linescan 2000 as processed electronic data 2410, 2420, 2430 and 2440, that is, again starting with electronic data 2210, 2220, 2230 and 2240, FIG. 22, but this time utilizing a Wiener filter as described in Eq. 1 and Eq. 2 with "less aggressive" constants Nw=500, μ=1, and γ=1. The "less aggressive" filter constants restore edge sharpness to processed electronic data 2410, 2420, 2430 and 2440, but only increase noise by a factor near unity, thereby not "masking" transitions between the closely spaced high and low intensity levels of the objects represented in linescan 2000. Note that noisy data at the high and low intensity levels remains higher and lower, respectively, than the 20th gray level labeled as threshold 2450.

It has thus been shown how processing may be determined for different data sets of electronic data representing an image. Other forms of processing may be utilized for data sets that are identified in different ways from those discussed above. For example, as compared to the examples illustrated by FIG. 16 through FIG. 24, filtering methods other than Wiener filters may be utilized to modify a degree to which effects introduced by WFC optics are altered. Also, when data sets are identified on the basis of color information instead of intensity information, filters that modify color may be utilized instead of a filter that enhances intensity differences.

Spatially Varying Processing—Implementation

Figure 25:
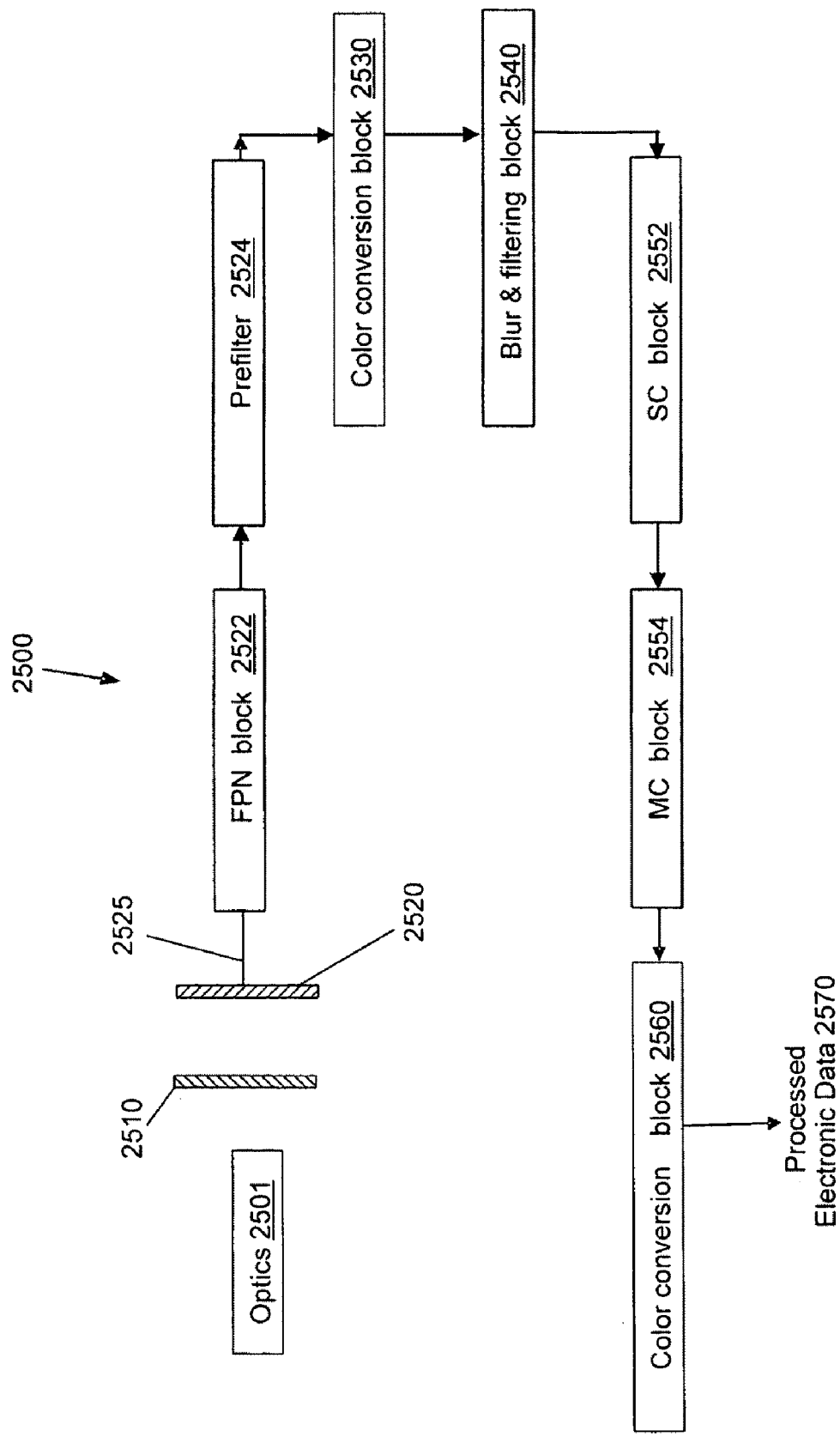
FIG. 25 illustrates an optical imaging system utilizing nonlinear and/or spatially varying processing.

FIG. 25 illustrates an optical imaging system utilizing non-linear and/or spatially varying processing. System 2500 includes optics 2501 and a wavefront coding (WFC) element 2510 that cooperate with a detector 2520 to form a data stream 2525. Data stream 2525 may include full frame electronic data or any subset thereof, as discussed above. WFC element 2510 operates to code the wavefront of electromagnetic energy imaged by system 2500 such that an image formed at detector 2520 has extended depth of field, and includes effects due to the WFC optics that may be modified by post processing to form a processed image. In particular, data stream 2525 from detector 2520 is processed by a series of processing blocks 2522, 2524, 2530, 2540, 2552, 2554 and 2560 to produce a processed image 2570. Processing blocks 2522, 2524, 2530, 2540, 2552, 2554 and 2560 represent image processing functionality that may be, for example, implemented by electronic logic devices that perform the functions described herein. Such blocks may be implemented by, for example, one or more digital signal processors executing software instructions; alternatively, such blocks may include discrete logic circuits, application specific integrated circuits ("ASICs"), gate arrays, field programmable gate arrays ("FPGAs"), computer memory, and portions or combinations thereof. For example, processing blocks 2522, 2524, 2530, 2540, 2552, 2554 and 2560 may be implemented by processor 140 executing software 145 (see FIG. 3), with processor 140 optionally coordinating certain aspects of processing by ASICs or FPGAs.

Processing blocks 2522 and 2524 operate to preprocess data stream 2525 for noise reduction. In particular, a fixed pattern noise ("FPN") block 2522 corrects for fixed pattern noise (e.g., pixel gain and bias, and nonlinearity in response) of detector 2520; a prefilter 2524 utilizes a priori knowledge of WFC element 2510 to further reduce noise from data stream 2525, or to prepare data stream 2525 for subsequent processing blocks. Prefilter 2524 is for example represented by icons 518, 536 or 556 as shown in FIGS. 5B, 5C and 5D respectively. A color conversion block 2530 converts color components (from data stream 2525) to a new colorspace. Such conversion of color components may be, for example, individual red (R), green (G) and blue (B) channels of a red-green-blue ("RGB") colorspace to corresponding channels of a luminance-chrominance ("YUV") colorspace; optionally, other colorspaces such as cyan-magenta-yellow ("CMY") may also be utilized. A blur and filtering block 2540 removes blur from the new colorspace images by filtering one or more of the new colorspace channels. Blocks 2552 and 2554 operate to post-process data from block 2540, for example to again reduce noise. In particular, single channel ("SC") block 2552 filters noise within each single channel of electronic data using knowledge of digital filtering within block 2540; multiple channel ("MC") block 2554 filters noise from multiple channels of data using knowledge of optics 2501 and the digital filtering within blur and filtering block 2540. Prior to processed electronic data 2570, another color conversion block 2560 may for example convert the colorspace image components back to RGB color components.

Figure 26:
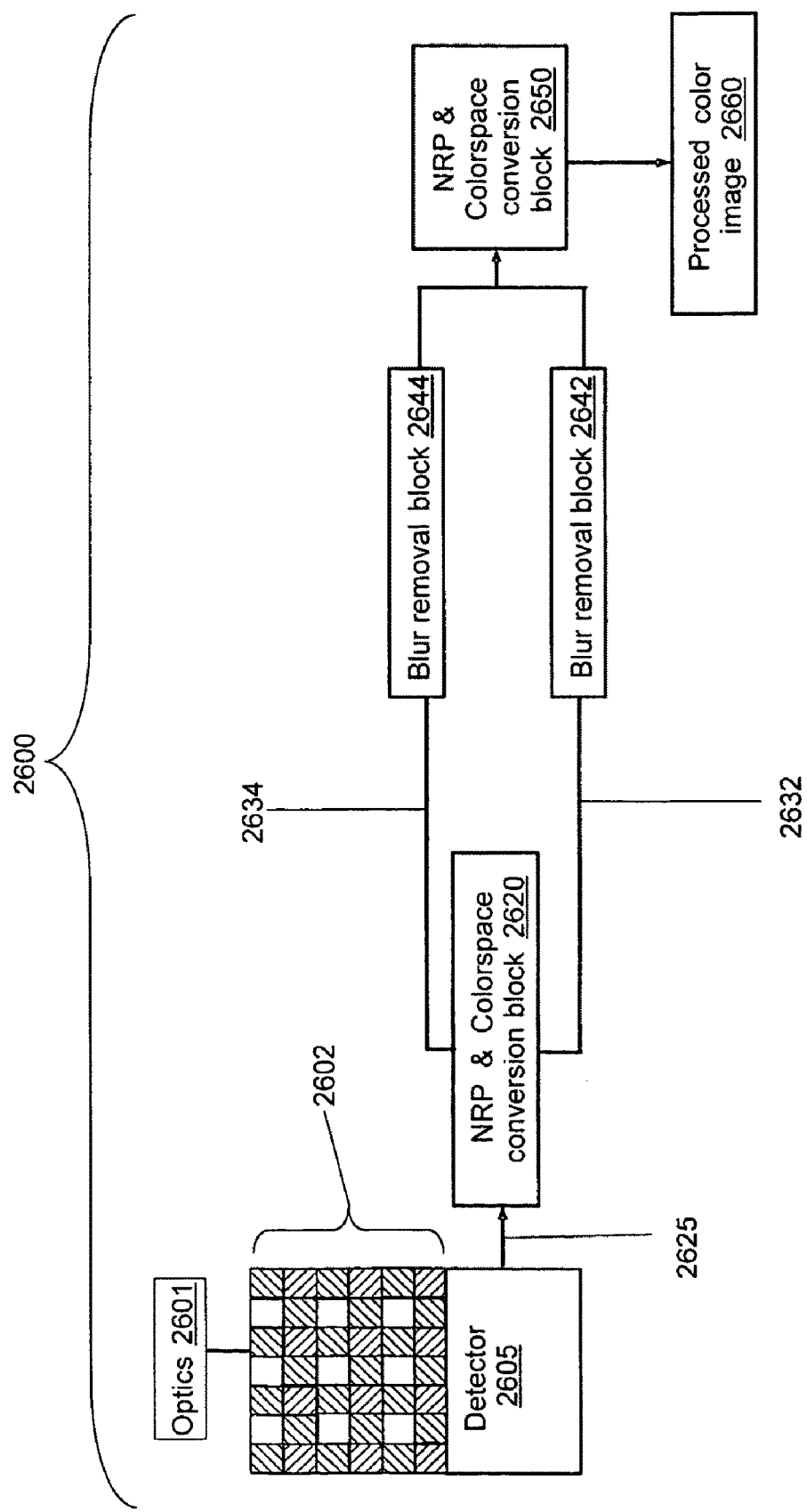
FIG. 26 schematically illustrates an optical imaging system with nonlinear and/or spatially varying color processing.

FIG. 26 schematically illustrates an imaging system 2600 with nonlinear and/or spatially varying color processing. Imaging system 2600 produces a processed three-color image 2660 from captured electronic data 2625 formed at a detector 2605, which includes a color filter array 2602. System 2600 employs optics 2601 (including one or more WFC elements or surfaces) to code the wavefront of electromagnetic energy through optics 2601 to produce captured electronic data 2625 at detector 2605; an image represented by captured electronic data 2625 is purposely blurred by phase alteration effected by optics 2601. Detector 2605 generates captured electronic data 2625 that is processed by noise reduction processing ("NRP") and colorspace conversion block 2620. NRP functions, for example, to remove detector nonlinearity and additive noise, while the colorspace conversion functions to remove spatial correlation between composite images to reduce the amount of logic and/or memory resources required for blur removal processing (which will be later performed in blocks 2642 and 2644). Output from NRP & colorspace conversion block 2620 is in the form of a data stream that is split into two channels: 1) a spatial channel 2632; and 2) one or more color channels 2634. Channels 2632 and 2634 are sometimes called "data sets" of a data stream herein. Spatial channel 2632 has more spatial detail than color channels 2634. Accordingly, spatial channel 2632 may require the majority of blur removal within a blur removal block 2642. Color channels 2634 may require substantially less blur removal processing within blur removal block 2644. After processing by blur removal blocks 2642 and 2644, channels 2632 and 2634 are again combined for processing within NRP & colorspace conversion block 2650. NRP & colorspace conversion block 2650 further removes image noise accentuated by blur removal, and transforms the combined image back into RGB format to form processed three-color image 2660. As above, processing blocks 2620, 2632, 2634, 2642, 2644 and 2650 may include one or more digital signal processors executing software instructions, and/or discrete logic circuits, ASICs, gate arrays, FPGAs, computer memory, and portions or combinations thereof.

Figure 27:
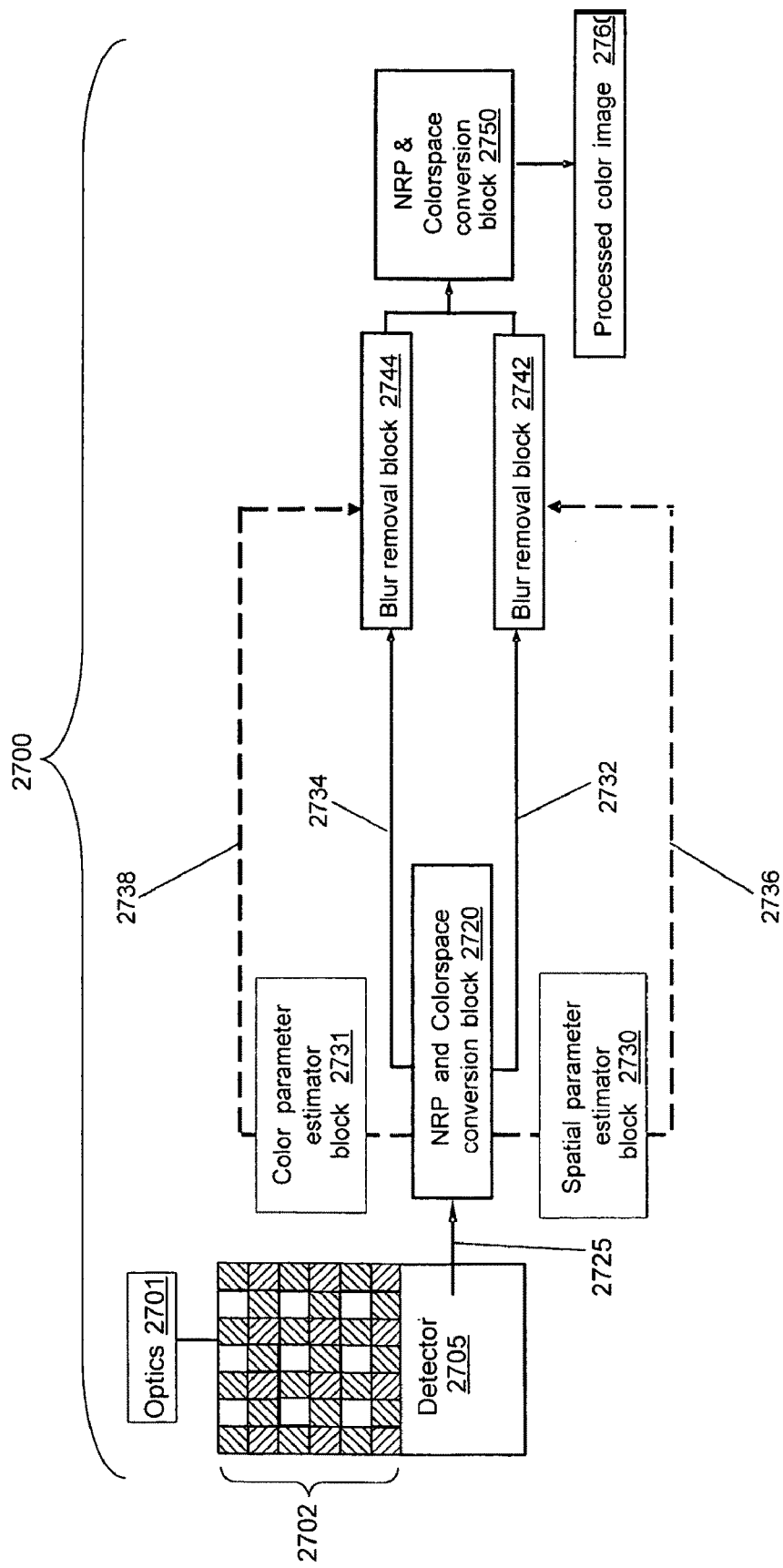
FIG. 27 shows another optical imaging system 2700 utilizing nonlinear and/or spatially varying processing.

FIG. 27 shows another imaging system 2700 utilizing nonlinear and/or spatially varying processing. While the systems illustrated in FIGS. 25 and 26 provide advantages over known art, system 2700 may generate even higher quality images and/or may perform more efficiently in terms of computing resources (such as hardware or computing time) as compared to systems 2500 and 2600. System 2700 employs optics 2701 (including one or more WFC elements or surfaces) to code the wavefront of electromagnetic energy through optics 2701 to produce captured electronic data 2725 at detector 2705; an image represented by captured electronic data 2725 is purposely blurred by phase alteration effected by optics 2701. Detector 2705 generates captured electronic data 2725 that is processed by noise reduction processing ("NRP") and colorspace conversion block 2720. A spatial parameter estimator block 2730 examines information of the spatial image generated by NRP and colorspace conversion block 2720, to identify which image regions of the spatial image require what kind and/or degree of blur removal. Spatial parameter estimator block 2730 may also divide captured data 2725 into data sets (for example, a spatial channel 2732 and one or more color channels 2734, as shown in FIG. 27, and/or specific data sets (e.g., data sets corresponding to image regions, as shown in FIG. 6-FIG. 9C) to enable association of specific blur removal processing parameters with each data set of captured electronic data 2725. Information generated by spatial parameter estimator block 2730 provides processing parameters 2736 for respective image regions (e.g., data sets of electronic data 2725) to a blur removal block 2742 that handles spatial channel 2732. A separate color parameter estimator block 2731 examines information of the color channel(s) 2734 output by NRP and colorspace conversion block 2720 to identify which data sets (e.g., corresponding to image regions) of color channel(s) 2734 require what kind of blur removal. Data sets such as color channels 2734 of captured electronic data 2725, as well as spatial channels 2732, may be processed in spatially varying ways to filter information therein. Processing performed on certain color channels 2734 may vary from processing performed on a spatial channel 2732 or other color channels 2734 of the same captured electronic data 2725. Information generated by color parameter estimator block 2731 provides processing parameters 2738 for respective data sets of captured electronic data 2725 to blur removal block 2744 that handles the color images. Processing parameters may be derived for captured data corresponding to an entire image, or for a data set (e.g., corresponding to a spatial region) of captured electronic data 2725, or on a pixel by pixel basis. After processing by blur removal blocks 2742 and 2744, channels 2732 and 2734 are again combined for processing within NRP & colorspace conversion block 2750. NRP & colorspace conversion block 2750 further removes image noise accentuated by blur removal, and transforms the combined image back into RGB format to form processed three-color image 2760. As above, processing blocks 2720, 2732, 2734, 2742, 2744 and 2750 may include one or more digital signal processors executing software instructions, and/or discrete logic circuits, ASICs, gate arrays, FPGAs, computer memory, and portions or combinations thereof.

Table 2 shows non-limiting types of processing that may be applied by a blur removal block (e.g., any of blur removal and/or blur and filtering blocks 2540, FIG. 25; 2642, 2644, FIG. 26, or 2742, 2744, FIG. 27) to different data sets (e.g., corresponding to spatial regions) within a scene such as scene 200, FIG. 2. Table 2 summarizes blur removal processing results for a given spatial region in scene 200, and corresponding processing parameters.

TABLE 2

Exemplary blur removal applications and corresponding processing parameters.

| Spatial Region | Processing Parameters | Exemplary Results |
| --- | --- | --- |
| Sky 210 | Object has very little spatial detail | No signal processing to remove blur is performed |

TABLE 2-continued

Exemplary blur removal applications and corresponding processing parameters.

| Spatial Region | Processing Parameters | Exemplary Results |
| --- | --- | --- |
| Clouds 220 | Object has small amount of spatial detail | Signal processing is adjusted so that blur is removed at low spatial frequencies |
| Grass 230 | Object has high spatial detail but low contrast | Signal processing is adjusted to remove blur at all spatial frequencies but without excessive sharpening, since amplified noise may overwhelm signal |
| Shadow 240 | Object has very low intensity | No signal processing to remove blur is performed |
| Fence 250 | Object has moderate spatial detail and high contrast | Signal processing is adjusted so that blur is removed from low and mid spatial frequencies |
| Sun 260 | Intensity saturates sensor | No signal processing to remove blur is performed |
| Basket 270 | Object has high spatial detail and high contrast | Signal processing is adjusted to remove blur from high and low spatial frequencies |
| Balloon 280 | Object has moderate spatial detail in the form of color variations | Signal processing is adjusted so that blur is removed from low and mid spatial frequencies in appropriate color channels |

Figure 28:
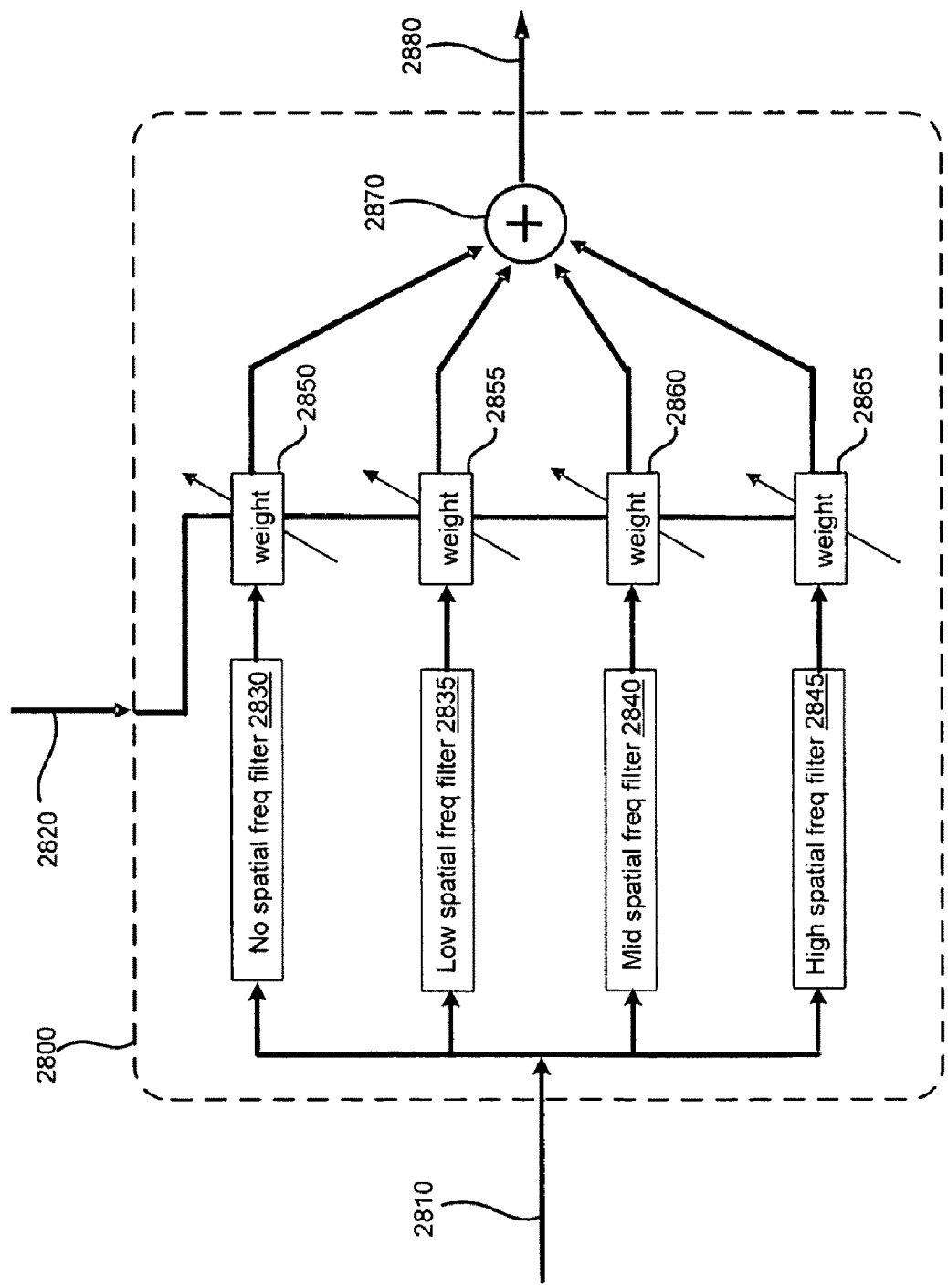
FIG. 28 illustrates how a blur removal block may process electronic data according to weighting factors of various spatial filter frequencies.

A blur removal block (e.g., any of blur removal and/or blur and filtering blocks 2540, FIG. 25; 2642, 2644, FIG. 26, or 2742, 2744, FIG. 27) may also generate and sum weighted versions of separate processes that work with different spatial frequencies, such as those summarized in FIG. 28.

FIG. 28 illustrates how a blur removal block 2800 may process electronic data according to weighting factors of various spatial filter frequencies. Input electronic data (e.g., captured data) is supplied as data 2810. Spatial frequency content analysis of the input electronic data (e.g., by either of spatial parameter estimator block 2730 or color parameter estimator block 2731, FIG. 27) determines processing parameters 2820. Filters 2830, 2835, 2840 and 2845 are no-, low-, mid- and high-spatial frequency filters that form output that is weighted by weights 2850, 2855, 2860 and 2865 respectively before being summed at an adder 2870 to form processed data 2880. For example, filters 2830 and 2835, for no- or low-spatial frequency filtering, have high weights 2850 and 2855 respectively for processing homogeneous image regions (e.g., in blue sky region 210, FIG. 2, where there is little or no image detail) and low weights 2850 and 2855 for processing regions with high spatial frequencies (e.g., in grass 230, fence 250 or basket 270 regions in scene 200, FIG. 2, that contain fine detail).

Blur removal block 2800 thus (a) utilizes processing parameters 2820 to select weights 2850, 2855, 2860 and 2865, (b) generates weighted versions of filters 2830, 2835, 2840 and 2845, and (c) sums the weighted versions, as shown, before passing the processed electronic data 2880 as output or for further image processing. Instead of three spatial frequency filters corresponding to "low," "mid" and "high" spatial frequencies, a spatial frequency spectrum may be divided into only two or more than three spatial frequency ranges. The illustrated sequence of operations may be reversed; that is, each channel may perform frequency filtering after a weight is applied.

Figure 29:
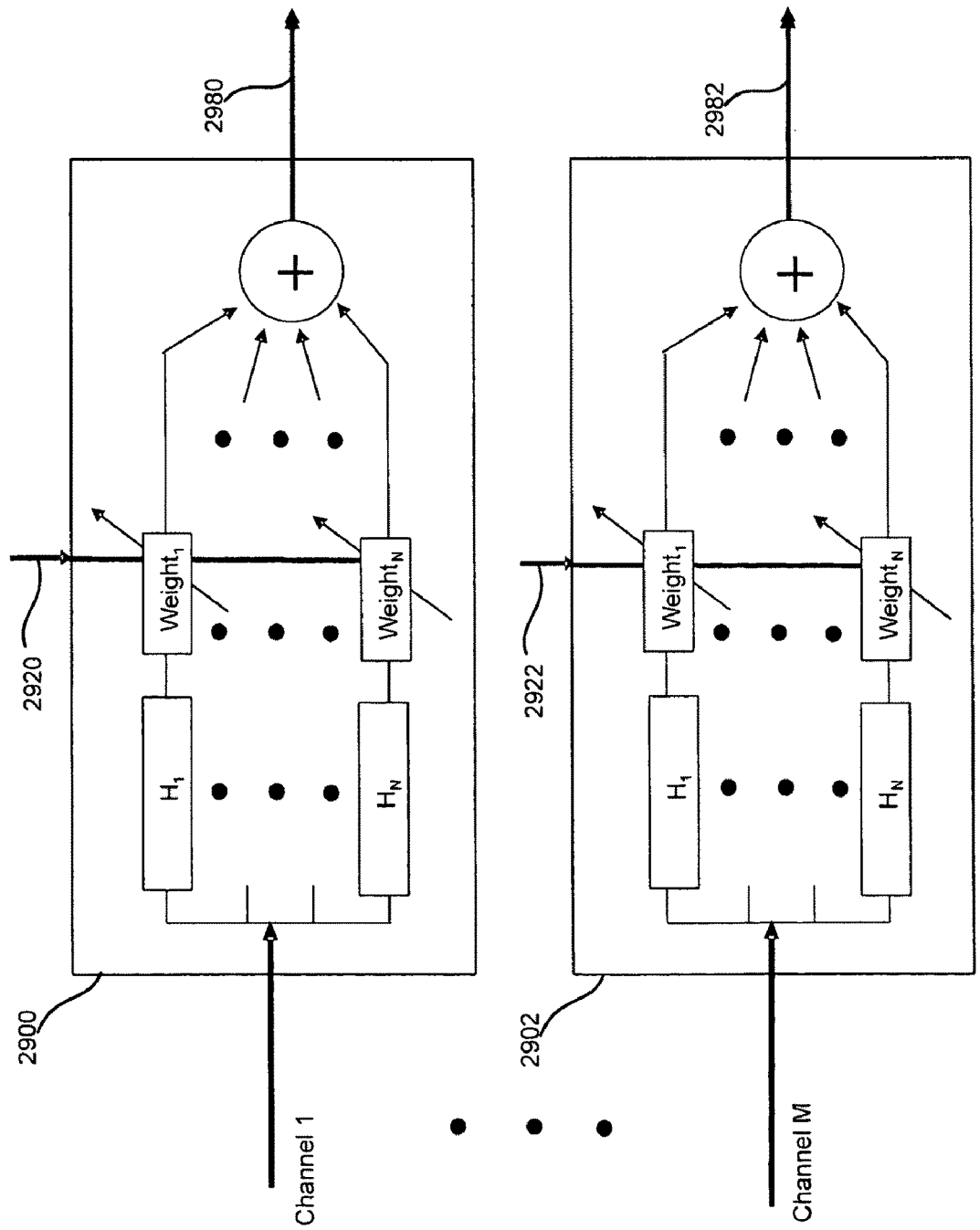
FIG. 29 shows a generalization of weighted blur removal for N processes across M multiple channels.

Blur removal may also be performed on a plurality of channels, such as channels corresponding to different color components of a digital image. FIG. 29 shows a generalization of weighted blur removal for N processes across M multiple channels. Channels 1 through M may be, for example, each color in a 3-channel RGB image, where M=3 (ellipsis indicating where an appropriate number of blur removal blocks may be utilized to support any number M of channels). Blur removal blocks 2900 and 2902 are representative blur removal blocks for an M-channel system. $H_1$ through $H_N$ represent, for example, spatial frequency dependent filters (e.g., spatial frequency filters 2830, 2835, 2840 and 2845 of FIG. 28, replicated for each of blur removal blocks 2900 and 2902 and indicated by ellipsis as replicated for any number N of spatial frequency filters). Weights $Weight_1$ through $Weight_N$ for each of blur removal blocks 2800, 2802 are adjusted according to processing parameters 2920, 2922 respectively. Output of each of blur removal blocks 2900 and 2902 are processed data 2980 and 2982 respectively.

Nonlinear Processing—Techniques

FIG. 30A through FIG. 30D illustrate operation of a system in which a prefilter performs a certain portion of blur removal while a nonlinear process removes remaining blur to form a further processed image. FIG. 30A shows an object to be imaged, and FIG. 30B represents an intermediate image formed utilizing cosine optics that implement wavefront coding with a phase (r, θ) as defined by Eq. 1 above where, again, n=7, $0 \leq r \leq 1$, $a_1$=5.4167, $a_2$=0.3203, $a_3$=3.0470, $a_4$=4.0983, $a_5$=3.4105, $a_6$=2.0060, $a_7$=−1.8414, w=3, $0 \leq \theta \leq 2\pi$ radians and $$z = \begin{cases} \dfrac{z-r}{1-r} & \text{when } r \geq 0.5, \\ 0 & \text{when } r < 0.5. \end{cases}$$

FIG. 30C represents electronic data from FIG. 30B after prefiltering by performing a linear convolution of the electronic data with a prefilter kernel that has unity sum and an RMS value of 0.8729. The unity sum of the prefilter kernel may mean that the average intensity of the prefiltered image (FIG. 30C) is equal to the average intensity of the intermediate image (FIG. 30B); but in this context, "unity sum" means at least that the sum of point-by-point intensities after prefiltering may equal a scalar as opposed to one—since prefiltering may be implemented by hardware that executes integer multiplication and addition instead of floating point arithmetic. An RMS value below 1.0 means that noise in the prefiltered image is reduced relative to noise in the intermediate image.

The prefilter kernel may be derived by dividing a complex autocorrelation of $e^{-j2\pi(phase(r,\theta))}$ into a Gaussian shaped target q(r, θ) that is defined by $$q(x, y) = e^{bx^2 - by^2}, \text{ AND } q(r, \theta) = q(x, y)|_{\substack{x=r\cos\theta \\ y=r\sin\theta}} \qquad \text{Eq. 3}$$

where $-1 \leq x \leq 1$, $-1 \leq y \leq 1$, radius $0 \leq r \leq 1$, $0 \leq \theta \leq 2\pi$ radians, b=2.5. Target shapes other than a Gaussian are also usable. After dividing, the division result is inverse Fourier transformed and the real part is taken to obtain the prefilter kernel. As may be seen in the above figure, FIG. 30C continues to be blurred after the prefiltering operation.

FIG. 30D is obtained from FIG. 30C by implementing a shock-filter routine such as that described in "Diffusion PDEs on Vector-Valued Images," IEEE Signal Processing Magazine, pp. 16-25, vol. 19, no. 5, September 2002. FIG. 30D may be seen to closely resemble the original object shown as FIG. 30A.

FIG. 31A through FIG. 31D illustrate operation of a system similar to that illustrated in FIG. 30A-FIG. 30D, except that in FIG. 31A through FIG. 31D the prefilter is formed such that it has an RMS value of 1.34. A prefilter RMS value greater that 1.0 leads to noise amplification greater than one in the processed image.

Figure 31A:
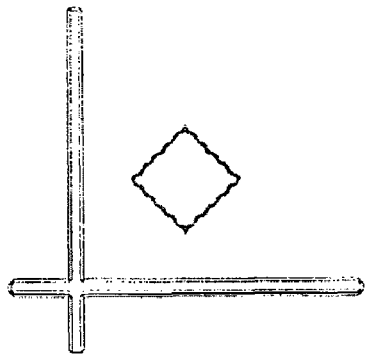
FIG. 31A through FIG. 31D illustrate operation of a pre-filter to remove blur while a nonlinear process removes remaining blur to form a further processed image.
Figure 31B:
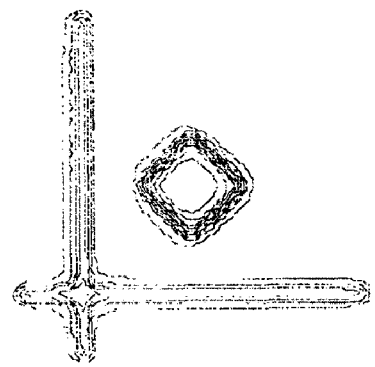
Figure 31C:
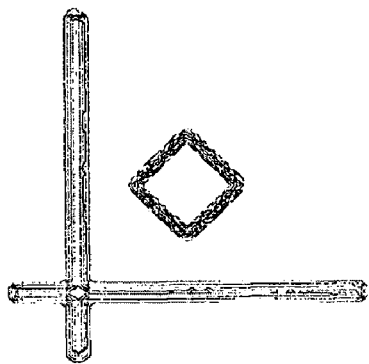
Figure 31D:
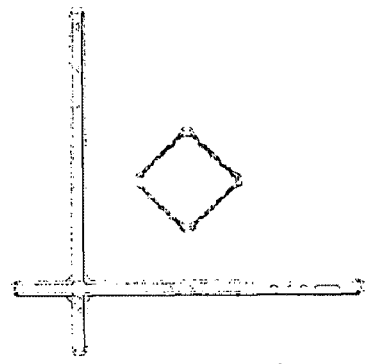

FIG. 31A again represents an object to be imaged; FIG. 31B represents an intermediate image formed from FIG. 31A utilizing cosine optics that implement the same phase (r, θ) function described by Eq. 1 above. FIG. 31C represents data corresponding to FIG. 31B after prefiltering with a kernel formed with a value of b=2.1 in Eq. 2, leading to the prefilter RMS value of 1.34. FIG. 31D is obtained from FIG. 31C by implementing the shock-filter routine described above in connection with FIG. 30A-FIG. 30D. FIG. 31D may be seen to closely resemble the original object shown as item A, except that FIG. 31D contains artifacts due to the prefilter used, as compared to FIG. 30D.

Nonlinear and spatially varying processing may also be utilized to compensate for variations in optics induced, for example, by temperature. A temperature detector in or near optics of an imaging system may provide input to a processor which may then determine a filter kernel that adjusts processing to compensate for the temperature of the optics. For example, a system may derive a filter kernel for processing of each image, utilizing a parameter chosen, depending on temperature of the optics, from a lookup table. Alternatively, a set of filter kernels may be stored, and a lookup table may be utilized to load an appropriate filter kernel, depending on the temperature of the optics.

Figure 32A:
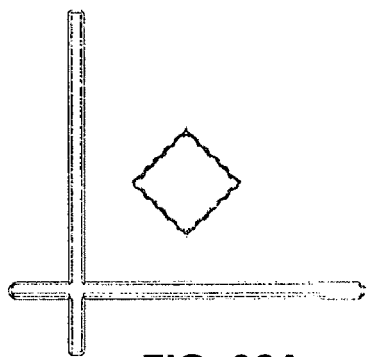
FIG. 32A-FIG. 32D show images of the same object of FIG. 30A-FIG. 30D and FIG. 31A-FIG. 31D, but including temperature dependent optics.
Figure 32B:
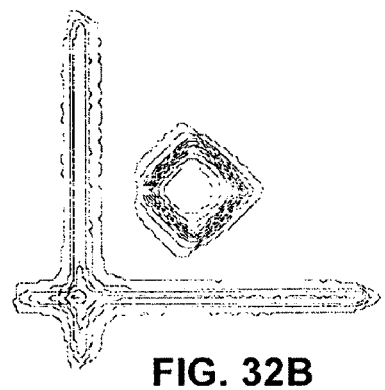
Figure 32C:
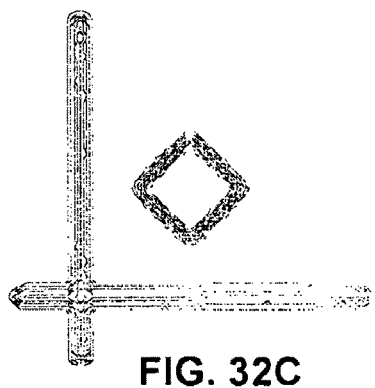
Figure 32D:
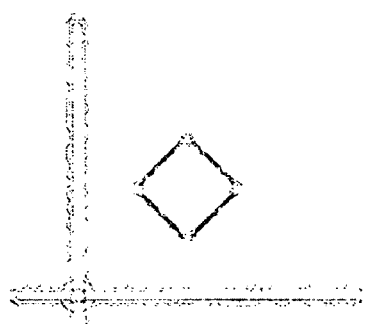

FIG. 32A-FIG. 32D illustrate compensation for variation in optics induced by temperature. In a simulated optical system, operation at a second temperature temp2 causes a second-order ½ wave defocus aberration as compared to performance of the system at a nominal temperature temp1. This effect may be expressed as phase $(r, \theta)_{temp2}$=phase $(r, \theta)_{temp1}$+ $0.5r^2$, where $0 \leq r \leq 1$. Therefore, a prefilter kernel that may be utilized with a data stream acquired when optics are at temperature temp2 may be derived by dividing an autocorrelation of $e^{-j2\pi(phase(r,\theta)_{temp2})}$ into the Gaussian target described in Eq. 3 above. This transforms a representation of the filter in frequency space from the filter shown at left below, to the filter shown at right below, both representations being shown in spatial coordinates:

FIG. 32A-FIG. 32D show images of the same object shown in FIG. 30A-FIG. 30D and FIG. 31A-FIG. 31D, but for a system utilizing temperature dependent optics. FIG. 32A represents an object to be imaged. FIG. 32B represents an intermediate image formed utilizing cosine optics that implement the same phase (r, θ) function described by Eq. 1 above at a temperature temp1, but the image in FIG. 32B is taken at a temperature temp2, adding ½ wave of misfocus aberration. FIG. 32C represents the electronic data of FIG. 32B after prefiltering with a prefilter that includes the ½ wave misfocus aberration correction described above. FIG. 32D is obtained from FIG. 32C by implementing the shock-filter routine described above in connection with FIG. 30A-FIG. 30D. FIG. 32D may be seen to resemble the original object shown as FIG. 32A.

Figure 33:
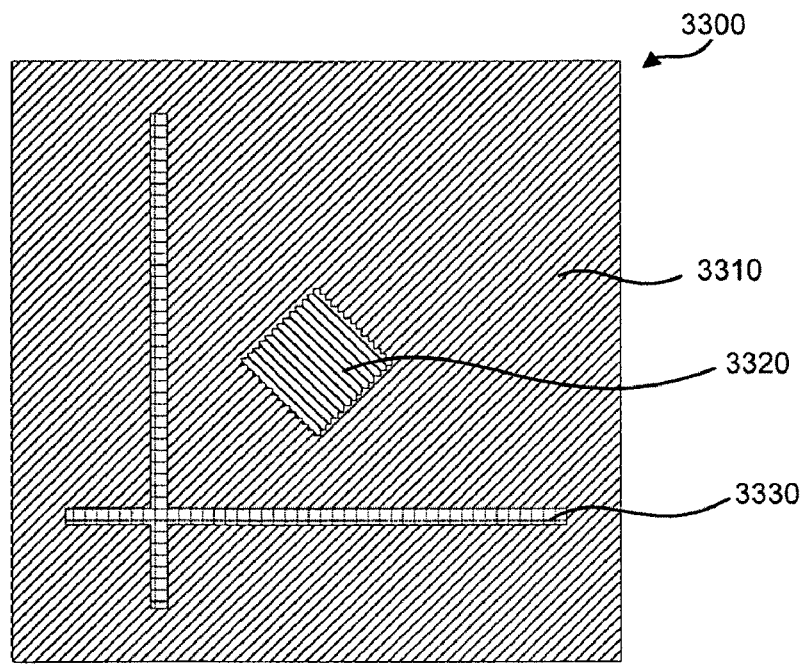
FIG. 33 shows an object to be imaged, and illustrates how color intensity information may be utilized to determine spatially varying processing.

FIG. 33 shows an object 3300 to be imaged, and illustrates how color intensity information may be utilized to determine spatially varying processing. A diamond 3320 included in object 3300 has color information but not intensity information; that is, diamond 3320 is orange (represented by a first diagonal fill) while a background 3310 is gray (represented by a second diagonal fill), with diamond 3320 and background 3310 having the same overall intensity. Crossed bars 3330 in object 3300 have both color and intensity information; that is, they are pink (represented by crossed horizontal and vertical fill) and are lighter than background 3310. The difference in the information content of the different portions of object 3300 is illustrated below by way of red-green-blue ("RGB") and luminance-chrominance ("YUV") images of object 3300, as shown in FIG. 34A-FIG. 34C and FIG. 35A-FIG. 35C. Note that numerals 3310, 3320 and 3330 are utilized in the following drawings to indicate the same background, diamond and crossed bars features shown in FIG. 33 even though the appearance of such features may differ from appearance in FIG. 33.

Figure 34A:
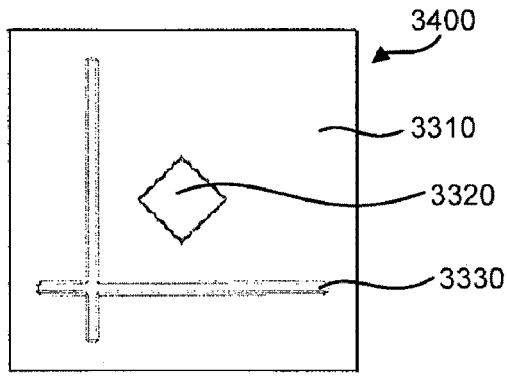
FIG. 34A-FIG. 34C show RGB images obtained from imaging the object shown in FIG. 33.
Figure 34B:
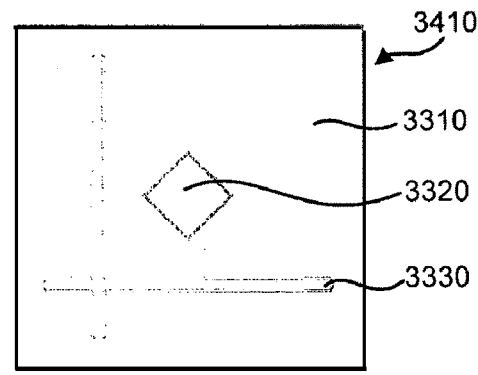
Figure 34C:
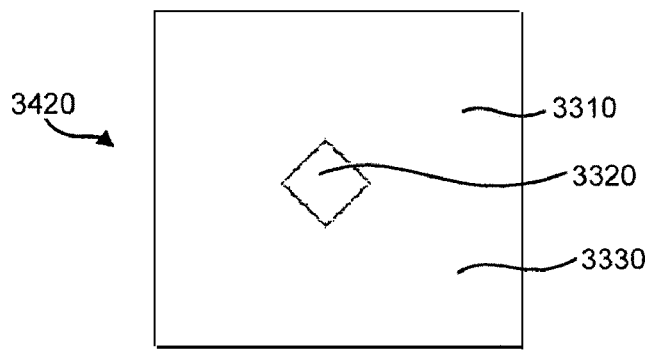

FIG. 34A-FIG. 34C show RGB images obtained from imaging object 3300. Image 3400 shows data of the R (red) channel, image 3410 shows data of the G (green) channel and image 3420 shows data of the B (blue) channel. As may be seen in FIG. 34A-FIG. 34C, diamond 3320 and crossed bars 3330 are clearly visible against background 3310 in each of images 3400, 3410 and 3420.

Figure 35A:
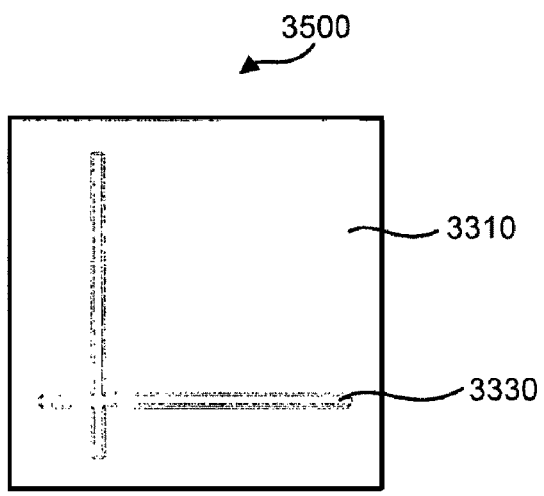
FIG. 35A-FIG. 35C show YUV images obtained from imaging the object shown in FIG. 33.
Figure 35B:
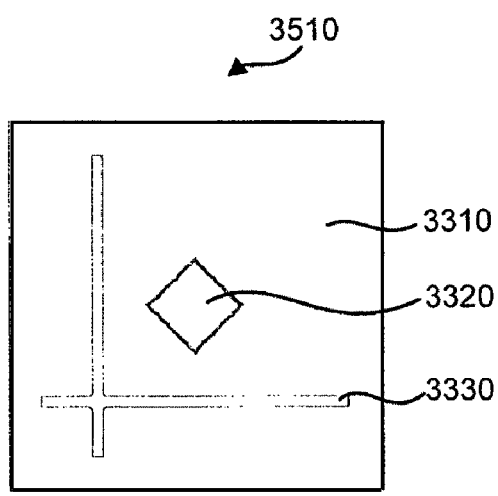
Figure 35C:
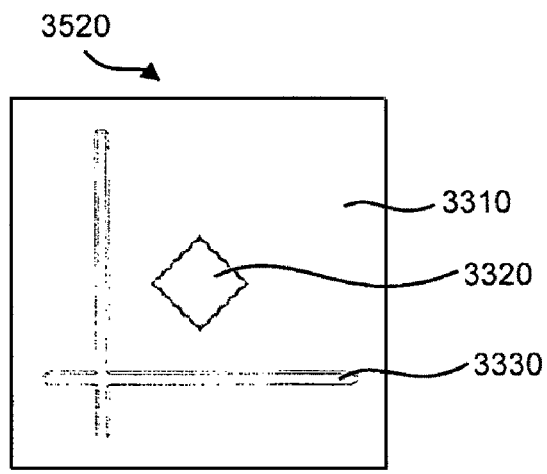

However, when object 3300 is instead converted into luminance (Y) and chrominance (U and V) channels, diamond 3320 is not present in the Y channel. FIG. 35A-FIG. 35C show YUV images obtained from imaging object 3300. Image 3500 shows data of the Y (intensity) channel, image 3510 shows data of the U (first chrominance) channel and image 3520 shows data of the V (second chrominance) channel. U and V channel images 3510 and 3520 do show both diamond 3320 and crossed bars 3330, but Y channel image 3500 shows only crossed bars 3330, and not diamond 3320.

Therefore, diamond 3320 and crossed bars 3330 in object 3300 both present information in each of three color (RGB) channels when processed in the RGB format (see FIG. 34A-FIG. 34C), but diamond 3320 presents no information in the Y channel (FIG. 35A) when processed in the YUV format. Although YUV format is preferred in certain applications, lack of Y information may hinder effective reconstruction of an image.

Processing that detects an absence of intensity information and modifies processing accordingly (sometimes referred to herein as "adaptive reconstruction") may produce a superior processed image as compared to a system that does not vary processing according to an absence of intensity information (sometimes referred to herein as "non-adaptive reconstruction"). In other words, adaptive processing may improve a processed image when information is completely missing from one channel.

Figure 36A:
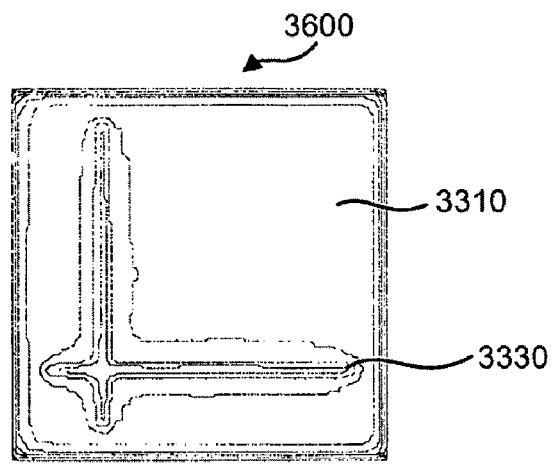
FIG. 36-FIG. 36C show electronic data of the object in FIG. 33, taken through an imaging system that utilizes cosine optics and converts the image into YUV format.
Figure 36B:
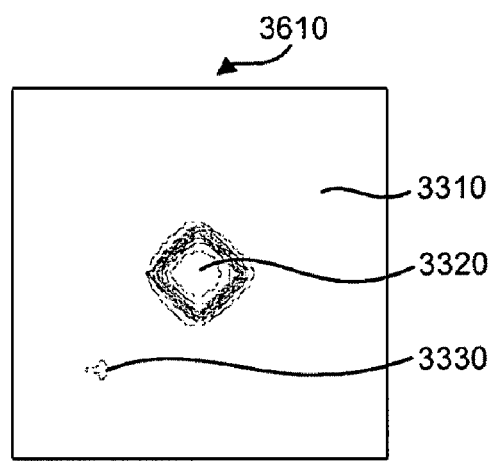
Figure 36C:
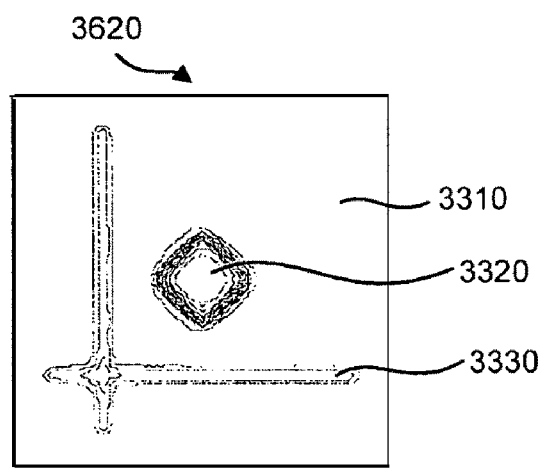

FIG. 36-FIG. 36C show electronic data 3600, 3610 and 3620 respectively of object 3300, taken through an imaging system that utilizes cosine optics as described earlier, and converts the image into YUV format. Diamond 3320 is recognizable in each of the U and V electronic data 3610 and 3620 respectively, but not in the Y electronic data 3600.

Figure 37A:
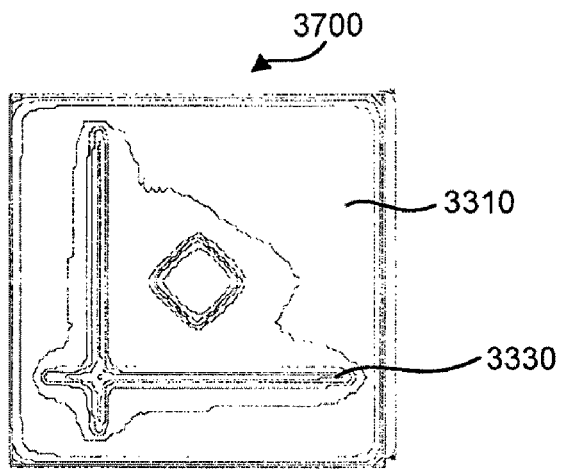
FIG. 37A-FIG. 37C illustrate results obtained when the YUV electronic data shown in FIG. 36
Figure 37B:
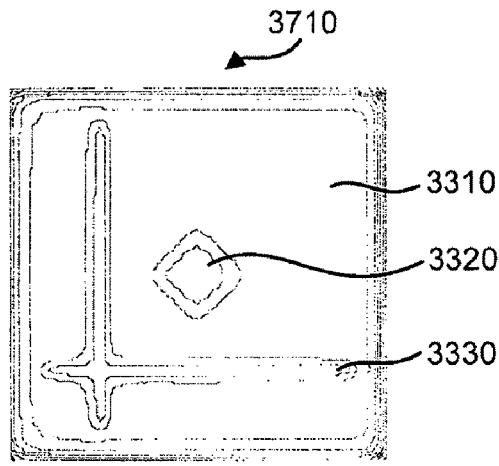
Figure 37C:
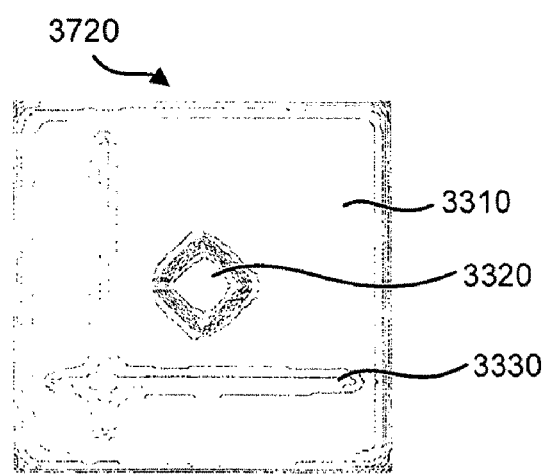

FIG. 37A-FIG. 37C illustrate results obtained when the YUV electronic data shown in FIG. 36-FIG. 36C is processed and converted back into RGB format. FIG. 37A-FIG. 37C show R electronic data 3700, G electronic data 3710 and B electronic data 3720 respectively. Note that electronic data in each of the channels, and particularly G electronic data 3710, is different from the original RGB data shown in FIG. 34A-FIG. 34C. In RGB electronic data 3700, 3710 and 3720, generated with cosine optics, diamond 3320 is visible in all three R, G and B channels.

Figure 38A:
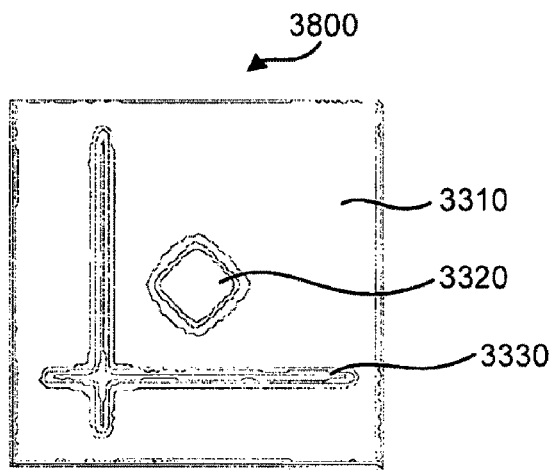
FIG. 38A-FIG. 38C illustrate results obtained when RGB reconstruction of an image uses only the Y channel of a YUV image.
Figure 38B:
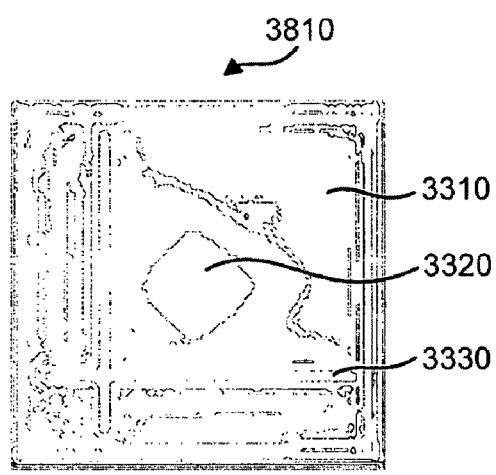
Figure 38C:
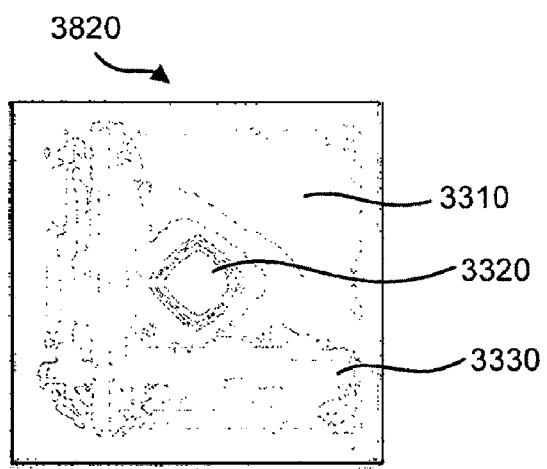

FIG. 38A-FIG. 38C illustrate results obtained when RGB reconstruction of the image uses only the Y channel of a YUV image. FIG. 38A-FIG. 38C show R electronic data 3800, G electronic data 3810 and B electronic data 3820 respectively. Use of Y channel information alone is seen to result in RGB images with degraded image quality in all channels.

Figure 39A:
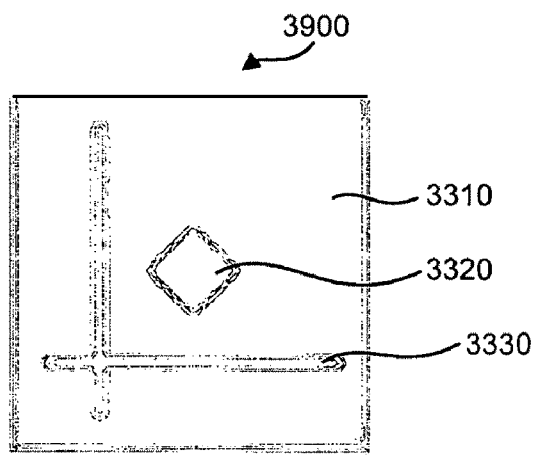
FIG. 39A-FIG. 39C illustrate results obtained when the YUV electronic data shown in FIG. 36
Figure 39B:
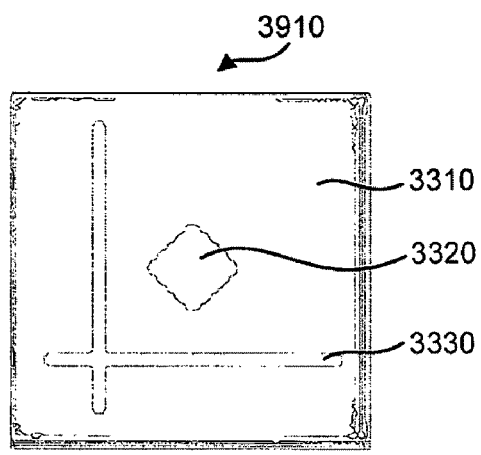
Figure 39C:
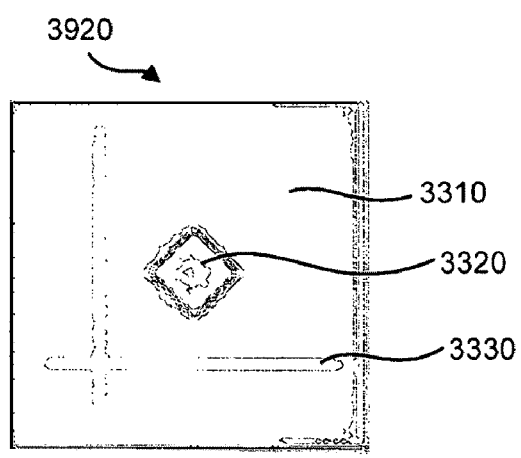

FIG. 39A-FIG. 39C illustrate results obtained when YUV electronic data 3600, 3610 and 3620 are processed and converted back into RGB format, with the processing varied according to the lack of intensity information (e.g., lack of diamond 3320) in electronic data 3600. FIG. 39A-FIG. 39C show R electronic data 3900, G electronic data 3910 and B electronic data 3920 respectively. Note that electronic data 3900, 3910 and 3920 show diamond 3320 being "tighter"—that is, lines that are straight in object 3300 are straighter—than in electronic data 3800, 3810 and 3820 (FIG. 38). Also, electronic data 3910 (the green channel) looks more like object 3300 than does electronic data 3810. Therefore, reconstruction using all of the Y, U and V channels results in RGB images with improved quality in all channels over reconstruction using only the Y channel.

Nonlinear Processing—Implementation

A variety of nonlinear operations may be classified as "operators" herein and may be utilized in a blur removal block (e.g., any of blur removal and/or blur and filtering blocks 2540, FIG. 25; 2642, 2644, FIG. 26, or 2742, 2744, FIG. 27). A threshold operator may, for example, discard or modify electronic data above or below a certain threshold (e.g., a pixel or color intensity value). The threshold operator may create a binary image, clip a bias or create saturation from a grayscale image, and may operate in the same manner for all data of an image or may vary depending on the electronic data. An edge enhancement operator may, for example, identify edges and modify the electronic data in the vicinity of the edges. The edge enhancement operator may utilize a differentiator or directionally sensitive transforms, such as wavelet transforms, to identify edges, and may perform identical enhancement of all edges in an image, or may vary the edge enhancement for various parts of the image. An inflection emphasis operator may, for instance, identify inflections and modify the electronic data in the vicinity of the inflections. The inflection emphasis operator may include shock filters and diffusion operators such as described in "Diffusion PDEs on Vector-Valued Images", IEEE Signal Processing Magazine, pp. 16-25, vol. 19, no. 5, September 2002. The inflection emphasis operator may perform identical modification of all inflections in an image, or may vary the modification for various parts of the image. A gradient operator may identify gradients in electronic data and may modify the electronic data identically at all gradients in an image, or may vary the modification for various parts of the image. The gradient operator may be used to process images based on the difference between adjacent pixel values (e.g., a local gradient). A diffusion operator may identify homogeneous or inhomogeneous regions and may perform an operation on the homogeneous or inhomogeneous regions, or may identify the regions for additional processing.

Figure 40:
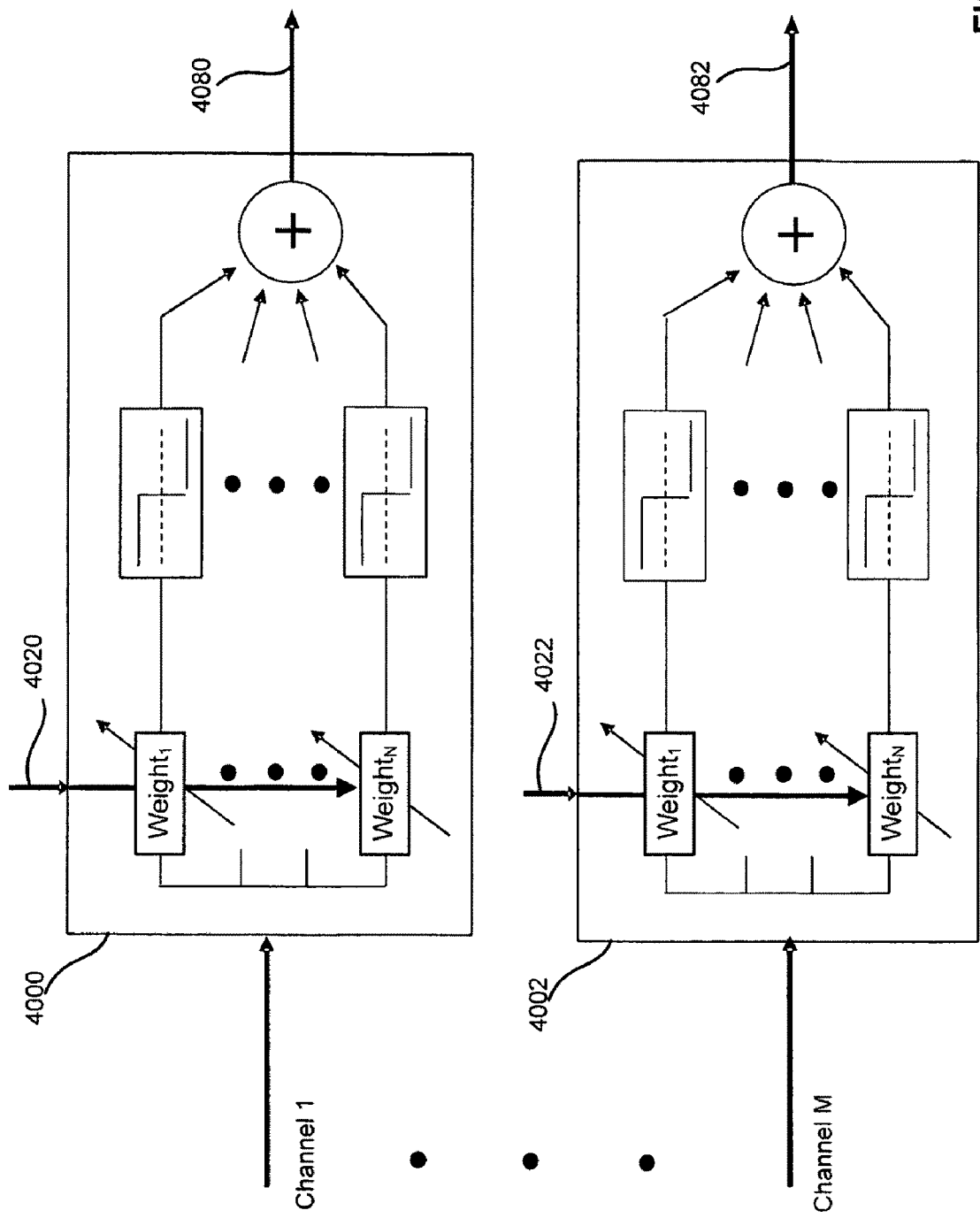
FIG. 40 illustrates how a blur removal block may generate a weighted sum of nonlinear operators.

FIG. 40 illustrates how a blur removal block 4000 (e.g., any of blur removal and/or blur and filtering blocks 2540, FIG. 25; 2642, 2644, FIG. 26; or 2742, 2744, FIG. 27) may generate a weighted sum of nonlinear operators. FIG. 40 shows blur removal blocks 4000 and 4002 (or any number M of blur removal blocks, as indicated by ellipsis) that process nonlinear operators and sum their outputs before passing electronic data output 4080 and 4082 as output or for further image processing. Analysis of electronic data (e.g., by either of spatial parameter estimator block 2730 or color parameter estimator block 2731, FIG. 27) may determine optional processing parameters 4020 and 4022; alternatively, each of blur removal blocks 4000 and 4002 may utilize fixed weighting. The illustrated sequence of operations may be reversed; that is, each channel may apply nonlinear operators before applying a weight and summing the outputs.

Figure 41:
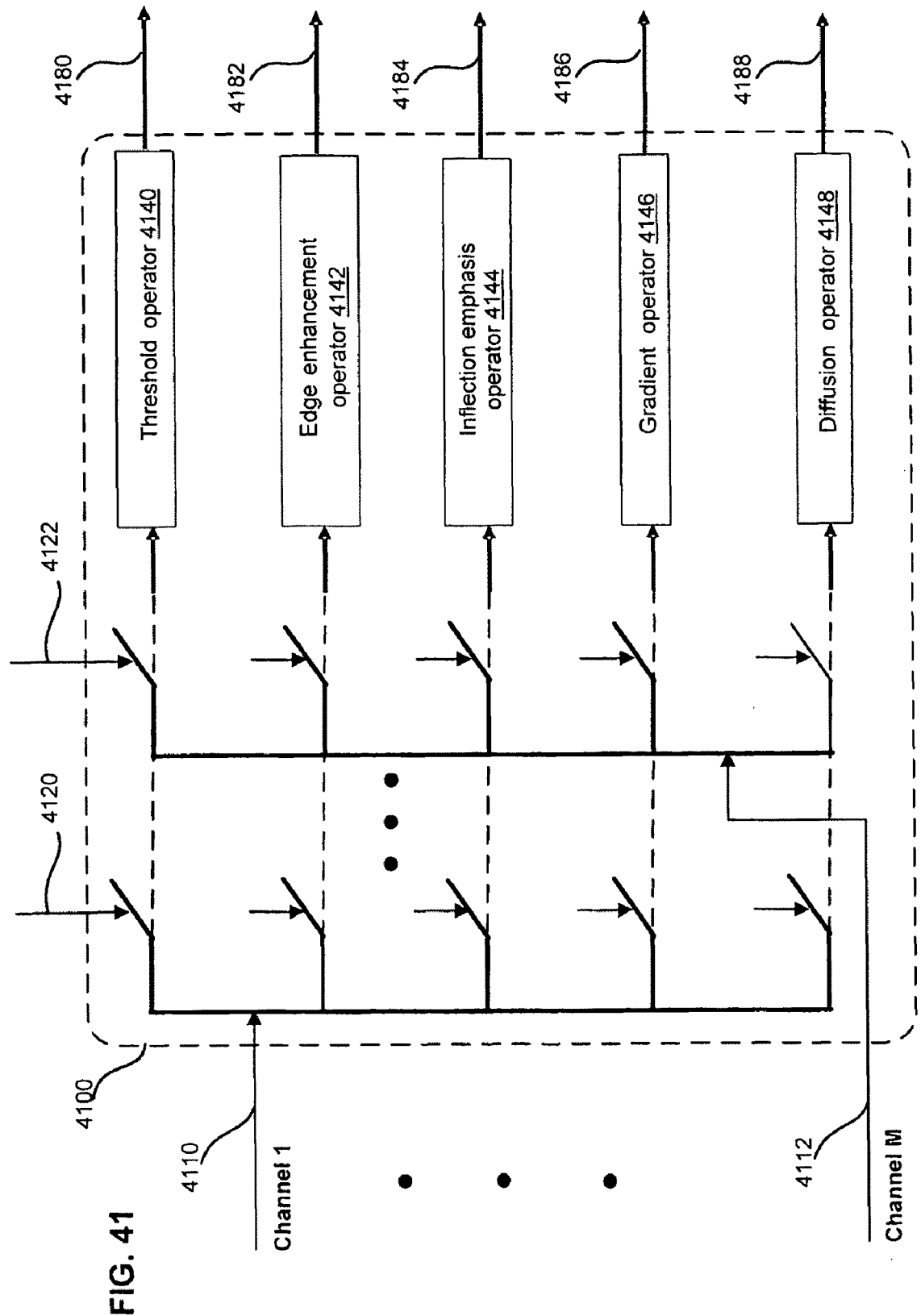
FIG. 41 illustrates a blur removal block containing nonlinear operators that operate differently on different data sets of an image or on different image channels.

FIG. 41 illustrates how a blur removal block 4100 (e.g., any of blur removal and/or blur and filtering blocks 2540, FIG. 25; 2642, 2644, FIG. 26, or 2742, 2744, FIG. 27) may contain nonlinear operators that operate in a different fashion on different data sets of an image, or may operate on different image channels. Input electronic data channels 4110, 4112 (and, as indicated by ellipsis, up to M electronic data channels) may be operated on by different operators depending on image input parameters 4120, 4122 (and up to M corresponding input parameters). Nonlinear operators shown in FIG. 41 include a threshold operator 4140, an edge enhancement operator 4142, an inflection emphasis operator 4144, a gradient operator 4146 and a diffusion operator 4148, but other nonlinear operators may also be utilized. Output data 4180, 4182, 4184, 4186 and 4188 may be passed as output or for further image processing.

Figure 42:
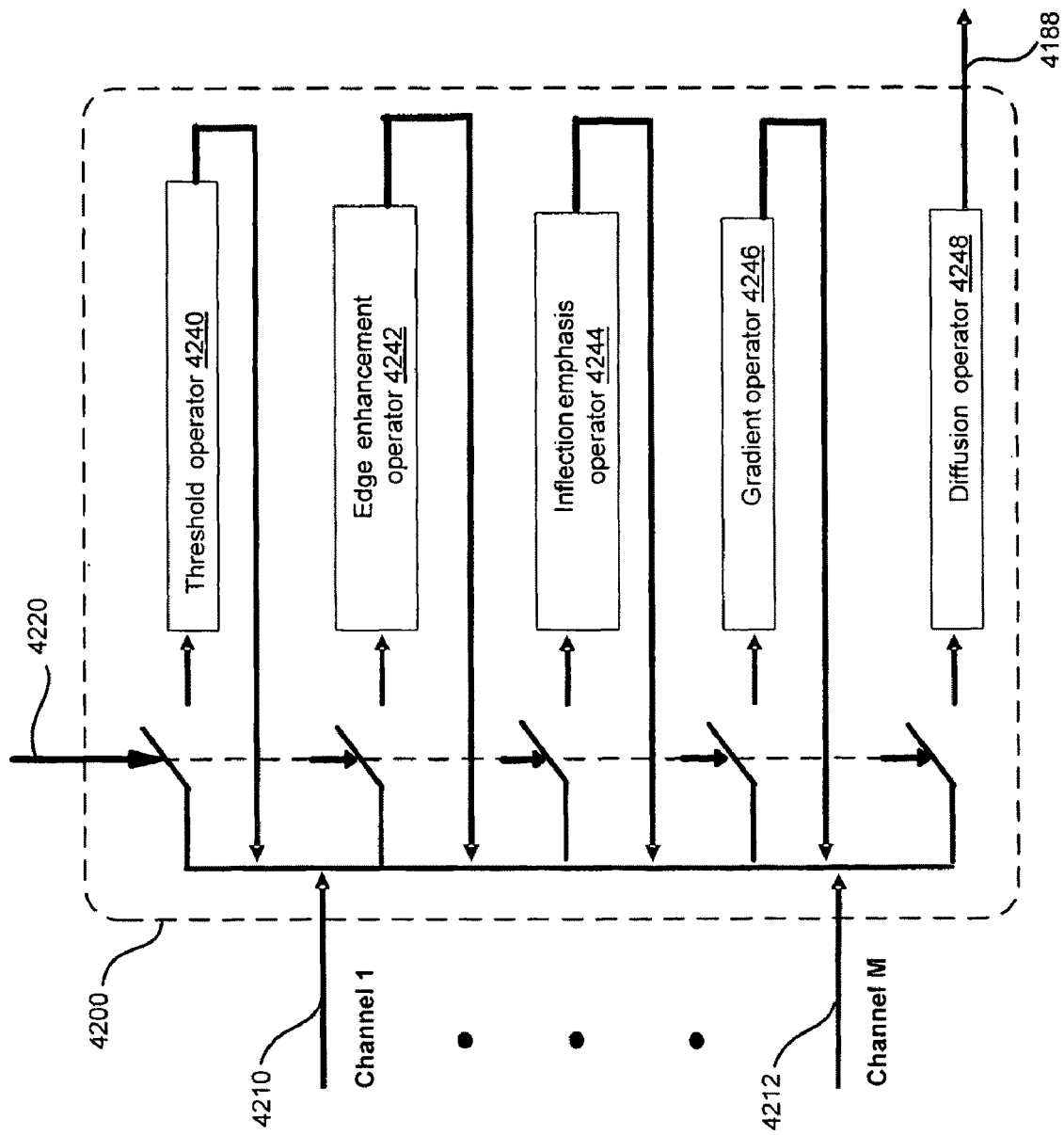
FIG. 42 illustrates a blur removal block that processes electronic data from different data sets of an image, or from different channels, in either serial or parallel fashion, or recursively.

FIG. 42 illustrates how a blur removal block 4200 (e.g., any of blur removal and/or blur and filtering blocks 2540, FIG. 25; 2642, 2644, FIG. 26, or 2742, 2744, FIG. 27) may process electronic data from different data sets of an image, or from different channels, in either serial or parallel fashion, or recursively. Input electronic data channels 4210, 4212 (and, as indicated by ellipsis, up to M electronic data channels) may be operated on by different operators depending on image input parameters 4220 (and up to M corresponding input parameters, not shown, corresponding to the N input channels). Nonlinear operators shown in FIG. 42 include a threshold operator 4240, an edge enhancement operator 4242, an inflection emphasis operator 4244, a gradient operator 4246 and a diffusion operator 4248, but other nonlinear operators may also be utilized. Output data 4288 may be passed as output or for further image processing. Results from one nonlinear operator (e.g., partially processed electronic data) may thus be further processed by another nonlinear operator before being passed on to the next part of the image processing, as shown. Recursive processing may be employed; that is, a given data stream may be processed repeatedly through any one of the nonlinear operators shown. When recursive processing is utilized, the processing may be repeated in a fixed sequence or number of iterations, or processing may proceed until a figure of merit for a resulting image is met.

Systems utilizing nonlinear and/or spatially varying processing may advantageously utilize a prefilter to prepare data for further processing. A prefilter may accept as input electronic data and processing parameters for one or more image regions. A particular prefilter may utilize processing parameters and produce an output. For example, a prefilter may be an all-pass filter, a low-pass filter, a high-pass filter or a band-pass filter. Relationships between a prefilter type, processing parameters and output of the prefilter are shown in Table 3 below.

TABLE 3

Prefilter types, processing parameters and outputs.

| Prefilter Type | Processing Parameters | Output |
| --- | --- | --- |
| All-pass | Processed response has no RMS value increase or decrease | Starting with a non-symmetric response, forms a symmetric response that is better suited to non-linear signal processing that performs blur removal |
| Low-pass | Processed response has a small decrease in RMS value, $0.5 \leq \Delta RMS \leq 1.0$ | Provides a smoother image that is better suited to non-linear signal processing that performs aggressive blur removal |
| Band-pass or High-pass | Processed response has a small increase in RMS value, $1.0 \leq \Delta RMS \leq 1.5$ | Provides a sharper image that is better suited to non-linear signal processing that performs non-aggressive blur removal |

Additionally, an all-pass or low-pass filter may be desirable in low signal-to-noise applications where a band-pass or high-pass filter may contribute to a poor processed image due to noise amplification.

Capture of User Preferences for User-Optimized Processing

Figure 43:
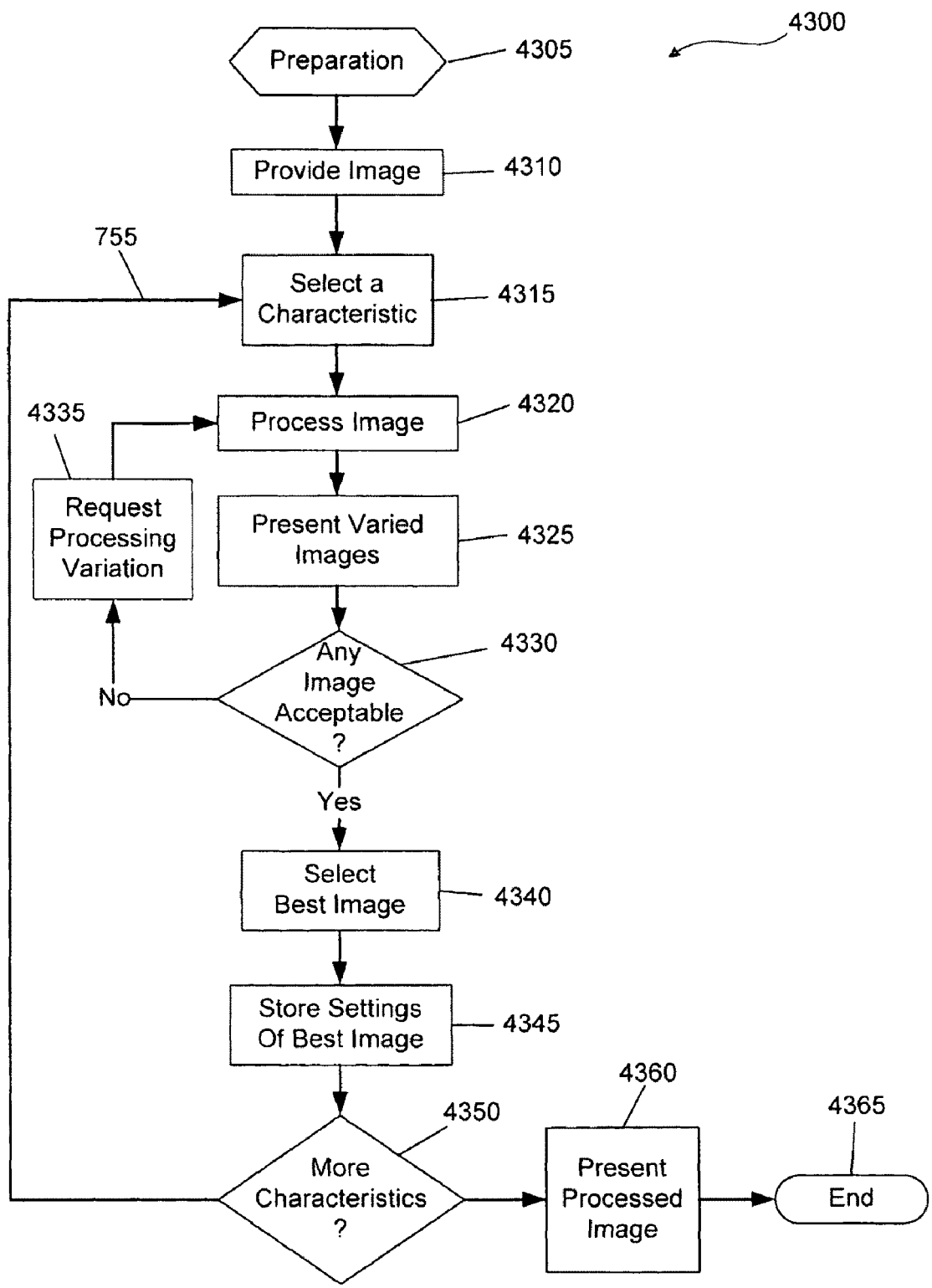
FIG. 43 shows a flowchart of a method for selecting process parameters for enhancing image characteristics.

FIG. 43 shows a flowchart of a method 4300 for selecting process parameters for enhancing image characteristics. Method 4300 provides for quantifying processing parameters that relate to subjective characteristics and factors that a particular user associates with image quality. Method 4300 starts with an optional preparation step 4305 wherein any necessary setup operations are performed. For example, exposure times, aperture and digital image formatting may be determined or configured in step 4305. After step 4305, method 4300 advances to step 4310 that provides an image for the user to evaluate. Step 4310 may include capturing one or more images using the settings determined in step 4305, or step 4310 may provide the one or more images from a library of stored images. Next, in step 4315 a characteristic is selected; such characteristics may include, for example, sharpness, brightness, contrast, colorfulness and/or noisiness. In step 4320, an image provided by step 4310 is processed by an algorithm associated with the selected characteristic. For example, if sharpness is the selected characteristic, then a sharpening or de-sharpening algorithm is applied to the image at varying degrees whereby producing a series of sharpened or de-sharpened images. Next, in step 4325, the series of processed images are presented through a display device to the user for review. The series of images may include, for example, a set of three images that are individually unsharpened, lightly sharpened and heavily sharpened by applying a default set of sharpening parameters (a set of three images is exemplary; two, four or more images may also be presented). In step 4330, the user determines if any of the images are acceptable as an enhanced image. If none of the presented images is acceptable, method 4300 advances to step 4335, in which processing variations may be requested (e.g., more or less sharpening), and returns to step 4320. If one or more of the presented images are acceptable, the image most acceptable to the user is selected during step 4340. Once an image has been selected during step 4340, the settings and parameters associated with processing of the selected characteristic are stored for later retrieval. Next, in step 4350, the user is presented with an option to select and modify further characteristics of the image. If a decision is made to modify another characteristic then method 4300 returns to step 4315 via looping pathway 4335 and another characteristic may be selected. If a decision is made to not modify other characteristics then method 4300 proceeds to step 4360 wherein the processed image is presented. Following presentation, method 4300 ends with an end step 4365 wherein finalization tasks such as clearing memory or a display device may be performed.

The changes described above, and others, may be made in the nonlinear and/or spatially varying processing described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An imaging system, comprising:
    optics having one or more phase modifying elements that modify wavefront phase to introduce one or more image attributes into an optical image;
    a detector that converts the optical image to electronic data while maintaining the image attributes;
    and a digital signal processor for
        subdividing the electronic data into one or more data sets,
        classifying the one or more data sets based at least on the image attributes, and
        independently processing the one or more data sets, based on results of the classifying, to form processed electronic data,
    wherein the digital signal processor is configured for
        classifying the one or more data sets based on
        (a) characteristics of the electronic data related to spatial regions of the optical image, and
        (b) the one or more image attributes,
        and is further configured for classifying the one or more data sets based on power spectrum estimates for each of a plurality of identification subsets within the electronic data.

2. The imaging system of claim 1, wherein the imaging system has extended depth of field as compared to the system without the one or more phase modifying elements.

3. The imaging system of claim 1, wherein the digital signal processor is configured for
    (a) identifying dominant spatial frequencies in one or more of the power spectrum estimates, and
    (b) independently processing the one or more data sets by generating a filter for each of the data sets, based on the dominant spatial frequencies, to form the processed electronic data.

4. The imaging system of claim 1, wherein the digital signal processor is configured for identifying at least one edge in one of the spatial regions by utilizing one of Sobel, Prewitt, Roberts, Laplacian of Gaussian, zero cross and Canny methods.

5. The imaging system of claim 1, wherein the electronic data comprises one or more color channels.

6. The imaging system of claim 5, wherein the digital signal processor is configured for classifying the one or more data sets based on color information content of the one or more color channels.

7. The imaging system of claim 5, wherein the digital signal processor is further configured for classifying the one or more data sets based on spatial frequency information within the one or more color channels.

8. The imaging system of claim 5, wherein the digital signal processor is further configured for classifying the one or more data sets based on intensity information within the one or more color channels.

9. The imaging system of claim 1, wherein the electronic data comprises one or more intensity channels.

10. The imaging system of claim 9, wherein the digital signal processor is configured for classifying the one or more data sets based on intensity content of the one or more intensity channels.

11. The imaging system of claim 1, wherein the electronic data comprises a plurality of channels, each channel including at least color content and intensity content.

12. The imaging system of claim 11, wherein the digital signal processor is configured for classifying the one or more data sets based on the color content and intensity content of the plurality of channels.

13. The imaging system of claim 1, wherein the phase modifying element implements wavefront coding.

14. The imaging system of claim 1, wherein the one or more image attributes includes a blur that is removable by the digital signal processor.

15. The imaging system of claim 1, wherein the optics are characterized by a PSF having a shape that is substantially invariant with respect to misfocus.

16. The imaging system of claim 1, wherein the optics, the detector and the digital signal processor are located within a common system housing.

17. The imaging system of claim 1, wherein the optics and the detector are at a first location and the digital signal processor is at a second location.

18. The imaging system of claim 1, wherein the digital signal processor is further configured for operating on the electronic data in parallel with the detector converting the optical image to the electronic data.

19. The imaging system of claim 1, wherein the digital signal processor is configured for operating on the electronic data after the detector converts substantially all of the optical image to the electronic data.

20. The imaging system of claim 1, wherein the digital signal processor is further configured for classifying the one or more data sets in accordance with preset instructions.

21. The imaging system of claim 20, wherein the preset instructions are based on preferences of a user of the imaging system.

22. The imaging system of claim 20, wherein the preset instructions are based on the one or more image attributes.

23. The imaging system of claim 1, wherein the image attributes include at least one of signal space, null space, interference subspace, spatial frequency content, resolution, color information, contrast modification, and optical blur.

24. The imaging system of claim 1, wherein the characteristics include at least one of fixed pattern noise, random noise, defect pixels, sharpness of transitions and edges, aliasing, artifacts, ghosting, depth of field, range, texture, and spatial detail.

25. An imaging system, comprising:
optics having one or more phase modifying elements that modify wavefront phase to introduce one or more image attributes into an optical image;
a detector that converts the optical image to electronic data while maintaining the image attributes;
and a digital signal processor for
subdividing the electronic data into one or more data sets,
classifying the one or more data sets based at least on (a) characteristics of the electronic data related to spatial regions of the optical image, (b) the one or more image attributes, and (c) power spectrum estimates for each of a plurality of identification subsets within the electronic data,
combining identification subsets with similar power spectrum estimates, to form the one or more data sets, and
independently processing the one or more data sets, based on results of the classifying, to form processed electronic data.

26. An imaging system, comprising:
optics having one or more phase modifying elements that modify wavefront phase to introduce one or more image attributes into an optical image;
a detector that converts the optical image to electronic data while maintaining the image attributes;
and a digital signal processor for
subdividing the electronic data into one or more data sets,
classifying the one or more data sets based at least on the image attributes, and
independently processing the one or more data sets, based on results of the classifying, to form processed electronic data,
wherein the digital signal processor is additionally configured for recursively
subdividing the electronic data into one or more data sets,
classifying the one or more data sets, based at least on the image attributes, and
independently processing the one or more data sets, based on results of the classifying, to form the processed electronic data.

27. A method for generating processed electronic data, comprising
modifying phase of a wavefront from an object to introduce one or more image attributes into an optical image formed by an imaging system,
converting the optical image to electronic data while maintaining the image attributes,
subdividing the electronic data into one or more data sets,
classifying the one or more data sets based at least on the one or more image attributes, and
independently processing the one or more data sets to form processed electronic data,
wherein classifying the one or more data sets is based on
(a) characteristics of the electronic data related to spatial regions of the optical image,
(b) the one or more image attributes, and
(c) power spectrum estimates for each of a plurality of identification subsets within the electronic data.

28. Method of claim 27, wherein modifying phase extends a depth of field of the imaging system.

29. Method of claim 27, wherein independently processing comprises
identifying dominant spatial frequencies in one or more of the power spectrum estimates,
and independently processing the one or more data sets by generating a corresponding filter for each of the data sets, based on the dominant spatial frequencies of each data set, and filtering each of the data sets with its corresponding filter to form the processed electronic data.

30. Method of claim 27, wherein classifying comprises identifying at least one edge in one of the spatial regions by utilizing one of Sobel, Prewitt, Roberts, Laplacian of Gaussian, zero cross and Canny methods.

31. Method of claim 27, wherein converting the optical image to electronic data comprises generating one or more color channels.

32. Method of claim 31, wherein classifying further comprises classifying based on color information content of the one or more color channels.

33. Method of claim 31, wherein classifying further comprises classifying the one or more data sets based on spatial frequency information within the one or more color channels.

34. Method of claim 31, wherein classifying further comprises classifying the one or more data sets based on intensity information within the one or more color channels.

35. Method of claim 27, wherein modifying phase comprises utilizing wavefront coding.

36. Method of claim 27, wherein modifying phase comprises introducing a blur that is removable by digital signal processing as one of the one or more image attributes.

37. Method of claim 27, wherein modifying phase comprises causing a PSF of the imaging system to have a shape that is substantially invariant with respect to misfocus.

38. Method of claim 27, wherein the subdividing, classifying and independently processing occur in parallel with the modifying and converting.

39. Method of claim 27, wherein the modifying and converting occur at one time and the subdividing, classifying and independently processing occur at a later time.

40. Method of claim 27, wherein classifying is performed in accordance with preset instructions.

41. Method of claim 40, further comprising generating the preset instructions according to preferences of a user of the imaging system.

42. A method for generating processed electronic data, comprising
modifying phase of a wavefront from an object to introduce one or more image attributes into an optical image formed by an imaging system,
converting the optical image to electronic data while maintaining the image attributes,
subdividing the electronic data into one or more data sets,
classifying the one or more data sets based at least on (a) characteristics of the electronic data related to spatial regions of the optical image, (b) the one or more image attributes, and (c) power spectrum estimates for each of a plurality of identification subsets within the electronic data,
combining identification subsets with similar power spectrum estimates to form the one or more data sets, and
independently processing the one or more data sets to form processed electronic data.

43. A method for generating processed electronic data, comprising
modifying phase of a wavefront from an object to introduce one or more image attributes into an optical image formed by an imaging system,
converting the optical)thccWgga while maintaining the image ma e attributes,
subdividing the electronic data into one or more data sets,
classifying the one or more data sets based at least on the one or more image attributes, and
independently processing the one or more data sets to form processed electronic data,
wherein the steps of subdividing, classifying and independently processing are performed recursively.

44. A software product comprising instructions stored on non-transitory computer-readable media, wherein the instructions, when executed by a computer, perform steps for processing electronic data generated by (a) modifying phase of a wavefront from an object to introduce one or more image attributes into an optical image formed by an imaging system and (b) converting the optical image to electronic data while maintaining the image attributes, the instructions comprising:
instructions for subdividing the electronic data into one or more data sets;
instructions for classifying the one or more data sets based at least on the one or more image attributes, including instructions for generating a power spectrum estimate for each of a plurality of identification subsets within the electronic data; and
instructions for independently processing the one or more data sets to form the processed electronic data.

45. Software product of claim 44, wherein the instructions for classifying include instructions for evaluating one of (a) characteristics of the electronic data related to spatial regions of the optical image and (b) the one or more image attributes.

46. Software product of claim 44, wherein
the instructions for classifying include instructions for identifying dominant spatial frequencies in one or more of the power spectrum estimates, and
the instructions for independently processing include instructions for generating a corresponding filter for each of the data sets, based on the dominant spatial frequencies of each data set and instructions for filtering each of the data sets with its corresponding filter to form the processed electronic data.

47. Software product of claim 44, wherein the instructions for classifying include instructions for identifying at least one edge in one of the spatial regions by utilizing one of Sobel, Prewitt, Roberts, Laplacian of Gaussian, zero cross and Canny methods.

48. Software product of claim 44, wherein the instructions for classifying include instructions for utilizing one of (a) color information content, (b) spatial frequency information and (c) intensity information of one or more color channels of the electronic data.

49. Software product of claim 44,
wherein the instructions for subdividing, classifying and independently processing, respectively, include instructions for subdividing, classifying and independently processing in accordance with user preferences.

50. A software product comprising instructions stored on non-transitory computer-readable media, wherein the instructions, when executed by a computer, perform steps for processing electronic data generated by (a) modifying phase of a wavefront from an object to introduce one or more image attributes into an optical image formed by an imaging system and (b) converting the optical image to electronic data while maintaining the image attributes, the instructions comprising:
instructions for subdividing the electronic data into one or more data sets;
instructions for generating a power spectrum estimate for each of a plurality of identification subsets within the electronic data;
instructions for classifying the one or more data sets based at least on the one or more image attributes;
instructions for combining identification subsets with similar power spectrum estimates to form the one or more data sets, and
instructions for independently processing the one or more data sets to form the processed electronic data.

51. A software product comprising instructions stored on non-transitory computer-readable media, wherein the instructions, when executed by a computer, perform steps for processing electronic data generated by (a) modifying phase of a wavefront from an object to introduce one or more image attributes into an optical image formed by an imaging system and (b) converting the optical image to electronic data while maintaining the image attributes, the instructions comprising:

instructions for subdividing the electronic data into one or more data sets;

instructions for classifying the one or more data sets based at least on the one or more image attributes;

instructions for independently processing the one or more data sets to form the processed electronic data; and instructions for recursively subdividing the electronic data into one or more data sets, classifying the one or more data sets based at least on the one or more image attributes, and processing the one or more data sets to form processed electronic data.

* * * * *